(12) United States Patent
Akiyama

(10) Patent No.: US 11,563,497 B2
(45) Date of Patent: Jan. 24, 2023

(54) OPTICAL MODULATOR, OPTICAL TRANSMITTER, AND OPTICAL COMMUNICATION APPARATUS

(71) Applicant: FUJITSU LIMITED, Kawasaki (JP)

(72) Inventor: Tomoyuki Akiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/454,813

(22) Filed: Nov. 14, 2021

(65) Prior Publication Data

US 2022/0278753 A1 Sep. 1, 2022

(30) Foreign Application Priority Data

Feb. 26, 2021 (JP) .............................. JP2021-029898

(51) Int. Cl.
*H04B 10/532* (2013.01)
*H04B 10/50* (2013.01)
*G02F 1/21* (2006.01)

(52) U.S. Cl.
CPC ........... *H04B 10/532* (2013.01); *G02F 1/212* (2021.01); *H04B 10/501* (2013.01)

(58) Field of Classification Search
CPC ...... H04B 10/532; H04B 10/501; G02F 1/212
USPC ....................................................... 398/152
See application file for complete search history.

(56) References Cited

U.S. PATENT DOCUMENTS

| 8,849,071 | B2 * | 9/2014 | Kissa | ...................... G02F 1/225 |
| | | | | 385/50 |
| 9,069,193 | B2 * | 6/2015 | Sato | ........................ G02F 1/011 |
| 9,344,199 | B2 * | 5/2016 | Kawazoe | ............. H04B 10/616 |
| 9,413,467 | B2 * | 8/2016 | Noguchi | ................ G02F 1/2255 |

(Continued)

FOREIGN PATENT DOCUMENTS

| CN | 107924074 A * | 4/2018 | ............. G02F 1/011 |
| JP | 2013-502613 | 1/2013 | |

(Continued)

OTHER PUBLICATIONS

Yin et al; DLI-Based DP-QPSK Reception Scheme for Short-Range Optical Communication; Jul. 2020; Applied Sciences MDPI; pp. 1-12. (Year: 2020).*

(Continued)

*Primary Examiner* — Amritbir K Sandhu
(74) *Attorney, Agent, or Firm* — Fujitsu Patent Center; Tiep H. Nguyen

(57) ABSTRACT

An optical modulator includes: an encoder that encodes an input data signal; a branch circuit that branches an optical signal into first and second optical signals; a first arm through which the first optical signal branched at the branch circuit passes; a first phase shifter group on the first upper arm that adjusts a phase shift amount of the first optical signal that passes through the first arm; a second arm through which the second optical signal branched at the branch circuit passes; a second phase shifter group on the second arm that adjusts a phase shift amount of the second optical signal that passes through the second arm such that (Continued)

a sign of the phase shift amount of the second optical signal becomes opposite to a sign of the phase shift amount of the first optical signal; and a multiplexing circuit that multiplexes the first optical signal.

3 Claims, 47 Drawing Sheets

(56) References Cited

U.S. PATENT DOCUMENTS

| | | | | |
|---|---|---|---|---|
| 2007/0127933 | A1* | 6/2007 | Hoshida | H04B 10/66 398/202 |
| 2011/0044573 | A1* | 2/2011 | Webster | H04B 10/5053 385/3 |
| 2015/0063822 | A1* | 3/2015 | Noguchi | H04B 10/27 398/140 |
| 2015/0280828 | A1* | 10/2015 | Urino | H04B 10/676 398/25 |
| 2021/0311336 | A1* | 10/2021 | Kharel | G02F 1/2255 |

FOREIGN PATENT DOCUMENTS

| | | |
|---|---|---|
| JP | 2015-184506 | 10/2015 |
| WO | 2011/022308 | 2/2011 |

OTHER PUBLICATIONS

Yin et al; DLI-Based DP-QPSK Reception Scheme for Short-Range Optical Communication; Jul. 2020; Applied Sciences; pp. 1-12. (Year: 2020).*

* cited by examiner

FIG. 3

| GRAY CODE $b_3b_2b_1$ | MODULATION INPUT CODE $B_3B_2B_1$ |
|---|---|
| 100 | 111 |
| 101 | 110 |
| 111 | 101 |
| 110 | 011 |
| 010 | 100 |
| 011 | 010 |
| 001 | 001 |
| 000 | 000 |

FIG. 16

| SIGNAL LEVEL | $b_3b_2b_1$ | $B_3B_2B_1$ |
|---|---|---|
| 8 | 100 | 111 |
| 7 | 101 | 110 |
| 6 | 111 | 101 |
| 5 | 110 | 011 |
| 4 | 010 | 100 |
| 3 | 011 | 010 |
| 2 | 001 | 001 |
| 1 | 000 | 000 |

FIG. 19

| SIGNAL LEVEL | $b_4b_3b_2b_1$ | $B_4B_3B_2B_1$ |
|---|---|---|
| 16 | 1000 | 1111 |
| 15 | 1001 | 1110 |
| 14 | 1011 | 1101 |
| 13 | 1010 | 1011 |
| 12 | 1110 | 0111 |
| 11 | 1111 | 1100 |
| 10 | 1101 | 1010 |
| 9 | 1100 | 0110 |
| 8 | 0100 | 1001 |
| 7 | 0101 | 0101 |
| 6 | 0111 | 0011 |
| 5 | 0110 | 1000 |
| 4 | 0010 | 0100 |
| 3 | 0011 | 0010 |
| 2 | 0001 | 0001 |
| 1 | 0000 | 0000 |

FIG. 22

| SIGNAL LEVEL | $b_5b_4b_3b_2b_1$ | $B_5B_4B_3B_2B_1$ |
|---|---|---|
| 16 | 01000 | 11000 |
| 15 | 01001 | 10100 |
| 14 | 01011 | 01100 |
| 13 | 01010 | 10010 |
| 12 | 01110 | 01010 |
| 11 | 01111 | 00110 |
| 10 | 01101 | 10001 |
| 9 | 01100 | 01001 |
| 8 | 00100 | 00101 |
| 7 | 00101 | 00011 |
| 6 | 00111 | 10000 |
| 5 | 00110 | 01000 |
| 4 | 00010 | 00100 |
| 3 | 00011 | 00010 |
| 2 | 00001 | 00001 |
| 1 | 00000 | 00000 |

| SIGNAL LEVEL | $b_5b_4b_3b_2b_1$ | $B_5B_4B_3B_2B_1$ |
|---|---|---|
| 32 | 10000 | 11111 |
| 31 | 10001 | 11110 |
| 30 | 10011 | 11101 |
| 29 | 10010 | 11011 |
| 28 | 10110 | 10111 |
| 27 | 10111 | 01111 |
| 26 | 10101 | 11100 |
| 25 | 10100 | 11010 |
| 24 | 11100 | 10110 |
| 23 | 11101 | 01110 |
| 22 | 11111 | 11001 |
| 21 | 11110 | 10101 |
| 20 | 11010 | 01101 |
| 19 | 11011 | 10011 |
| 18 | 11001 | 01011 |
| 17 | 11000 | 00111 |

FIG. 23A

| SIGNAL LEVEL | THE NUMBER OF 1 | $B_4$ | $B_4$ | $B_3$ | $B_2$ | $B_1$ |
|---|---|---|---|---|---|---|
| 32 | 5 | 1 | 1 | 1 | 1 | 1 |
| 31 | 4 | 1 | 1 | 1 | 1 | 0 |
| 30 | | 1 | 1 | 1 | 0 | 1 |
| 29 | | 1 | 1 | 0 | 1 | 1 |
| 28 | | 1 | 0 | 1 | 1 | 1 |
| 27 | | 0 | 1 | 1 | 1 | 1 |
| 26 | 3 | 1 | 1 | 1 | 0 | 0 |
| 25 | | 1 | 1 | 0 | 1 | 0 |
| 24 | | 1 | 0 | 1 | 1 | 0 |
| 23 | | 0 | 1 | 1 | 1 | 0 |
| 22 | | 1 | 1 | 0 | 0 | 1 |
| 21 | | 1 | 0 | 1 | 0 | 1 |
| 20 | | 0 | 1 | 1 | 0 | 1 |
| 19 | | 1 | 0 | 0 | 1 | 1 |
| 18 | | 0 | 1 | 0 | 1 | 1 |
| 17 | | 0 | 0 | 1 | 1 | 1 |
| 16 | 2 | 1 | 1 | 0 | 0 | 0 |
| 15 | | 1 | 0 | 1 | 0 | 0 |
| 14 | | 0 | 1 | 1 | 0 | 0 |
| 13 | | 1 | 0 | 0 | 1 | 0 |
| 12 | | 0 | 1 | 0 | 1 | 0 |
| 11 | | 0 | 0 | 1 | 1 | 0 |
| 10 | | 1 | 0 | 0 | 0 | 1 |
| 9 | | 0 | 1 | 0 | 0 | 1 |
| 8 | | 0 | 0 | 1 | 0 | 1 |
| 7 | | 0 | 0 | 0 | 1 | 1 |
| 6 | 1 | 1 | 0 | 0 | 0 | 0 |
| 5 | | 0 | 1 | 0 | 0 | 0 |
| 4 | | 0 | 0 | 1 | 0 | 0 |
| 3 | | 0 | 0 | 0 | 1 | 0 |
| 2 | | 0 | 0 | 0 | 0 | 1 |
| 1 | 0 | 0 | 0 | 0 | 0 | 0 |

FIG. 23B

| SIGNAL LEVEL | THE NUMBER OF 1 | $B_4$ | $B_4$ | $B_3$ | $B_2$ | $B_1$ | |
|---|---|---|---|---|---|---|---|
| 32 | 5 | 1 | 1 | 1 | 1 | 1 | |
| 31 | 4 | 1 | 1 | 1 | 1 | 0 | ARRANGE N-DIGIT BINARY NUMBERS IN WHICH THE NUMBER OF 1 IS N - 4 IN ORDER FROM THE SMALLEST → INVERT 1 AND 0 → HORIZONTALLY INVERT |
| 30 | | 1 | 1 | 1 | 0 | 1 | |
| 29 | | 1 | 1 | 0 | 1 | 1 | |
| 28 | | 1 | 0 | 1 | 1 | 1 | |
| 27 | | 0 | 1 | 1 | 1 | 1 | |
| 26 | 3 | 1 | 1 | 1 | 0 | 0 | ARRANGE N-DIGIT BINARY NUMBERS IN WHICH THE NUMBER OF 1 IS N - 3 IN ORDER FROM THE SMALLEST → INVERT 1 AND 0 → HORIZONTALLY INVERT |
| 25 | | 1 | 1 | 0 | 1 | 0 | |
| 24 | | 1 | 0 | 1 | 1 | 0 | |
| 23 | | 0 | 1 | 1 | 1 | 0 | |
| 22 | | 1 | 1 | 0 | 0 | 1 | |
| 21 | | 1 | 0 | 1 | 0 | 1 | |
| 20 | | 0 | 1 | 1 | 0 | 1 | |
| 19 | | 1 | 0 | 0 | 1 | 1 | |
| 18 | | 0 | 1 | 0 | 1 | 1 | |
| 17 | | 0 | 0 | 1 | 1 | 1 | |
| 16 | 2 | 1 | 1 | 0 | 0 | 0 | ARRANGE N-DIGIT BINARY NUMBERS IN WHICH THE NUMBER OF 1 IS N - 2 IN ORDER FROM THE SMALLEST → INVERT 1 AND 0 → HORIZONTALLY INVERT |
| 15 | | 1 | 0 | 1 | 0 | 0 | |
| 14 | | 0 | 1 | 1 | 0 | 0 | |
| 13 | | 1 | 0 | 0 | 1 | 0 | |
| 12 | | 0 | 1 | 0 | 1 | 0 | |
| 11 | | 0 | 0 | 1 | 1 | 0 | |
| 10 | | 1 | 0 | 0 | 0 | 1 | |
| 9 | | 0 | 1 | 0 | 0 | 1 | |
| 8 | | 0 | 0 | 1 | 0 | 1 | |
| 7 | | 0 | 0 | 0 | 1 | 1 | |
| 6 | 1 | 1 | 0 | 0 | 0 | 0 | ARRANGE N-DIGIT BINARY NUMBERS IN WHICH THE NUMBER OF 1 IS N - 1 IN ORDER FROM THE SMALLEST → INVERT 1 AND 0 → HORIZONTALLY INVERT |
| 5 | | 0 | 1 | 0 | 0 | 0 | |
| 4 | | 0 | 0 | 1 | 0 | 0 | |
| 3 | | 0 | 0 | 0 | 1 | 0 | |
| 2 | | 0 | 0 | 0 | 0 | 1 | |
| 1 | 0 | 0 | 0 | 0 | 0 | 0 | |

FIG. 25B

| SIGNAL LEVEL | THE NUMBER OF 1 | $B_N$ | ... | $B_2$ | $B_1$ | |
|---|---|---|---|---|---|---|
| $2^N$ | N | 1 | ... | 1 | 1 | $_NC_N$ |
| $2^N-1$ | N-1 | | ... | | | ARRANGE N-DIGIT BINARY NUMBERS IN WHICH THE NUMBER OF 1 IS $N-1$ IN ORDER FROM THE SMALLEST → INVERT 1 AND 0 → HORIZONTALLY INVERT ($_NC_{N-1}$) |
| ... | | | ... | | | |
| $2^N - {_NC_{N-1}}$ | | | ... | | | |
| $2^N - {_NC_{N-1}} - 1$ | N-2 | | ... | | | ARRANGE N-DIGIT BINARY NUMBERS IN WHICH THE NUMBER OF 1 IS $N-2$ IN ORDER FROM THE SMALLEST → INVERT 1 AND 0 → HORIZONTALLY INVERT ($_NC_{N-2}$) |
| ... | | | ... | | | |
| $2^N - {_NC_{N-1}} - {_NC_{N-2}}$ | | | ... | | | |
| ... | | ... | ... | ... | ... | |
| ${_NC_1} + {_NC_2} + 1$ | 2 | | ... | | | ARRANGE N-DIGIT BINARY NUMBERS IN WHICH THE NUMBER OF 1 IS 2 IN ORDER FROM THE SMALLEST → INVERT 1 AND 0 → HORIZONTALLY INVERT ($_NC_2$) |
| ... | | | ... | | | |
| ${_NC_1} + 2$ | | | ... | | | |
| ${_NC_1} + 1$ | 1 | | ... | | | ARRANGE N-DIGIT BINARY NUMBERS IN WHICH THE NUMBER OF 1 IS 1 IN ORDER FROM THE SMALLEST → INVERT 1 AND 0 → HORIZONTALLY INVERT ($_NC_1$) |
| ... | | | ... | | | |
| 2 | | | ... | | | |
| 1 | 0 | 0 | ... | 0 | 0 | $_NC_0$ |

FIG. 27

| SIGNAL LEVEL | $b_3^I b_2^I b_1^I$ | $B_3^I B_2^I B_1^I$ |
|---|---|---|
| 8 | 100 | 111 |
| 7 | 101 | 110 |
| 6 | 111 | 101 |
| 5 | 110 | 011 |
| 4 | 010 | 100 |
| 3 | 011 | 010 |
| 2 | 001 | 001 |
| 1 | 000 | 000 |

| SIGNAL LEVEL | $b_3^Q b_2^Q b_1^Q$ | $B_3^Q B_2^Q B_1^Q$ |
|---|---|---|
| 8 | 100 | 111 |
| 7 | 101 | 110 |
| 6 | 111 | 101 |
| 5 | 110 | 011 |
| 4 | 010 | 100 |
| 3 | 011 | 010 |
| 2 | 001 | 001 |
| 1 | 000 | 000 |

FIG. 30

| X= I or Q | SIGNAL LEVEL | $b_4^x b_3^x b_2^x b_1^x$ | $B_4^x B_3^x B_2^x B_1^x$ |
|---|---|---|---|
| | 16 | 1000 | 1111 |
| | 15 | 1001 | 1110 |
| | 14 | 1011 | 1101 |
| | 13 | 1010 | 1011 |
| | 12 | 1110 | 0111 |
| | 11 | 1111 | 1100 |
| | 10 | 1101 | 1010 |
| | 9 | 1100 | 0110 |
| | 8 | 0100 | 1001 |
| | 7 | 0101 | 0101 |
| | 6 | 0111 | 0011 |
| | 5 | 0110 | 1000 |
| | 4 | 0010 | 0100 |
| | 3 | 0011 | 0010 |
| | 2 | 0001 | 0001 |
| | 1 | 0000 | 0000 |

| SIGNAL LEVEL | $b_5^x b_4^x b_3^x b_2^x b_1^x$ | $B_5^x B_4^x B_3^x B_2^x B_1^x$ | SIGNAL LEVEL | $b_5^x b_4^x b_3^x b_2^x b_1^x$ | $B_5^x B_4^x B_3^x B_2^x B_1^x$ |
|---|---|---|---|---|---|
| 16 | 01000 | 11000 | 32 | 10000 | 11111 |
| 15 | 01001 | 10100 | 31 | 10001 | 11110 |
| 14 | 01011 | 01100 | 30 | 10011 | 11101 |
| 13 | 01010 | 10010 | 29 | 10010 | 11011 |
| 12 | 01110 | 01010 | 28 | 10110 | 10111 |
| 11 | 01111 | 00110 | 27 | 10111 | 01111 |
| 10 | 01101 | 10001 | 26 | 10101 | 11100 |
| 9 | 01100 | 01001 | 25 | 10100 | 11010 |
| 8 | 00100 | 00101 | 24 | 11100 | 10110 |
| 7 | 00101 | 00011 | 23 | 11101 | 01110 |
| 6 | 00111 | 10000 | 22 | 11111 | 11001 |
| 5 | 00110 | 01000 | 21 | 11110 | 10101 |
| 4 | 00010 | 00100 | 20 | 11010 | 01101 |
| 3 | 00011 | 00010 | 19 | 11011 | 10011 |
| 2 | 00001 | 00001 | 18 | 11001 | 01011 |
| 1 | 00000 | 00000 | 17 | 11000 | 00111 |

FIG. 36

| SIGNAL LEVEL | $b_3 b_2 b_1$ | $B_3 B_2 B_1$ |
|---|---|---|
| 8 | 100 | 111 |
| 7 | 101 | 110 |
| 6 | 111 | 101 |
| 5 | 110 | 011 |
| 4 | 010 | 100 |
| 3 | 011 | 010 |
| 2 | 001 | 001 |
| 1 | 000 | 000 |

| SIGNAL LEVEL | $b'_3 b'_2 b'_1$ | $B'_3 B'_2 B'_1$ |
|---|---|---|
| 8 | 100 | 111 |
| 7 | 101 | 110 |
| 6 | 111 | 101 |
| 5 | 110 | 011 |
| 4 | 010 | 100 |
| 3 | 011 | 010 |
| 2 | 001 | 001 |
| 1 | 000 | 000 |

US 11,563,497 B2

OPTICAL MODULATOR, OPTICAL TRANSMITTER, AND OPTICAL COMMUNICATION APPARATUS

CROSS-REFERENCE TO RELATED APPLICATION

This application is based upon and claims the benefit of priority of the prior Japanese Patent Application No. 2021-29898, filed on Feb. 26, 2021, the entire contents of which are incorporated herein by reference.

FIELD

The embodiments discussed herein are related to an optical modulator, an optical transmitter, and an optical communication apparatus.

BACKGROUND

As an optical element, there is an optical modulator including a
Mach-Zehnder (MZ) interferometer. FIG. 38 is a schematic plan view illustrating an example of a configuration of a conventional optical modulator 100. The optical modulator 100 illustrated in FIG. 38 is an MZ modulator that modulates an optical signal (continuous wave (CW) light) with a data signal of an electric signal. The optical modulator 100 includes a data modulation unit 101, a digital analogue convertor (DAC) 102, an optical waveguide 103, and two arms 104 arranged on the optical waveguide 103. The data modulation unit 101 modulates a bit string data signal. The DAC 102 converts a bit string data signal modulated by the data modulation unit 101 into an analog signal.

Japanese National Publication of International Patent Application No. 2013-502613 and Japanese Laid-open Patent Publication No. 2015-184506 are disclosed as related art.

SUMMARY

According to an aspect of the embodiments, an optical modulator includes: an encoder that encodes an input data signal; a branch circuit that branches an optical signal into a first optical signal and a second optical signal; a first arm through which the first optical signal branched at the branch circuit passes; a first phase shifter group that is arranged on the first upper arm for each bit digit of a bit string of the data signal output from the encoder, and adjusts a phase shift amount of the first optical signal that passes through the first arm according to a bit value for each bit digit; a second arm through which the second optical signal branched at the branch circuit passes; a second phase shifter group that is arranged on the second arm for each bit digit, and adjusts a phase shift amount of the second optical signal that passes through the second arm according to a bit value for each bit digit such that a sign of the phase shift amount of the second optical signal becomes opposite to a sign of the phase shift amount of the first optical signal; and a multiplexing circuit that multiplexes the first optical signal after phase shift adjustment by using the first phase shifter group and the second optical signal after phase shift adjustment by using the second phase shifter group, and outputs an optical modulation signal, wherein the encoder encodes, in a state where electrode lengths of the first phase shifter group and the second phase shifter group are set to predetermined lengths predetermined by intervals of intensities of symbol points of the optical modulation signal, the input data signal into a bit string in which the number of bits to be 1 increases or decreases according to the intensities of the symbol points of the optical modulation signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory diagram illustrating an example of a correspondence between an input and an output of an encoder for 3 bits;

FIG. 16 is an explanatory diagram illustrating an example of a correspondence between an input and an output of an encoder for 3 bits;

FIG. 19 is an explanatory diagram illustrating an example of a correspondence between an input and an output of an encoder for 4 bits;

FIG. 22 is an explanatory diagram illustrating an example of a correspondence between an input and an output of an encoder for 5 bits;

FIG. 23A is an explanatory diagram illustrating an example of a correspondence (symbol mapping) between a signal level of the encoder for 5 bits and a modulation input code;

FIG. 23B is an explanatory diagram illustrating an example of a creation rule of the symbol mapping illustrated in FIG. 23A;

FIG. 25B is an explanatory diagram illustrating an example of a creation rule of the symbol mapping illustrated in FIG. 25A;

FIG. 27 is an explanatory diagram illustrating an example of a correspondence between an input and an output of each of a first encoder and second encoder for 3 bits;

FIG. 30 is an explanatory diagram illustrating an example of a correspondence between an input and an output of each of a first encoder and second encoder for 4 bits;

FIG. 33 is an explanatory diagram illustrating an example of a correspondence between an input and an output of each of a first encoder and second encoder for 5 bits;

FIG. 36 is an explanatory diagram illustrating an example of a correspondence between an input and an output of each of a first encoder and third encoder for 3 bits;

DESCRIPTION OF EMBODIMENTS

Figure 1:
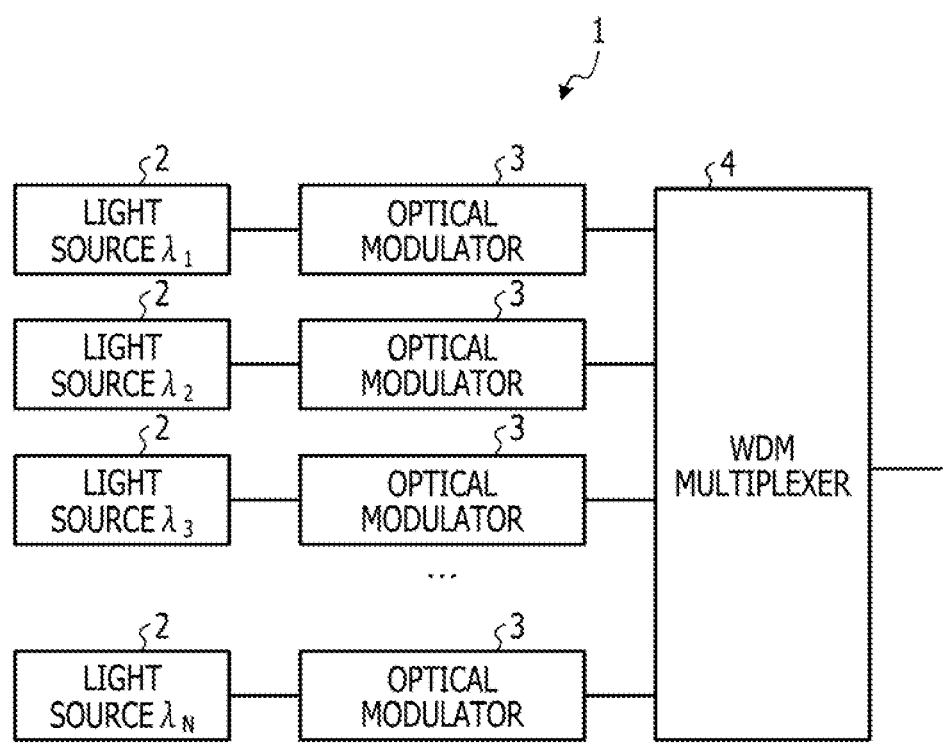
FIG. 1 is a block diagram illustrating an example of a configuration of an optical transmitter according to the present embodiment.

The optical waveguide 103 includes an input unit 111, a branch unit 112, a multiplexing unit 113, and an output unit 114. The input unit 111 inputs an optical signal from a light source. The branch unit 112 branches an optical signal from the input unit 111 to each of the arms 104. The two arms 104 are, for example, an MZ interferometer including an upper arm 104A and a lower arm 104B, for example.

The upper arm 104A converts a gray code of a data signal into a binary number, and converts the gray code after the binary conversion into an analog signal. The upper arm 104A performs intensity modulation of an optical signal from the light source with a data signal of the gray code after the analog conversion, and outputs a horizontally polarized optical modulation signal after the intensity modulation. The lower arm 104B converts a gray code of a data signal into a binary number, and converts the gray code after the binary conversion into an analog signal. The lower arm 104B performs intensity modulation of an optical signal from the light source with a data signal of the gray code after the analog conversion, and outputs a vertically polarized optical modulation signal after the intensity modulation. Note that, since the data signal is, for example, a 3-bit digital signal, each of the arms 104 outputs an 8-value optical modulation signal having a signal level 1 to a signal level 8.

The multiplexing unit 113 multiplexes a horizontally polarized optical modulation signal from the upper arm 104A and a vertically polarized optical modulation signal from the lower arm 104B. The output unit 114 outputs an optical modulation signal after multiplexing by the multiplexing unit 113.

The upper arm 104A includes a plurality of phase shifters 105 connected in series, for example, an eleventh phase shifter 105A, a twelfth phase shifter 105B, and a thirteenth phase shifter 105C. The lower arm 104B also includes a plurality of phase shifters 105 connected in series, for example, an eleventh phase shifter 105A, a twelfth phase shifter 105B, and a thirteenth phase shifter 105C. Note that the eleventh phase shifter 105A of the upper arm 104A and the eleventh phase shifter 105A of the lower arm 104B have the same electrode length $L_{11}$, and the twelfth phase shifter 105B of the upper arm 104A and the twelfth phase shifter 105B of the lower arm 104B have the same electrode length $L_{12}$. The thirteenth phase shifter 105C of the upper arm 104A and the thirteenth phase shifter 105C of the lower arm 104B have the same electrode length $L_{13}$. Note that a ratio of the electrode lengths $L_{11}:L_{12}:L_{13}$ is, for example, 20:21:22.

The eleventh phase shifter 105A of the upper arm 104A performs intensity modulation of an optical signal with a first bit value $b_{11}$ in a data signal, whereas the eleventh phase shifter 105A of the lower arm 104B performs intensity modulation of an optical signal with the first bit value $b_{11}$ after inversion. The twelfth phase shifter 105B of the upper arm 104A performs intensity modulation of an optical signal with a second bit value $b_{12}$ in a data signal, whereas the twelfth phase shifter 105B of the lower arm 104B performs intensity modulation of an optical signal with the second bit value $b_{12}$ after inversion. The thirteenth phase shifter 105C of the upper arm 104A performs intensity modulation of an optical signal with a third bit value $b_{13}$ in a data signal, whereas the thirteenth phase shifter 105C of the lower arm 104B performs intensity modulation of an optical signal with the third bit value $b_{13}$ after inversion.

Since a phase shift amount of the upper arm 104A is $\varphi_U = \varphi_{U0} + \varphi$ and a phase shift amount of the lower arm 104B is $\varphi_L = \varphi_{L0} - \varphi$, a phase shift amount of the two arms 104 is as indicated in (Expression 18).

$$\psi = \Phi_U - \Phi_L = \psi_0 + 2\Phi$$

$$\psi_0 \triangleq \Phi_{U0} - \Phi_{L0} \qquad \text{[Expression 18]}$$

An output of the optical modulator 100 is as indicated in (Expression 19).

$$E_{out} = \frac{E_{in}}{\sqrt{2}}(e^{i\Phi_U} + e^{i\Phi_L}) \qquad \text{[Expression 19]}$$

In addition, in a case where the output of the optical modulator 100 is assumed to be an electric field intensity, the electric field intensity is as indicated in (Expression 20).

$$E_{out}^* E_{out} = E_{in}^* E_{in} \frac{1 + \cos(\Psi_0 + 2\Phi)}{2} \qquad \text{[Expression 20]}$$

Furthermore, in a case where the output of the optical modulator 100 is an optical intensity, the optical intensity is as indicated in (Expression 21).

$$E_{out}|_{\Phi_{U0}=\Phi_{L0}=0} = \frac{E_{in}}{2}\cos\Phi \qquad \text{[Expression 21]}$$

Figure 39:
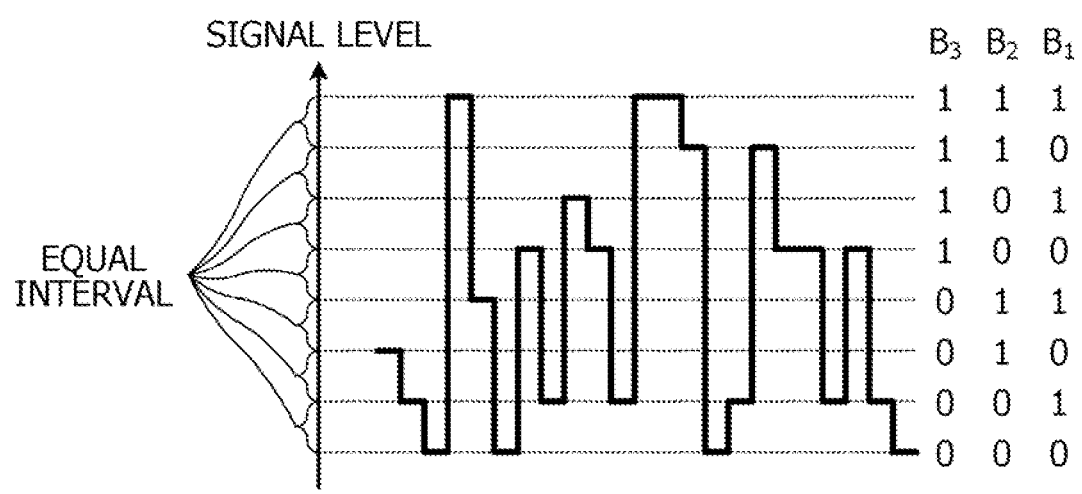
FIG. 39 is an explanatory diagram illustrating an example of a correspondence (symbol mapping) between an optical modulation signal of the conventional optical modulator and a signal level (a gray code after binary conversion)

FIG. 39 is an explanatory diagram illustrating an example of a correspondence (symbol mapping) between an optical modulation signal of the conventional optical modulator 100 and a signal level (a gray code after binary conversion). Note that, although a case of using a gray code for symbol mapping is assumed here, symbol mapping using other than the gray code may be used. Ideally, signal levels of the optical modulation signal are at equal intervals for each gray code after binary conversion of a data signal. In order to make the signal levels at equal intervals, it is needed to adjust a phase shift amount of each of the phase shifters 105 on each of the arms 104.

Figure 40:
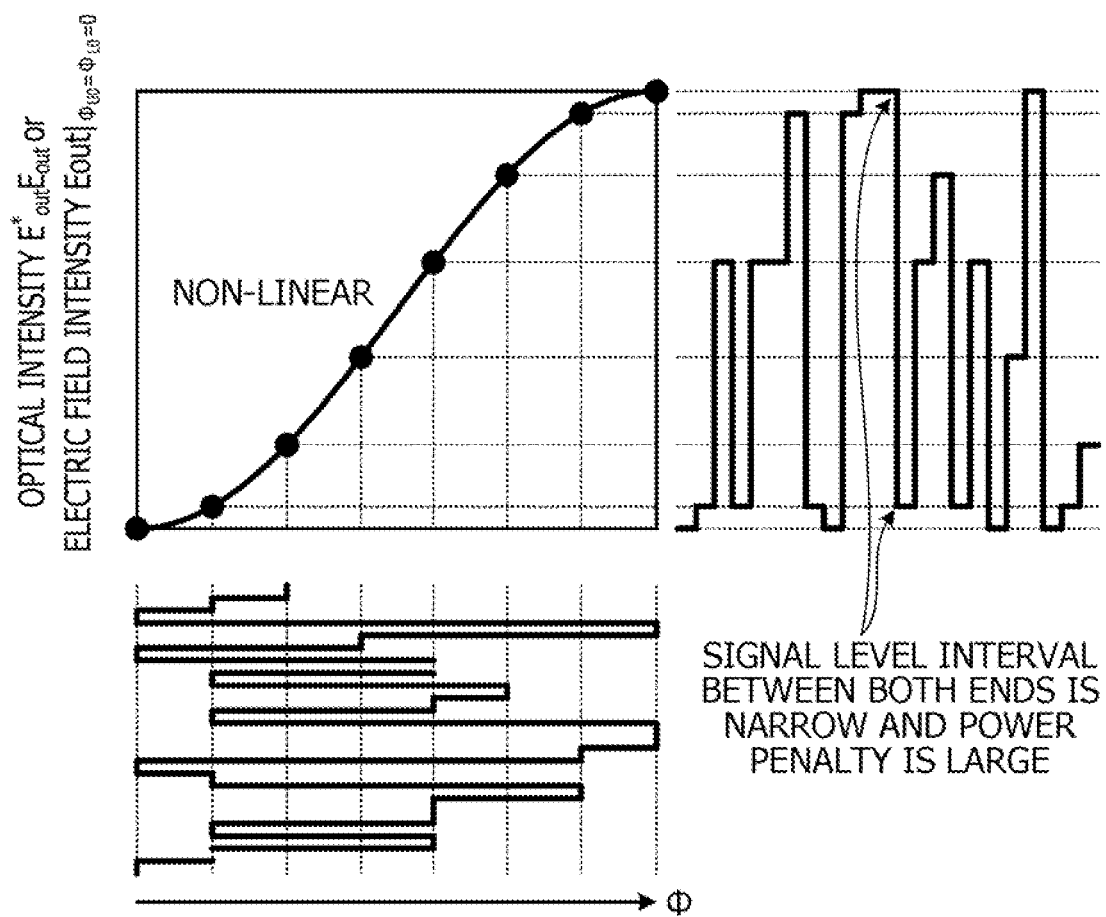
FIG. 40 is an explanatory diagram illustrating an example of a problem of the conventional optical modulator.

However, it is difficult to make the signal levels of the optical modulation signal at equal intervals for each gray code after the binary conversion of the data signal. FIG. 40 is an explanatory diagram illustrating an example of a problem of the conventional optical modulator 100. A relationship between a phase shift amount (input voltage) of the optical modulator 100 and an electric field intensity or optical intensity (modulation output) of an optical modulation signal is represented by a sine curve. Since a non-linear part of the sine curve is long, the signal levels 1 to 8 of an output of the optical modulation signal are not at equal intervals. As a result, a level interval between the signal levels at both ends, for example, the signal levels 1 and 8, becomes narrow, and thus a power penalty is generated.

Figure 41:
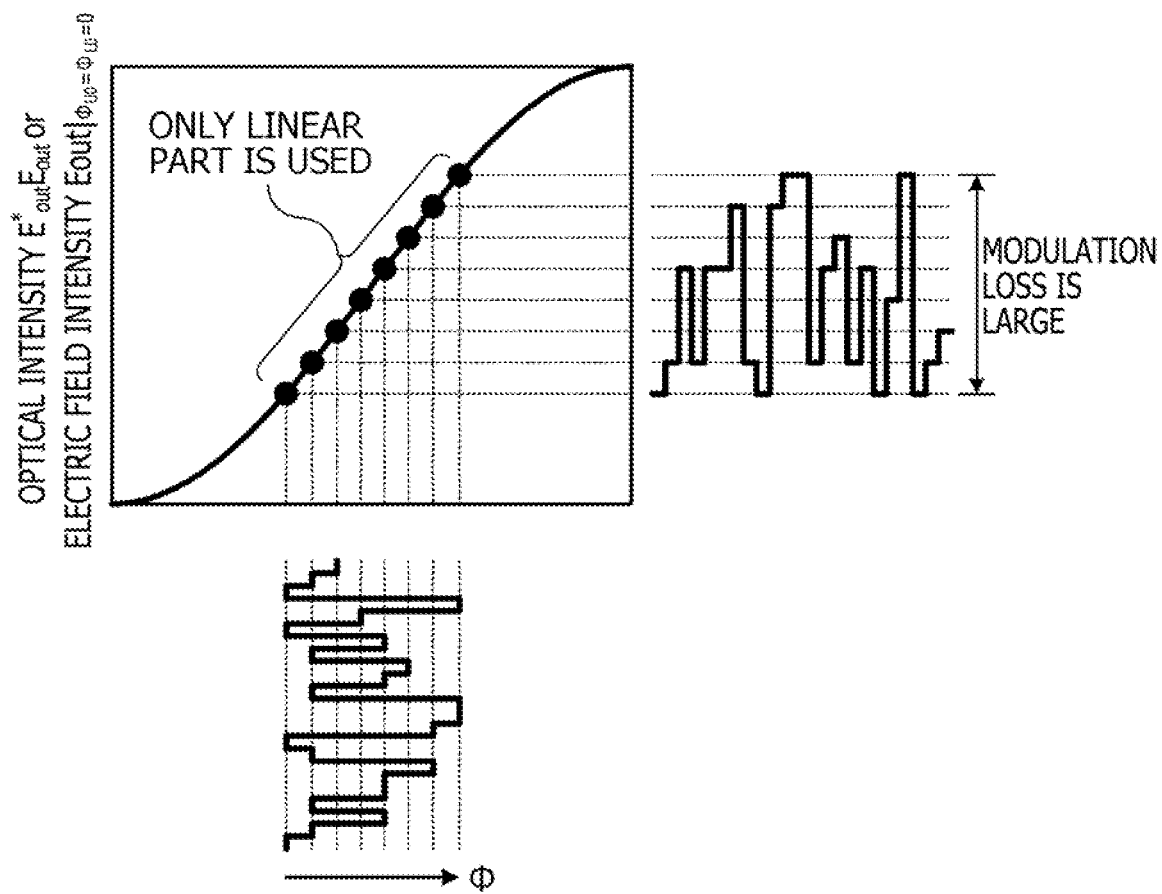
FIG. 41 is an explanatory diagram illustrating an example of a problem of the conventional optical modulator.

Thus, it is also conceivable to use only a linear part of the sine curve in order to suppress generation of the power penalty. FIG. 41 is an explanatory diagram illustrating an example of a problem of the conventional optical modulator 100. Only the linear part of the sine curve of the relationship between the phase shift amount (input voltage) of the optical modulator and the electric field intensity or optical intensity (modulation output) of the optical modulation signal is used. As a result, generation of the power penalty may be suppressed. However, since the linear part of the sine curve is short, a level interval between the signal levels of the optical modulation signal becomes short and a modulation loss becomes large.

Furthermore, in order to suppress the generation of the power penalty, the number of phase shifters 105 connected in series on the two arms 104 in the optical modulator 100 is increased. By increasing the number of phase shifters 105, it is also conceivable to lengthen the linear part of the sine curve indicating the relationship between the phase shift amount (input voltage) of the optical modulator and the electric field intensity or optical intensity of the optical modulation signal.

Figure 42:
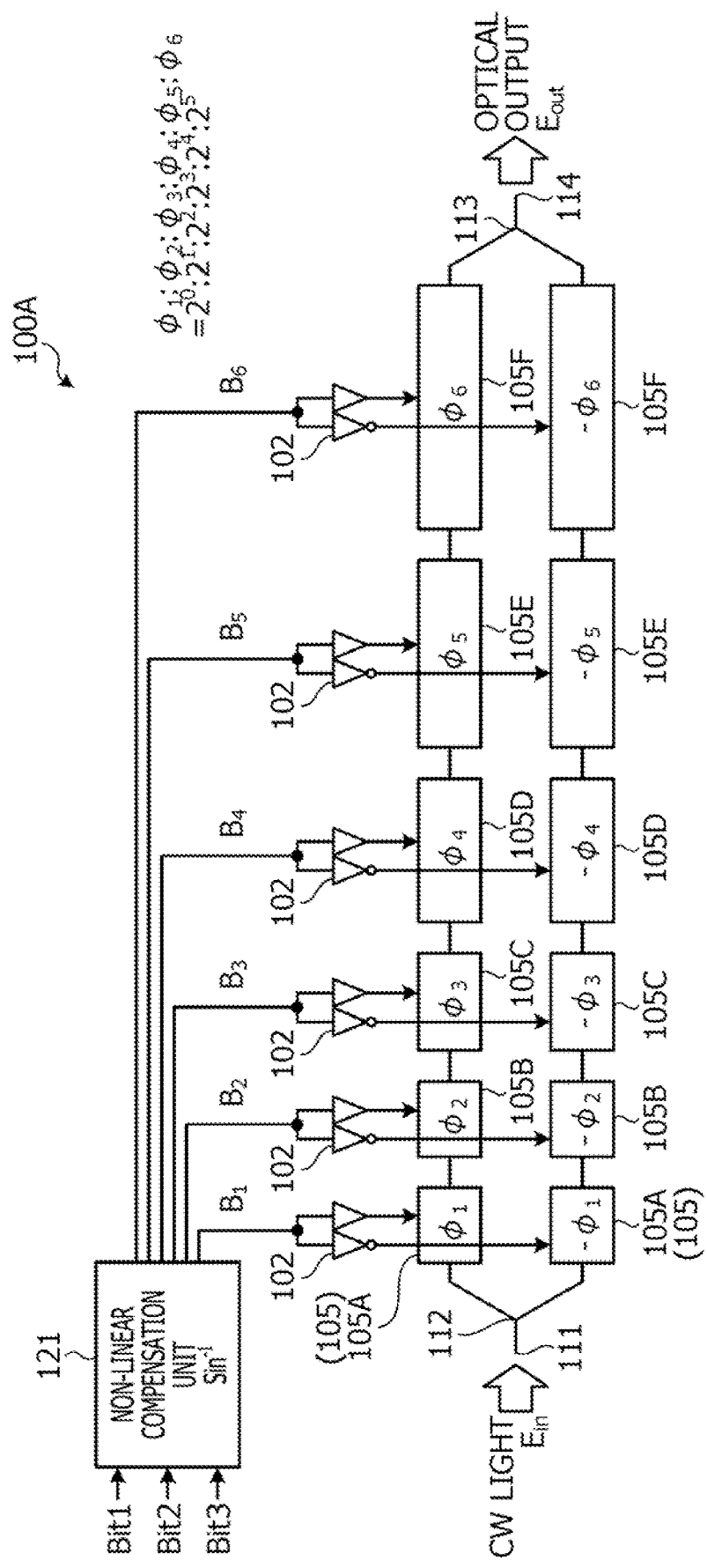
FIG. 42 is a schematic plan view illustrating an example of a configuration of a conventional optical modulator.

FIG. 42 is a schematic plan view illustrating an example of a configuration of a conventional optical modulator 100A. The optical modulator 100A includes a non-linear compensation unit 121. An upper arm 104A in the optical modulator 100A connects six phase shifters 105 in series, and a lower arm 104B in the optical modulator 100A connects six phase shifters 105 in series. Note that eleventh phase shifters 105A of the upper arm 104A and the lower arm 104B have the same electrode length $L_{11}$, and twelfth phase shifters 105B of the upper arm 104A and the lower arm 104B have the same electrode length $L_{12}$. Thirteenth phase shifters 105C of the upper arm 104A and the lower arm 104B have the same electrode length $L_{13}$. Fourteenth phase shifters 105D of the upper arm 104A and the lower arm 104B have the same electrode length $L_{14}$, and fifteenth phase shifters 105E of the upper arm 104A and the lower arm 104B have the same electrode length $L_{15}$. Sixteenth phase shifters 105F of the upper arm 104A and the lower arm 104B have the same electrode length $L_{16}$. The non-linear compensation unit 121 converts a gray code of a 3-bit data signal into a binary number, and converts the gray code after the binary conversion into a gray code of a 6-bit data signal. The non-linear compensation unit 121 applies an input voltage corresponding to a data signal of each bit to each of the phase shifters 105.

Figure 38:
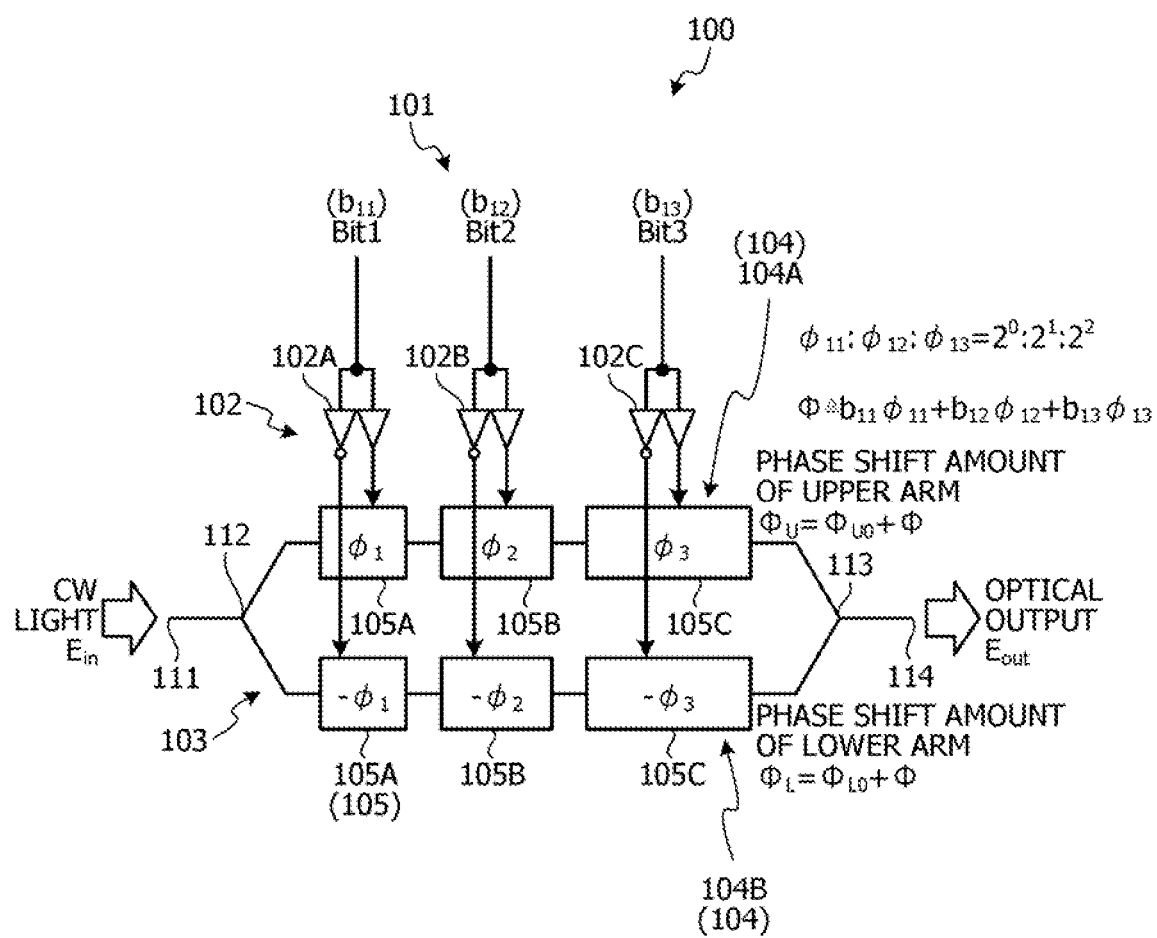
FIG. 38 is a schematic plan view illustrating an example of a configuration of a conventional optical modulator.
Figure 43:
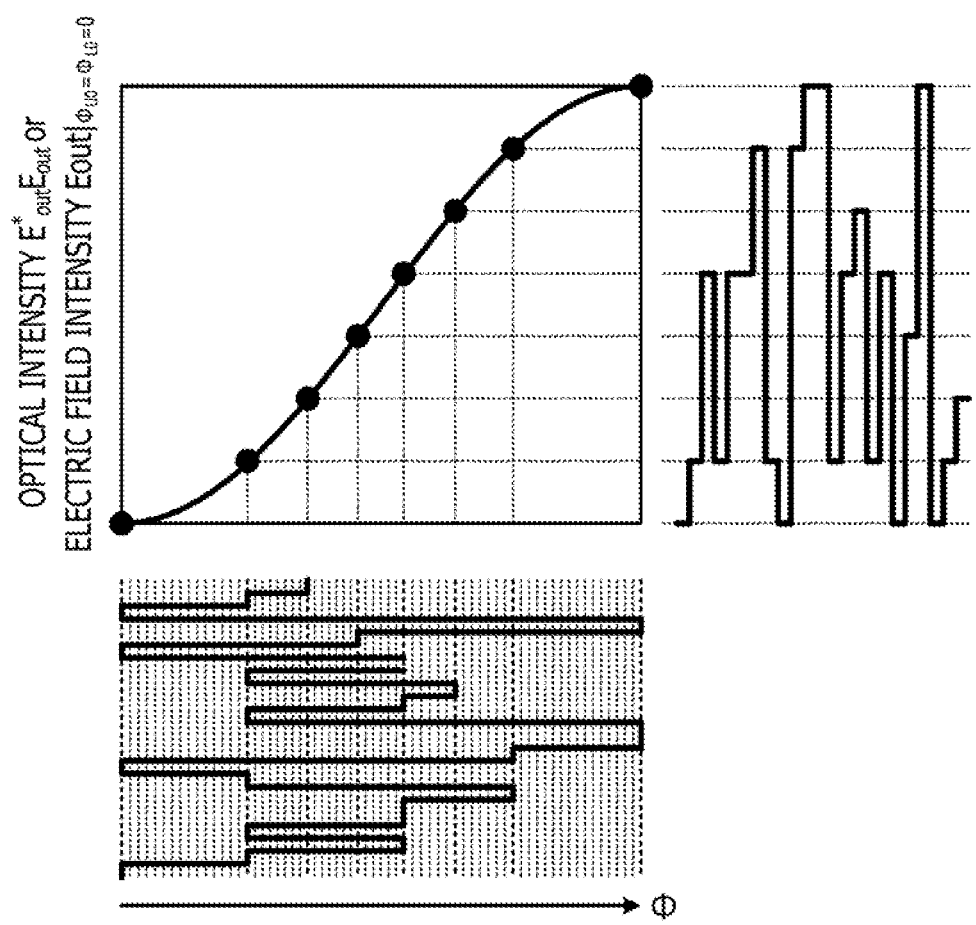
FIG. 43 is an explanatory diagram illustrating an example of a problem of the conventional optical modulator.

FIG. 43 is an explanatory diagram illustrating an example of a problem of the conventional optical modulator 100A. By increasing the number of phase shifters from three as in FIG. 38 to six as in FIG. 42, setting resolution of a phase shift amount of the optical modulator may be made finer, and the signal levels 1 to 8 of an output of an optical modulation signal may be at equal intervals. As a result, a modulation loss may be reduced.

However, a modulation loss is large in the optical modulator 100 illustrated in FIG. 41, and power consumption and the number of parts increase in the optical modulator 100A illustrated in FIG. 42 since the number of phase shifters 105 connected in series increases. As a result, an actual situation is that there is a demand for an optical modulator that has a small modulation loss and may suppress power consumption and the number of parts while making signal level intervals equal.

The disclosed technology has been made in view of such points, and an object of the disclosed technology is to provide an optical modulator and the like capable of suppressing a modulation loss and power consumption while making signal level intervals equal.

Hereinafter, embodiments of an optical modulator and the like disclosed in the present application will be described in detail with reference to the drawings. Note that the embodiments do not limit the disclosed technology.

First Embodiment

FIG. 1 is a block diagram illustrating an example of a configuration of an optical transmitter 1 according to the present embodiment. The optical transmitter 1 illustrated in FIG. 1 includes N light sources 2, N optical modulators 3, and a wavelength division multiplexing (WDM) multiplexer 4. The N light sources 2 are, for example, a first light source 2, a second light source 2, a third light source 2, and an N-th light source 2. The first light source 2 emits, for example, an optical signal of λ1. The second light source 2 emits, for example, an optical signal of λ2. The third light source 2 emits, for example, an optical signal of λ3. The N-th light source 2 emits, for example, an optical signal of λN. Note that the optical signals of λ1 to λN are optical signals having different wavelengths. The N optical modulators 3 are, for example, a first optical modulator 3, a second optical modulator 3, a third optical modulator 3, and an N-th optical modulator 3. The first optical modulator 3 modulates an optical signal of λ1 from the first light source 2 with a data signal. The second optical modulator 3 modulates an optical signal of λ2 from the second light source 2 with a data signal. The third optical modulator 3 modulates an optical signal of λ3 from the third light source 2 with a data signal. The N-th optical modulator 3 modulates an optical signal of λN from the N-th light source 2 with a data signal.

Figure 2:
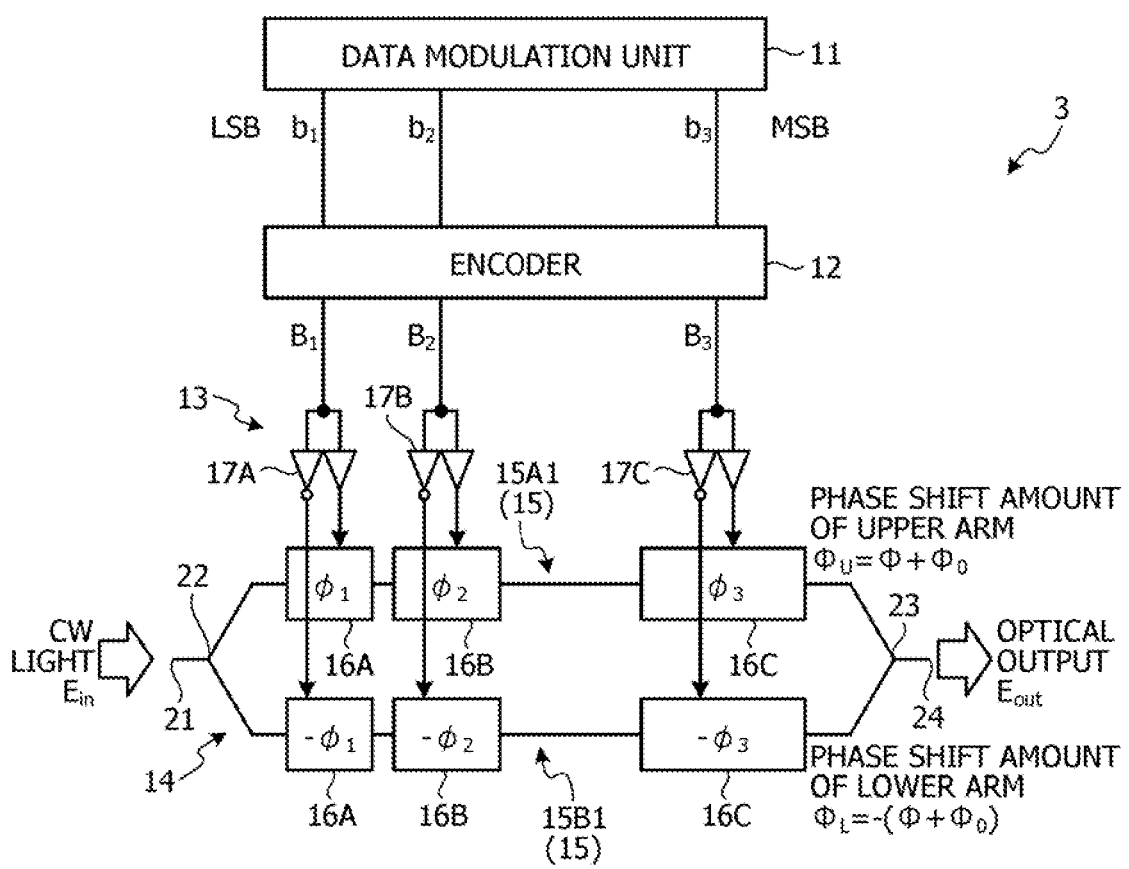
FIG. 2 is a schematic plan view illustrating an example of a configuration of an optical modulator of a first embodiment.

FIG. 2 is a schematic plan view illustrating an example of a configuration of the optical modulator 3 of the first embodiment. Each optical modulator 3 includes a data modulation unit 11, an encoder 12, a digital analogue convertor (DAC) 13, an optical waveguide 14, and two arms 15 arranged on the optical waveguide 14. The data modulation unit 11 performs modulation into, for example, a bit string data signal, which is a 3-bit digital electric input signal.

The encoder 12 converts a bit string data signal into a modulation input code. The encoder 12 converts a first bit value bi of the bit string data signal into a first bit value $B_1$ in the modulation input code. The encoder 12 converts a second bit value $b_2$ in the bit string data signal into a second bit value $B_2$ in the modulation input code. The encoder 12 converts a third bit value $b_3$ in the bit string data signal into a third bit value $B_3$ in the modulation input code.

FIG. 3 is an explanatory diagram illustrating an example of a correspondence between an input and an output of the encoder 12 for 3 bits. As illustrated in FIG. 3, the encoder 12 converts a gray code "$b_3b_2b_1$" of a data signal into a modulation input code "$B_3B_2B_1$". Note that the gray code is a code used when a phase shift amount of each phase shifter is adjusted. In a case where the gray code is "100", the encoder 12 converts the gray code "100" into a modulation input code "111". In a case where the gray code is "001", the encoder 12 converts the gray code "001" into a modulation input code "001". In a case where the gray code is "011", the encoder 12 converts the gray code "011" into a modulation input code "010". In a case where the gray code is "010", the encoder 12 converts the gray code "010" into a modulation input code "100". In a case where the gray code is "110", the encoder 12 converts the gray code "110" into a modulation input code "011". In a case where the gray code is "111", the encoder 12 converts the gray code "111" into a modulation input code "101". In a case where the gray code is "101", the encoder 12 converts the gray code "101" into a modulation input code "110". In a case where the gray code is "100", the encoder 12 converts the gray code "100" into a modulation input code "111".

Figure 4A:
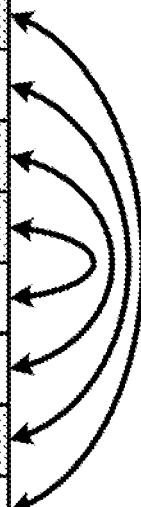
FIG. 4A is an explanatory diagram illustrating an example of a correspondence (symbol mapping) between a signal level of the encoder for 3 bits and a modulation input code.

FIG. 4A is an explanatory diagram illustrating an example of a correspondence between a signal level of the encoder 12 for 3 bits and a modulation input code. In FIG. 4A, it is assumed that the signal level is "1" in a case where the modulation input code "$B_3B_2B_1$" is "000", the signal level is "2" in a case where the modulation input code is "001", and the signal level is "3" in a case where the modulation input code is "010". It is assumed that the signal level is "4" in a case where the modulation input code is "100", the signal level is "5" in a case where the modulation input code is "011", and the signal level is "6" in a case where the modulation input code is "101". It is assumed that the signal level is "7" in a case where the modulation input code is "110", and the signal level is "8" in a case where the modulation input code is "111".

The number of "1" in the modulation input code "$B_3B_2B_1$" is focused. The signal level is "1" in a case where the number of bit values "1" is 0, and the signal levels are "2", "3", and "4" in a case where the number of bit values "1" is 1. The signal levels are "5", "6", and "7" in a case where the number of bit values "1" is 2, and the signal level is "8" in a case where the number of bit values "1" is 3. Bit strings in which the number of bit values "1" is 2 have bit configurations in which "1" and "0" are inverted and horizontally inverted when the bit strings are arranged in order from the smallest N-digit binary number. Bit strings in which the number of bit values "1" is 1 have bit configurations in which "1" and "0" are inverted and horizontally inverted when the bit strings are arranged in order from the smallest N-digit binary number.

In addition, the bit configurations in the modulation input code "$B_3B_2B_1$" of the signal levels "1" and "8" are symmetrical in which "0" and "1" are inverted, and the bit configurations in the modulation input code "$B_3B_2B_1$" of the signal levels "2" and "7" are also symmetrical. The bit configurations in the modulation input code "$B_3B_2B_1$" of the signal levels "3" and "6" are also symmetrical, and the bit configurations in the modulation input code "$B_3B_2B_1$" of the signal levels "4" and "5" are also symmetrical.

In order to obtain a correspondence between an increase in the signal level and an increase in the phase shift amount, as a prerequisite for lengths of $B_1$, $B_2$, and $B_3$, it is assumed that a relationship of the length of $B_1$<the length of $B_2$<the length of $B_3$<the length of $B_1+B_2$ is ensured. Note that the length of $B_1$ is an electrode length of a first phase shifter 16A, the length of $B_2$ is an electrode length of a second phase shifter 16B, and the length of $B_3$ is an electrode length of a third phase shifter 16C. As a result, the correspondence between an increase in the signal level and an increase in the phase shift amount may be directly obtained from the signal level "1" to the signal level "4". Furthermore, the correspondence between an increase in the signal level and an increase in the phase shift amount may be also obtained from the signal level "5" to the signal level "8", because signs of the signal level "1" to the signal level "4" are inverted by folding back.

Figure 4B:
FIG. 4B is an explanatory diagram illustrating an example of a creation rule of the symbol mapping illustrated in FIG. 4A.
Figure 4B:

FIG. 4B is an explanatory diagram illustrating an example of a creation rule of the symbol mapping illustrated in FIG. 4A. Note that, for convenience of description, it is assumed that the number of bits N of the modulation input code in the symbol mapping is N=3 bits. As the creation rule, N-digit binary numbers in which the number of bit values "1" is N−1 (for example, "2") are arranged from the smallest, and N-digit binary numbers in which the number of bit values "1" is N−2 (for example, "1") are arranged from the smallest.

Moreover, as the creation rule, "1" and "0" in the N-digit binary numbers in which the number of bit values "1" is N−1 (for example, "2") after the rearrangement are inverted, and "1" and "0" in the N-digit binary numbers in which the number of bit values "1" is N−2 (for example, "1") after the rearrangement are inverted.

Moreover, as the creation rule, the N-digit binary numbers in which the number of bit values "1" is N−1 (for example, "2") after the inversion are horizontally inverted, and the N-digit binary numbers in which the number of bit values "1" is N−2 (for example, "1") after the inversion are horizontally inverted. Then, the symbol mapping illustrated in FIG. 4A conforming to these creation rules may be created.

Figure 5:
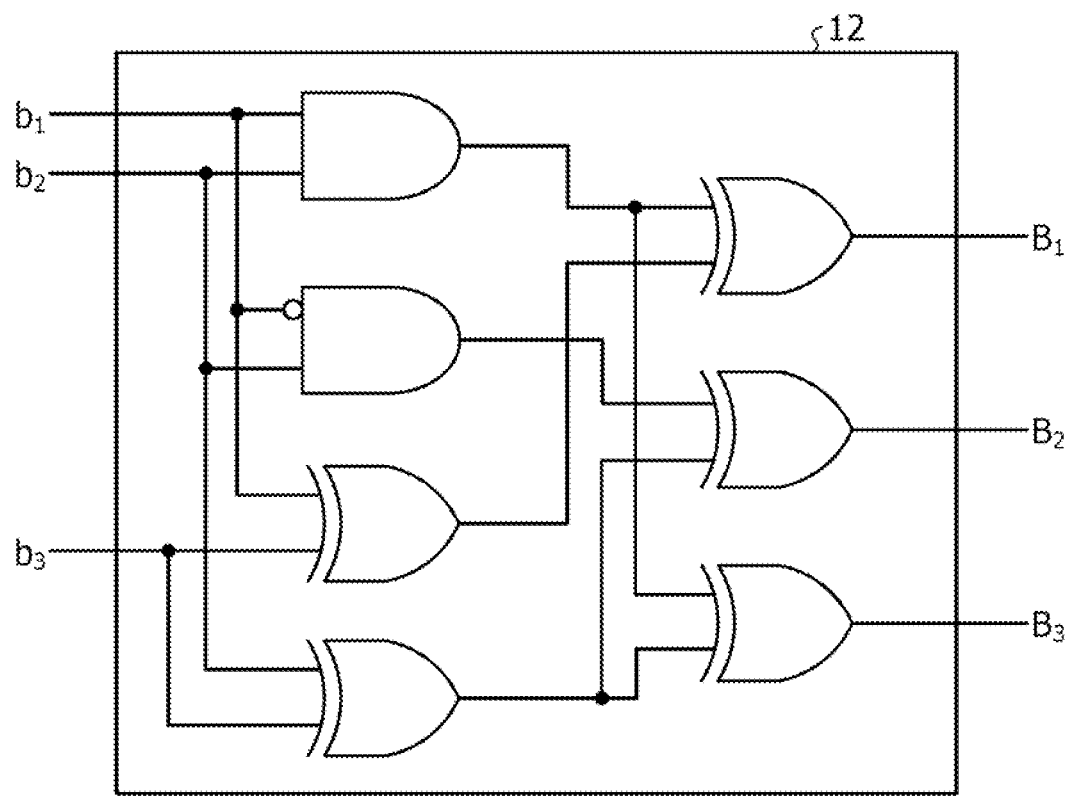
FIG. 5 is an explanatory diagram illustrating an example of a configuration of a logic circuit of the encoder.

FIG. 5 is an explanatory diagram illustrating an example of a configuration of a logic circuit of the encoder 12. The encoder 12 illustrated in FIG. 5 includes two AND circuits and five XOR circuits, and in a case where a data signal (gray code) "$b_3b_2b_1$" is input, converts the data signal (gray code) "$b_3b_2b_1$" into a modulation input code "$B_3B_2B_1$" corresponding to the correspondence illustrated in FIG. 3.

The DAC 13 converts a modulation input code of a data signal from the encoder 12 into an analog signal, for example, into a voltage. Since the DAC 13 is a 3-bit DAC, the DAC 13 includes three voltage conversion units, for example, a first voltage conversion unit 17A, a second voltage conversion unit 17B, and a third voltage conversion unit 17C. The first voltage conversion unit 17A converts a data signal of the first bit value $B_1$ of the modulation input code from the encoder 12 into a voltage. The second voltage conversion unit 17B converts a data signal of the second bit value $B_2$ of the modulation input code from the encoder 12 into a voltage. The third voltage conversion unit 17C converts a data signal of the third bit value $B_3$ of the modulation input code from the encoder 12 into a voltage.

The optical waveguide 14 includes an input unit 21, a branch unit 22, a multiplexing unit 23, and an output unit 24. The input unit 21 inputs an optical signal (continuous wave (CW) light) from a light source 2. The branch unit 22 branches an optical signal from the input unit 21 to each of the arms 15. The two arms 15 are, for example, a Mach-Zehnder (MZ) interferometer including an upper arm 15A1 and a lower arm 151B, for example.

The upper arm 15A1 performs intensity modulation of an optical signal from the light source 2 with a data signal after analog conversion, and outputs a horizontally polarized optical modulation signal after the intensity modulation. The lower arm 15B1 performs intensity modulation of an optical signal from the light source 2 with a data signal after analog conversion, and outputs a vertically polarized optical modulation signal after the intensity modulation. Note that, since the data signal is a 3-bit digital signal, each of the arms 15 outputs an 8-value optical modulation signal having the signal level 1 to the signal level 8.

The upper arm 15A1 includes a first phase shifter group, which is a plurality of phase shifters connected in series, for example, a first phase shifter 16A, a second phase shifter 16B, and a third phase shifter 16C. The lower arm 15B1 includes a second phase shifter group, which is also a plurality of phase shifters connected in series, for example, a first phase shifter 16A, a second phase shifter 16B, and a third phase shifter 16C. Note that the first phase shifters 16A of the upper arm 15A1 and the lower arm 15B1 have the same electrode length $L_1$, and the second phase shifters 16B of the upper arm 15A1 and the lower arm 15B1 have the same electrode length $L_2$. Moreover, the third phase shifters 16C of the upper arm 15A1 and the lower arm 15B1 have the same electrode length $L_3$.

The first voltage conversion unit 17A applies the data signal of the first bit value $B_1$ after the voltage conversion to an electrode of the first phase shifter 16A of the upper arm 15A1. The first voltage conversion unit 17A inverts the data signal of the first bit value $B_1$ after the voltage conversion, and applies the data signal of the first bit value $B_1$ after the inversion to an electrode of the first phase shifter 16A of the lower arm 15B1. The second voltage conversion unit 17B applies the data signal of the second bit value $B_2$ after the voltage conversion to an electrode of the second phase shifter 16B of the upper arm 15A1. The second voltage conversion unit 17B inverts the data signal of the second bit value $B_2$ after the voltage conversion, and applies the data signal of the second bit value $B_2$ after the inversion to an electrode of the second phase shifter 16B of the lower arm 15B1. The third voltage conversion unit 17C applies the data signal of the third bit value $B_3$ after the voltage conversion to an electrode of the third phase shifter 16C of the upper arm 15A1. The third voltage conversion unit 17C inverts the data signal of the third bit value $B_3$ after the voltage conversion, and applies the data signal of the third bit value $B_3$ after the inversion to an electrode of the third phase shifter 16C of the lower arm 15B1.

Figure 6:
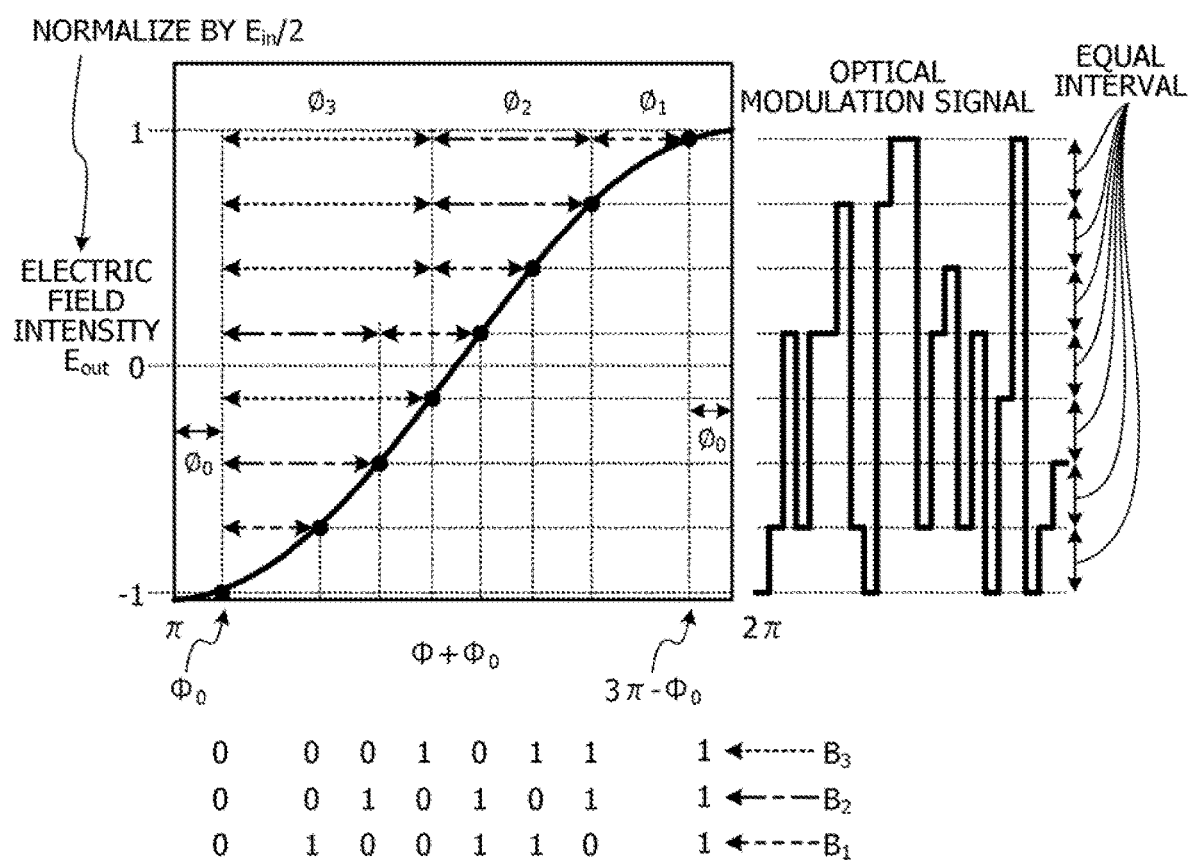
FIG. 6 is an explanatory diagram illustrating a correspondence between an electric field intensity of an optical modulation signal and a phase shift amount of the optical modulator.

FIG. 6 is an explanatory diagram illustrating an example of a correspondence between an electric field intensity of an optical modulation signal and a phase shift amount of the optical modulator 3. In a case where the first bit value "$B_1$" of the modulation input code is "1", a data signal is applied to the first phase shifter 16A to add a phase shift amount φ1 to a phase shift amount φ0. In a case where the second bit value "$B_2$" of the modulation input code is "1", a data signal is applied to the second phase shifter 16B to add a phase shift amount φ2 to the phase shift amount φ0. In a case where the third bit value "$B_3$" of the modulation input code is "1", a data signal is applied to the third phase shifter 16C to add a phase shift amount φ3 to the phase shift amount φ0.

A phase shift amount φ of the optical modulator 3 is as indicated in (Expression 1).

$$\Phi \triangleq \sum_{m=1}^{N=3} B_m \phi_m \qquad \text{[Expression 1]}$$

The phase shift amounts φ1, φ2, φ3, and φ0 of the optical modulator 3 are as indicated in (Expression 2). The phase shift amount φ1 is about 0.57 rad, the phase shift amount φ2 is about 0.91 rad, the phase shift amount φ3 is about 1.2 rad, and the phase shift amount φ0 is about 0.23 rad.

$$\phi_1 = 2\tan^{-1}\sqrt{\frac{3}{35}} \sim 0.57 \text{rad} \qquad \text{[Expression 2]}$$

-continued $$\phi_2 = 2\tan^{-1}\sqrt{\frac{5}{21}} \sim 0.91 \text{rad}$$

$$\phi_3 = 2\tan^{-1}\sqrt{\frac{7}{15}} \sim 1.2 \text{rad}$$

$$\phi_0 = \frac{\pi}{2} - \frac{\phi_1 + \phi_2 + \phi_3}{2} \sim 0.23 \text{rad}$$

In a case where the modulation input code "$B_3B_2B_1$" is "000", the phase shift amount is φ0, so the electric field intensity is equivalent to the signal level "1". In a case where the modulation input code "$B_3B_2B_1$" is "001", the phase shift amount is φ0+φ1, so the electric field intensity is equivalent to the signal level "2". In a case where the modulation input code "$B_3B_2B_1$" is "010", the phase shift amount is φ0+φ2, so the electric field intensity is equivalent to the signal level "3". In a case where the modulation input code "$B_3B_2B_1$" is "100", the phase shift amount is φ0+φ3, so the electric field intensity is equivalent to the signal level "4".

In a case where the modulation input code "$B_3B_2B_1$" is "011", the phase shift amount is φ0+φ1+φ2, so the electric field intensity is equivalent to the signal level "5". In a case where the modulation input code "$B_3B_2B_1$" is "101", the phase shift amount is φ0+φ1+φ3, so the electric field intensity is equivalent to the signal level "6". In a case where the modulation input code "$B_3B_2B_1$" is "110", the phase shift amount is φ0+φ2+φ3, so the electric field intensity is equivalent to the signal level "7". In a case where the modulation input code "$B_3B_2B_1$" is "111", the phase shift amount is φ0+φ1+φ2+φ3, so the electric field intensity is equivalent to the signal level "8".

The electric field intensity of the optical modulator 3 is as indicated in (Expression 3).

$$E_{out} = \frac{E_{in}}{2}(e^{i\Phi_U} + e^{i\Phi_L}) = \frac{E_{in}}{2}\cos(\Phi + \Phi_0)\Phi \quad \text{[Expression 3]}$$

Figure 7:
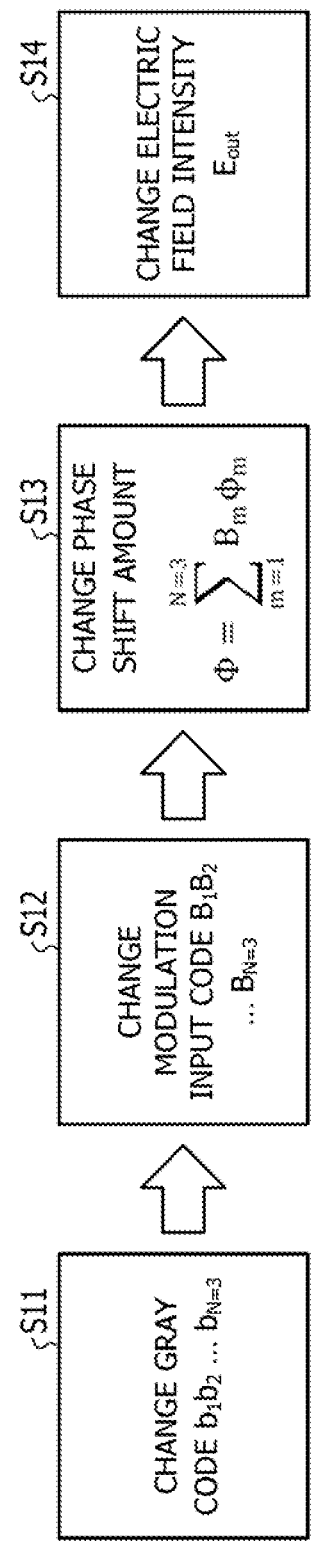
FIG. 7 is an explanatory diagram illustrating an example of a setting operation of the optical modulator.

FIG. 7 is an explanatory diagram illustrating an example of a setting operation of the optical modulator 3. The data modulation unit 11 of the optical modulator 3 changes a gray code (Step S11). In a case where the gray code is input, the encoder 12 of the optical modulator 3 converts the gray code into a modulation input code according to the correspondence illustrated in FIG. 3 (Step S12). The DAC 13 of the optical modulator 3 adjusts a phase shift amount of each of the arms 15 according to the modulation input code (Step S13). Then, an electric field intensity of an optical modulation signal of the optical modulator 3 changes according to the adjustment of the phase shift amount of each of the arms 15 (Step S14).

In the optical modulator 3, a ratio of the electrode length $L_1$ of the first phase shifter 16A, the electrode length $L_2$ of the second phase shifter 16B, and the electrode length $L_3$ of the third phase shifter 16C is set to, for example, $L_1:L_2:L_3=21:34:45$ so as to make the electric field intensities for the respective signal levels (1 to 8) at equal intervals. As a result, since the electric field intensities for the respective signal levels (1 to 8) are at equal intervals, a linear part of a sine curve, which represents the correspondence between the electric field intensity of the optical modulation signal and the phase shift amount, may be sufficiently ensured.

The first phase shifter 16A of the upper arm 15A1 performs intensity modulation of an optical signal with the data signal of the first bit value $B_1$ from the first voltage conversion unit 17A. Furthermore, the first phase shifter 16A of the lower arm 15B1 performs intensity modulation of an optical signal with the data signal of the first bit value $B_1$ after the inversion from the first voltage conversion unit 17A. The second phase shifter 16B of the upper arm 15A1 performs intensity modulation of the optical signal with the data signal of the second bit value $B_2$ from the second voltage conversion unit 17B. Furthermore, the second phase shifter 16B of the lower arm 15B1 performs intensity modulation of the optical signal with the data signal of the second bit value $B_2$ after the inversion from the second voltage conversion unit 17B. The third phase shifter 16C of the upper arm 15A1 performs intensity modulation of the optical signal with the data signal of the third bit value $B_3$ from the third voltage conversion unit 17C. Furthermore, the third phase shifter 16C of the lower arm 15B1 performs intensity modulation of the optical signal with the data signal of the third bit value $B_3$ after the inversion from the third voltage conversion unit 17C.

The first phase shifter group is arranged on the upper arm (first arm) 15A1 for each bit digit of a bit string of a data signal output from the encoder 12, and adjusts a phase shift amount of an optical signal (first optical signal) passing through the upper arm 15A1 according to a bit value for each bit digit. The second phase shifter group is arranged on the lower arm (second arm) 15B1 for each bit digit, and adjusts a phase shift amount of an optical signal (second optical signal) passing through the lower arm 15B1 according to a bit value for each bit digit so that a sign of the phase shift amount of the second optical signal becomes opposite to a sign of the phase shift amount of the first optical signal.

For example, the upper arm 15A1 performs intensity modulation of the optical signal with the data signals by using the first phase shifter 16A, the second phase shifter 16B and the third phase shifter 16C, and outputs the optical modulation signal after the intensity modulation to the multiplexing unit 23. The lower arm 15B1 performs intensity modulation of the optical signal with the data signals by using the first phase shifter 16A, the second phase shifter 16B, and the third phase shifter 16C, and outputs the optical modulation signal after the intensity modulation to the multiplexing unit 23. Then, the multiplexing unit 23 multiplexes the optical modulation signal from the upper arm 15A1 and the optical modulation signal from the lower arm 15B1, and outputs an optical modulation signal after the multiplexing to the output unit 24.

In a state where electrode lengths of the first phase shifter group and the second phase shifter group are set to lengths at which the intervals of intensities of symbol points of an optical modulation signal become equal, the encoder 12 of the first embodiment encodes an input data signal into a bit string in which the number of bits to be 1 increases or decreases according to the intensities of the symbol points of the optical modulation signal. As a result, a modulation loss and power consumption may be suppressed while making the signal level intervals (intervals of intensities) equal.

The encoder 12 encodes the input data signal into a bit string of an N-digit binary number (N=3) on the basis of a predetermined rule. As a result, the electrode length of the first phase shifter group is obtained by adding electrode lengths of the phase shifters which correspond to the N phase shifters in the first phase shifter group and in which a bit in the bit string of the N-digit binary number becomes 1. Moreover, the electrode length of the second phase shifter group is obtained by adding electrode lengths of the phase shifters which correspond to the N phase shifters in the second phase shifter group and in which a bit in the bit string of the N-digit binary number becomes 1.

In a case where the number of "1" in the bit string is the same, the encoder 12 encodes the bit string of the input data signal on the basis of a predetermined rule of rearranging the numbers of bit digits in order from the smallest, inverting signs of the numbers of bit digits after the rearrangement, and horizontally inverting the numbers of bit digits after the sign inversion. As a result, symbol mapping may be generated on the basis of the predetermined rule.

In order to make the electric field intensities for the respective signal levels (1 to 8) at equal intervals, the optical modulator 3 of the first embodiment adjusts, while converting a gray code of the data signal into a modulation input code, the electrode lengths of the phase shifters of the upper arm 15A1 and the lower arm 15B1 to which the data signal according to the modulation input code after the conversion is applied. As a result, since the linear part of the sine curve, which represents the correspondence between the electric field intensity and the phase shift amount, is sufficiently ensured, a modulation loss and power consumption may be suppressed while making the signal level intervals equal.

In order to make change amounts of the signal level in the sine curve at equal intervals, the optical modulator 3 rearranges the bit strings of gray codes into the bit strings of modulation input codes in which the number of "1" in the bit string is in an ascending order, and adjusts and sets the electrode length of each phase shifter for each bit digit. As a result, since the linear part of the sine curve, which represents the correspondence between the electric field intensity and the phase shift amount, is sufficiently ensured, a modulation loss and power consumption may be suppressed while making the signal level intervals equal.

The optical modulator 3 sequentially rearranges the bit strings of the gray codes into the bit strings of the modulation input codes in which the numbers of bit digits are in ascending order in a case where the number of "1" in the bit string is the same. As a result, the bit strings of the gray codes may be rearranged into the appropriate bit strings of the modulation input codes so as to make the change amounts of the signal level at equal intervals.

The optical modulator 3 sequentially rearranges the bit strings of the gray codes into the bit strings of input codes in which the N-digit binary number conforms to a predetermined creation rule in a case where the number of "1" in an N-bit bit string is the same. As a result, the bit strings of the gray codes may be rearranged into the appropriate bit strings of the modulation input codes so as to make the change amounts of the signal level at equal intervals.

In order to make the change amounts of the signal level for each change in a bit value of the bit string of the input code in the sine curve at equal intervals, the optical modulator 3 rearranges the bit strings of the gray codes into the bit strings of the modulation input codes in which the number of "1" in the bit string is the predetermined creation rule, and adjusts the electrode length of each phase shifter for each bit digit. As a result, since the linear part of the sine curve, which represents the correspondence between the electric field intensity and the phase shift amount, is sufficiently ensured, a modulation loss and power consumption may be suppressed while making the signal level intervals equal.

Note that, for convenience of description, a case has been exemplified in which, in a state where the electrode lengths of the first phase shifter group and the second phase shifter group are set to the lengths at which the intervals of intensities of the symbol points of the optical modulation signal become equal, the encoder 12 of the first embodiment encodes the input data signal into the bit string in which the number of bits to be 1 increases or decreases according to the intensities of the symbol points of the optical modulation signal. However, the present embodiment is not limited to the state where the electrode lengths of the first phase shifter group and the second phase shifter group are set to the lengths at which the intervals of intensities of the symbol points of the optical modulation signal become equal. For example, the present embodiment may be applied also to a case where a slight error occurs in the intervals of intensities of the symbol points due to manufacturing variation or the like.

For example, in a state where the electrode lengths of the first phase shifter group and the second phase shifter group are set to predetermined lengths predetermined by the intervals of intensities of the symbol points of the optical modulation signal, the encoder 12 encodes the input data signal into the bit string in which the number of bits to be 1 increases or decreases according to the intensities of the symbol points of the optical modulation signal. Even in this case, a modulation loss and power consumption may be suppressed.

Lengths of error ranges of the intervals of intensities of the symbol points are equal within a range of ±20% or less. This is because, when the level interval becomes 60% or less, a penalty generates for power and an optical signal-to-noise ratio (OSNR), which impairs the overall advantage. For example, when the level interval becomes±20% or more, for example, a level 0 increases by +20%, and a level 1 decreases by −20% or more. As a result, the level interval becomes 100%−20%−20%=60% or less.

Note that, in the optical modulator 3 of the first embodiment, a case has been exemplified where the electric field intensity is adjusted by adjusting the phase shift amount according to the data signal. However, the optical modulator 3 may adjust the optical intensity instead of the electric field intensity, and an embodiment in such a case will be described below as a second embodiment. Note that the same reference signs are provided to the same components as those of the optical modulator 3 of the first embodiment and the description of overlapping components and operations is omitted. In the first embodiment, the phase modulation is performed, whereas in the second embodiment, the case of the intensity modulation will be described.

Second Embodiment

Figure 8:
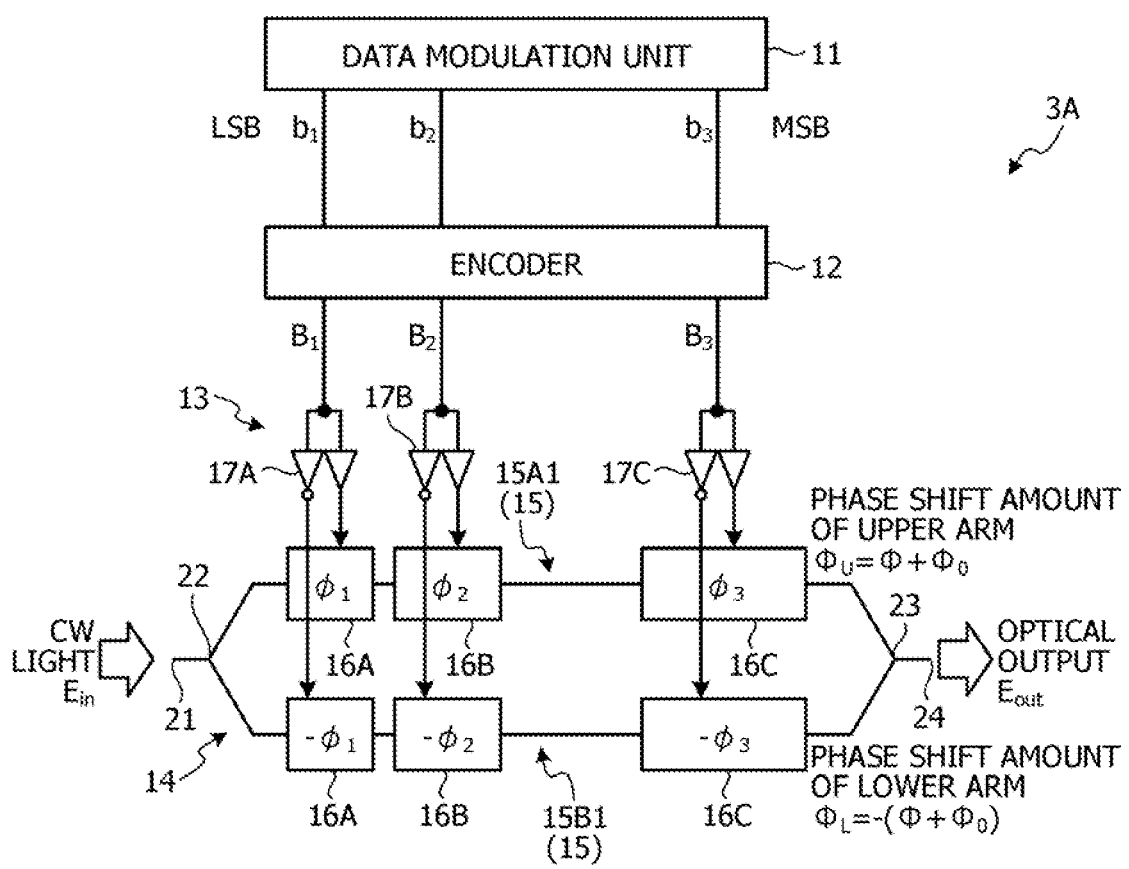
FIG. 8 is a schematic plan view illustrating an example of a configuration of an optical modulator of a second embodiment.

FIG. 8 is a schematic plan view illustrating an example of a configuration of an optical modulator 3A of the second embodiment. A first phase shifter 16A of an upper arm 15A1 performs intensity modulation of an optical signal with a data signal of a first bit value $B_1$ from a first voltage conversion unit 17A. Furthermore, a first phase shifter 16A of a lower arm 15B1 performs intensity modulation of an optical signal with the data signal of the first bit value $B_1$ after inversion from the first voltage conversion unit 17A. A second phase shifter 16B of the upper arm 15A1 performs intensity modulation of the optical signal with a data signal of a second bit value $B_2$ from a second voltage conversion unit 17B. Furthermore, a second phase shifter 16B of the lower arm 15B1 performs intensity modulation of the optical signal with the data signal of the second bit value $B_2$ after inversion from the second voltage conversion unit 17B. A third phase shifter 16C of the upper arm 15A1 performs intensity modulation of the optical signal with a data signal of a third bit value $B_3$ from a third voltage conversion unit 17C. Furthermore, a third phase shifter 16C of the lower arm 15B1 performs intensity modulation of the optical signal with the data signal of the third bit value $B_3$ after inversion from the third voltage conversion unit 17C.

Figure 9:
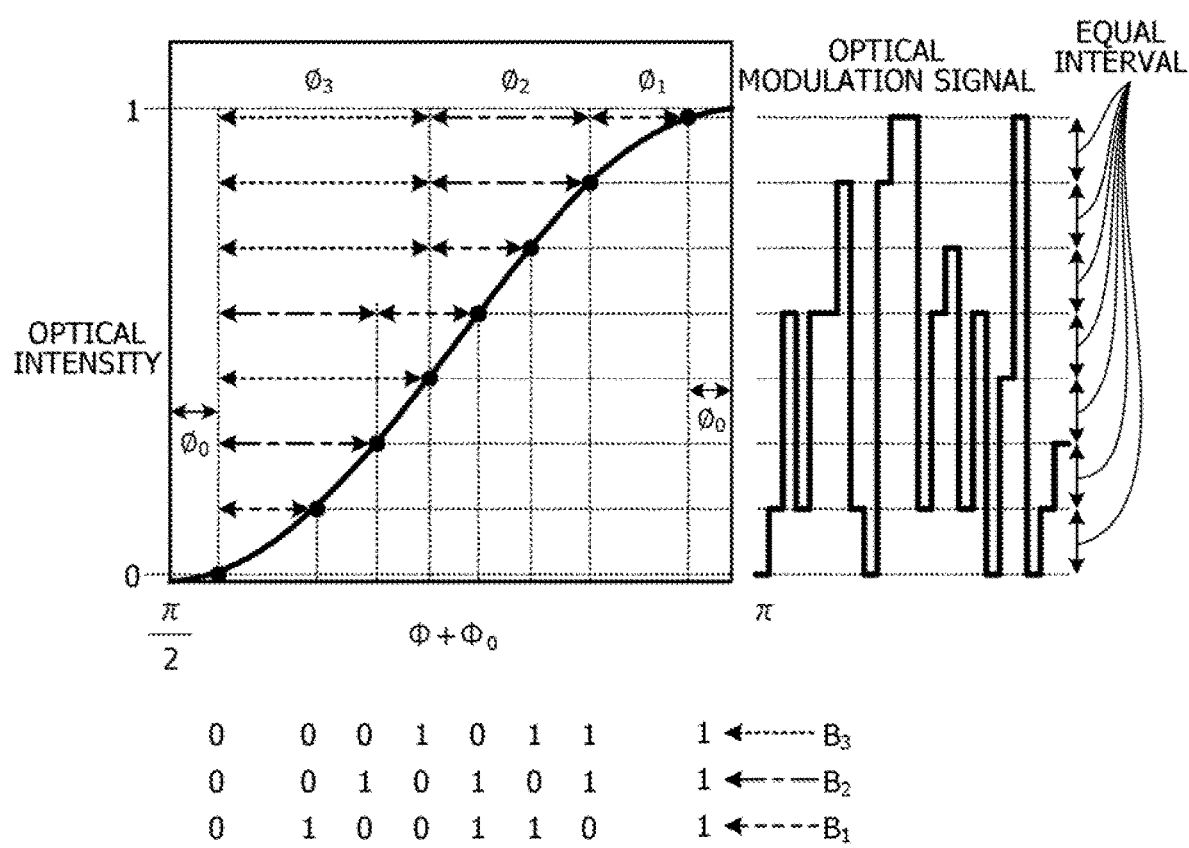
FIG. 9 is an explanatory diagram illustrating an example of a correspondence between an optical intensity of an optical modulation signal and a phase shift amount of the optical modulator.

FIG. 9 is an explanatory diagram illustrating an example of a correspondence between an optical intensity of an optical modulation signal and a phase shift amount of the optical modulator 3A. In a case where the first bit value "$B_1$" of a modulation input code is "1", a data signal is applied to the first phase shifter 16A to add a phase shift amount $\varphi 1$ to a phase shift amount $\varphi 0$. In a case where the second bit value "$B_2$" of the modulation input code is "1", a data signal is applied to the second phase shifter 16B to add a phase shift amount $\varphi 2$ to the phase shift amount $\varphi 0$. In a case where the third bit value "$B_3$" of the modulation input code is "1", a data signal is applied to the third phase shifter 16C to add a phase shift amount $\varphi 3$ to the phase shift amount $\varphi 0$.

A phase shift amount $\varphi$ of the optical modulator 3A is as indicated in (Expression 4).

$$\Phi \triangleq \sum_{m=1}^{N=3} B_m \phi_m \qquad \text{[Expression 4]}$$

The phase shift amounts $\varphi 1$, $\varphi 2$, $\varphi 3$, and $\varphi 0$ of the optical modulator 3A are as indicated in (Expression 5). The phase shift amount $\varphi 1$ is about 0.28 rad, the phase shift amount $\varphi 2$ is about 0.45 rad, the phase shift amount $\varphi 3$ is about 0.60 rad, and the phase shift amount $\varphi 0$ is about 0.12 rad.

$$\phi_1 = \tan^{-1}\sqrt{\frac{3}{35}} \sim 0.28 \text{rad} \qquad \text{[Expression 5]}$$

$$\phi_2 = \tan^{-1}\sqrt{\frac{5}{21}} \sim 0.45 \text{rad}$$

$$\phi_3 = \tan^{-1}\sqrt{\frac{7}{15}} \sim 0.60 \text{rad}$$

$$\phi_0 = \frac{\pi}{4} - \frac{\phi_1 + \phi_2 + \phi_3}{2} \sim 0.12 \text{rad}$$

In a case where the modulation input code "$B_3B_2B_1$" is "000", the phase shift amount is $\varphi 0$, so the optical intensity is equivalent to a signal level "1". In a case where the modulation input code "$B_3B_2B_1$" is "001", the phase shift amount is $\varphi 0+\varphi 1$, so the optical intensity is equivalent to a signal level "2". In a case where the modulation input code "$B_3B_2B_1$" is "010", the phase shift amount is $\varphi 0+\varphi 2$, so the optical intensity is equivalent to a signal level "3". In a case where the modulation input code "$B_3B_2B_1$" is "100", the phase shift amount is $\varphi 0+\varphi 3$, so the optical intensity is equivalent to a signal level "4".

In a case where the modulation input code "$B_3B_2B_1$" is "011", the phase shift amount is $\varphi 0+\varphi 1+\varphi 2$, so the optical intensity is equivalent to a signal level "5". In a case where the modulation input code "$B_3B_2B_1$" is "101", the phase shift amount is $\varphi 0+\varphi 1+\varphi 3$, so the optical intensity is equivalent to a signal level "6". In a case where the modulation input code "$B_3B_2B_1$" is "110", the phase shift amount is $\varphi 0+\varphi 2+\varphi 3$, so the optical intensity is equivalent to a signal level "7". In a case where the modulation input code "$B_3B_2B_1$" is "111", the phase shift amount is $\varphi 0+\varphi 1+\varphi 2+\varphi 3$, so the optical intensity is equivalent to a signal level "8".

The optical intensity of the optical modulator 3A is as indicated in (Expression 6).

$$E_{out}^* E_{out} = E_{in}^* E_{in} \frac{1 + \cos 2(\Phi + \Phi_0)}{2} \qquad \text{[Expression 6]}$$

In the optical modulator 3A, a ratio of an electrode length $L_1$ of the first phase shifter 16A, an electrode length $L_2$ of the second phase shifter 16B, and an electrode length $L_3$ of the third phase shifter 16C is set to, for example, $L_1:L_2:L_3=21:34:45$ so as to make the optical intensities for the respective signal levels (1 to 8) at equal intervals. As a result, since the optical intensities for the respective signal levels (1 to 8) are at equal intervals, a linear part of a sine curve, which represents a correspondence between the optical intensity of the optical modulation signal and the phase shift amount, may be sufficiently ensured.

For example, the upper arm 15A1 performs intensity modulation of the optical signal with the data signals by using the first phase shifter 16A, the second phase shifter 16B, and the third phase shifter 16C, and outputs the optical modulation signal after the intensity modulation to a multiplexing unit 23. The lower arm 15B1 performs intensity modulation of the optical signal with the data signals by using the first phase shifter 16A, the second phase shifter 16B, and the third phase shifter 16C, and outputs the optical modulation signal after the intensity modulation to the multiplexing unit 23. Then, the multiplexing unit 23 multiplexes the optical modulation signal from the upper arm 15A1 and the optical modulation signal from the lower arm 15B1, and outputs an optical modulation signal after the multiplexing to an output unit 24.

In order to make the optical intensities for the respective signal levels (1 to 8) at equal intervals, the optical modulator 3A of the second embodiment adjusts, while converting a gray code of the data signal into the modulation input code, the electrode lengths of the phase shifters of the upper arm 15A1 and the lower arm 15B1 to which the data signal according to the modulation input code after the conversion is applied. As a result, since the linear part of the sine curve, which represents the correspondence between the optical intensity and the phase shift amount, is sufficiently ensured, a modulation loss and power consumption may be suppressed while making the signal level intervals equal.

Note that, for convenience of description, a case has been exemplified in which, in a state where the electrode lengths of the first phase shifter group and the second phase shifter group are set to lengths at which the intervals of intensities of symbol points of the optical modulation signal become equal, an encoder 12 of the second embodiment encodes the input data signal into a bit string in which the number of bits to be 1 increases or decreases according to the intensities of the symbol points of the optical modulation signal. However, the present embodiment is not limited to the state where the electrode lengths of the first phase shifter group and the second phase shifter group are set to the lengths at which the intervals of intensities of the symbol points of the optical modulation signal become equal. For example, the present embodiment may be applied also to a case where a slight error occurs in the intervals of intensities of the symbol points due to manufacturing variation or the like. Lengths of error ranges of the intervals of intensities of the symbol points are equal within a range of ±20% or less.

For example, in a state where the electrode lengths of the first phase shifter group and the second phase shifter group are set to predetermined lengths predetermined by the intervals of intensities of the symbol points of the optical modulation signal, the encoder 12 encodes the input data signal into the bit string in which the number of bits to be 1 increases or decreases according to the intensities of the symbol points of the optical modulation signal. Even in this case, a modulation loss and power consumption may be suppressed.

Note that, although the optical modulator 3 of the first embodiment exemplifies the optical modulator 3 for 3 bits, an optical modulator for N bits may be used, and an embodiment in such a case will be described below as a third embodiment. Note that the same reference signs are provided to the same components as those of the optical modulator 3 of the first embodiment and the description of overlapping components and operations is omitted.

Third Embodiment

Figure 10:
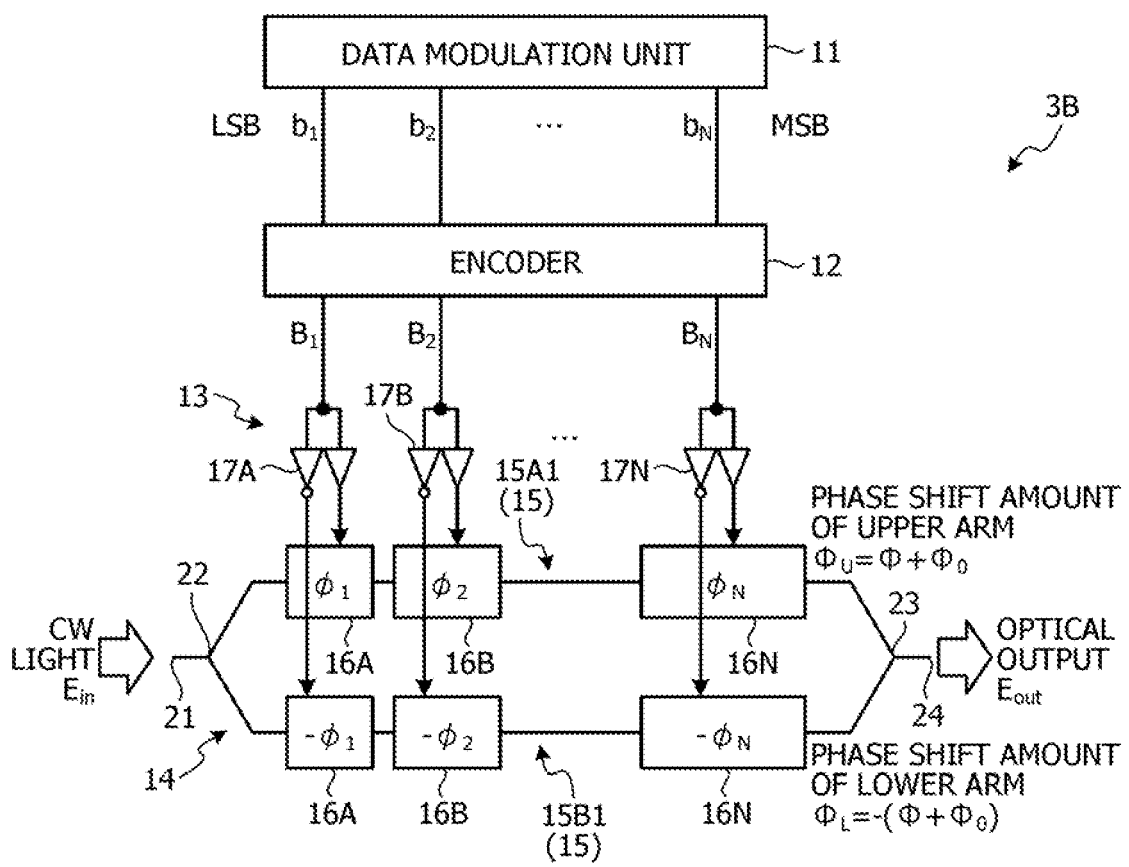
FIG. 10 is a schematic plan view illustrating an example of a configuration of an optical modulator of a third embodiment.

FIG. 10 is a schematic plan view illustrating an example of a configuration of an optical modulator 3B of the third embodiment. The optical modulator 3B illustrated in FIG. 10 includes a data modulation unit 11, an encoder 12, an upper arm 15A1, a lower arm 15B1, and N DACs 13. The data modulation unit 11 performs modulation into a bit string data signal, which is an N-bit digital electric input signal.

The encoder 12 converts a bit string data signal into a modulation input code. The encoder 12 converts a first bit value $b_1$ in the bit string data signal into a first bit value $B_i$ in the modulation input code. The encoder 12 converts a second bit value $b_2$ in the bit string data signal into a second bit value $B_2$ in the modulation input code. The encoder 12 converts an N-th bit value $bN$ in the bit string data signal into an N-th bit value $B_N$ in the modulation input code.

The upper arm 15A1 includes N phase shifters connected in series, for example, a first phase shifter 16A, a second phase shifter 16B, and an N-th phase shifter 16N. The lower arm 15B1 also includes N phase shifters connected in series, for example, a first phase shifter 16A, a second phase shifter 16B, and an N-th phase shifter 16N. Note that the first phase shifters 16A of the upper arm 15A1 and the lower arm 15B1 have the same electrode length $L_i$, and the second phase shifters 16B of the upper arm 15A1 and the lower arm 15B1 have the same electrode length $L_2$. The N-th phase shifters 16N of the upper arm 15A1 and the lower arm 15B1 have the same electrode length LN.

Since the DAC 13 is an N-bit DAC, the DAC 13 includes N voltage conversion units, for example, a first voltage conversion unit 17A, a second voltage conversion unit 17B, and an N-th voltage conversion unit 17N. The first voltage conversion unit 17A applies a data signal of the first bit value $B_1$ after voltage conversion to an electrode of the first phase shifter 16A of the upper arm 15A1. Furthermore, the first voltage conversion unit 17A inverts the data signal of the first bit value $B_1$ after the voltage conversion, and applies the data signal of the first bit value $B_1$ after the inversion to an electrode of the first phase shifter 16A of the lower arm 15B1. The second voltage conversion unit 17B applies a data signal of the second bit value $B_2$ after voltage conversion to an electrode of the second phase shifter 16B of the upper arm 15A1. Furthermore, the second voltage conversion unit 17B inverts the data signal of the second bit value $B_2$ after the voltage conversion, and applies the data signal of the second bit value $B_2$ after the inversion to an electrode of the second phase shifter 16B of the lower arm 15B1. The N-th voltage conversion unit 17N applies a data signal of the N-th bit value BN after voltage conversion to an electrode of the N-th phase shifter 16N of the upper arm 15A1. Furthermore, the N-th voltage conversion unit 17N inverts the data signal of the N-th bit value BN after the voltage conversion, and applies the data signal of the N-th bit value BN after the inversion to an electrode of the N-th phase shifter 16N of the lower arm 15B1.

A first phase shifter 16A of an upper arm 15A1 performs intensity modulation of an optical signal with a data signal of a first bit value $B_1$ from a first voltage conversion unit 17A. The first phase shifter 16A of the lower arm 15B1 performs intensity modulation of an optical signal with the data signal of the first bit value $B_1$ after the inversion from the first voltage conversion unit 17A. The second phase shifter 16B of the upper arm 15A1 performs intensity modulation of the optical signal with the data signal of the second bit value $B_2$ from the second voltage conversion unit 17B. The second phase shifter 16B of the lower arm 15B1 performs intensity modulation of the optical signal with the data signal of the second bit value $B_2$ after the inversion from the second voltage conversion unit 17B. The N-th phase shifter 16N of the upper arm 15A1 performs intensity modulation of the optical signal with the data signal of the N-th bit value BN from the N-th voltage conversion unit 17N. The N-th phase shifter 16N of the lower arm 15B1 performs intensity modulation of the optical signal with the data signal of the N-th bit value BN after the inversion from the N-th voltage conversion unit 17N. Note that, for convenience of description, a case where the N bits are 4 bits will be described.

Figure 11A:
FIG. 11A is an explanatory diagram illustrating an example of a correspondence (symbol mapping) between a signal level of an encoder for 4 bits and a modulation input code.

FIG. 11A is an explanatory diagram illustrating an example of a correspondence between a signal level of the encoder 12 for 4 bits and a modulation input code. In FIG. 11A, it is assumed that the signal level is "1" in a case where the modulation input code "$B_4B_3B_2B_1$" is "0000", and the signal level is "2" in a case where the modulation input code "$B_4B_3B_2B_1$" is "0001". It is assumed that the signal level is "3" in a case where the modulation input code "$B_4B_3B_2B_1$" is "0010", the signal level is "4" in a case where the modulation input code "$B_4B_3B_2B_1$" is "0100", and the signal level is "5" in a case where the modulation input code "$B_4B_3B_2B_1$" is "1000". It is assumed that the signal level is "6" in a case where the modulation input code "$B_4B_3B_2B_1$" is "0011", the signal level is "7" in a case where the modulation input code "$B_4B_3B_2B_1$" is "0101", and the signal level is "8" in a case where the modulation input code "$B_4B_3B_2B_1$" is "1001".

It is assumed that the signal level is "9" in a case where the modulation input code "$B_4B_3B_2B_1$" is "0110", the signal level is "10" in a case where the modulation input code "$B_4B_3B_2B_1$" is "1010", and the signal level is "11" in a case where the modulation input code "$B_4B_3B_2B_1$" is "1100". It is assumed that the signal level is "12" in a case where the modulation input code "$B_4B_3B_2B_1$" is "0111", and the signal level is "13" in a case where the modulation input code "$B_4B_3B_2B_1$" is "1011". It is assumed that the signal level is "14" in a case where the modulation input code "$B_4B_3B_2B_1$" is "1101", the signal level is "15" in a case where the modulation input code "$B_4B_3B_2B_1$" is "1110", and the signal level is "16" in a case where the modulation input code "$B_4B_3B_2B_1$" is "1111".

The number of "1" in the modulation input code "$B_4B_3B_2B_1$" is focused. The signal level is "1" in a case where the number of bit values "1" is 0, the signal levels are "2" to "5" in a case where the number of bit values "1" is 1, and the signal levels are "6" to "11" in a case where the number of bit values "1" is 2. The signal levels are "12" to "15" in a case where the number of bit values "1" is 3, and the signal level is "16" in a case where the number of bit values "1" is 4. Bit strings in which the number of bit values "1" is 3 have bit configurations in which "1" and "0" are inverted and horizontally inverted when the bit strings are arranged in order from the smallest N-digit binary number. Bit strings in which the number of bit values "1" is 2 have bit configurations in which "1" and "0" are inverted and horizontally inverted when the bit strings are arranged in order from the smallest N-digit binary number. Bit strings in which the number of bit values "1" is 1 have bit configurations in which "1" and "0" are inverted and horizontally inverted when the bit strings are arranged in order from the smallest N-digit binary number.

In addition, the bit configurations in the modulation input code "$B_4B_3B_2B_1$" of the signal levels "1" and "16" are symmetrical in which "0" and "1" are inverted, and the bit configurations in the modulation input code "$B_4B_3B_2B_1$" of the signal levels "2" and "15" are symmetrical. The bit configurations in the modulation input code "$B_4B_3B_2B_1$" of the signal levels "3" and "14" are symmetrical, and the bit configurations in the modulation input code "$B_4B_3B_2B_1$" of the signal levels "4" and "13" are symmetrical. The bit configurations in the modulation input code "$B_4B_3B_2B_1$" of the signal levels "5" and "12" are symmetrical, and the bit configurations in the modulation input code "$B_4B_3B_2B_1$" of the signal levels "6" and "11" are symmetrical. The bit configurations in the modulation input code "$B_4B_3B_2B_1$" of the signal levels "7" and "10" are symmetrical, and the bit configurations in the modulation input code "$B_4B_3B_2B_1$" of the signal levels "8" and "9" are symmetrical.

In order to obtain a correspondence between an increase in the signal level and an increase in a phase shift amount, as a prerequisite for lengths of $B_1$, $B_2$, $B_3$, and $B_4$, it is assumed that relationships of the length of $B_1$<the length of $B_2$<the length of $B_3$<the length of $B_4$<the length of $B_1+B_2$, and the length of $B_1+B_4$<the length of $B_2+B_3$ are ensured. Note that the length of $B_1$ is the electrode length of the first phase shifter 16A, the length of $B_2$ is the electrode length of the second phase shifter 16B, the length of $B_3$ is the electrode length of the third phase shifter 16C, and the length of $B_4$ is an electrode length of a fourth phase shifter 16D. As a result, the correspondence between an increase in the signal level and an increase in the phase shift amount may be directly obtained from the signal level "1" to the signal level "8". Furthermore, the correspondence between an increase in the signal level and an increase in the phase shift amount may be also obtained from the signal level "9" to the signal level "16", because signs of the signal level "1" to the signal level "8" are inverted by folding back.

Figure 11B:
FIG. 11B is an explanatory diagram illustrating an example of a creation rule of the symbol mapping illustrated in FIG. 11A.

FIG. 11B is an explanatory diagram illustrating an example of a creation rule of the symbol mapping illustrated in FIG. 11A. Note that, for convenience of description, it is assumed that the number of bits N of the modulation input code in the symbol mapping is N=4 bits. As the creation rule, N-digit binary numbers in which the number of bit values "1" is N−1 (for example, "3") are arranged from the smallest, N-digit binary numbers in which the number of bit values "1" is N−2 (for example, "2") are arranged from the smallest, and N-digit binary numbers in which the number of bit values "1" is N−3 (for example, "1") are arranged from the smallest.

Moreover, as the creation rule, "1" and "0" in the N-digit binary numbers in which the number of bit values "1" is N−1 (for example, "3") after the rearrangement are inverted, "1" and "0" in the N-digit binary numbers in which the number of bit values "1" is N−2 (for example, "2") after the rearrangement are inverted, and "1" and "0" in the N-digit binary numbers in which the number of bit values "1" is N−3 (for example, "1") after the rearrangement are inverted.

Moreover, as the creation rule, the N-digit binary numbers in which the number of bit values "1" is N−1 (for example, "3") after the inversion are horizontally inverted, the N-digit binary numbers in which the number of bit values "1" is N−2 (for example, "2") after the inversion are horizontally inverted, and the N-digit binary numbers in which the number of bit values "1" is N−3 (for example, "1") after the inversion are horizontally inverted. Then, the symbol mapping illustrated in FIG. 11A conforming to these creation rules may be created.

Figure 12:
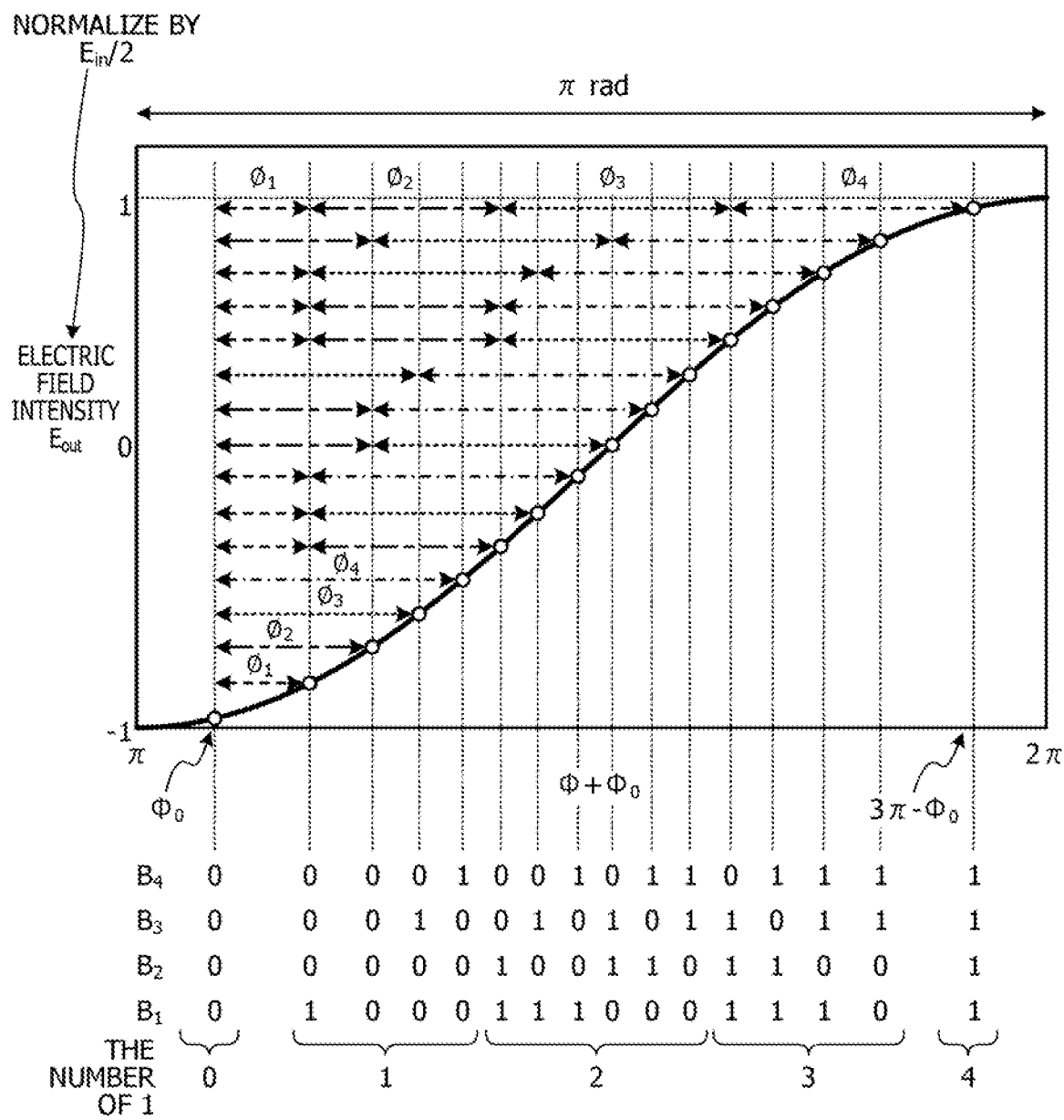
FIG. 12 is an explanatory diagram illustrating an example of a correspondence between an electric field intensity of an optical modulation signal and a phase shift amount of the optical modulator.

FIG. 12 is an explanatory diagram illustrating an example of a correspondence between an electric field intensity of an optical modulation signal and the phase shift amount of the optical modulator 3B. In a case where the first bit value "$B_1$" of the modulation input code is "1", a data signal is applied to the first phase shifter 16A to add a phase shift amount $\varphi1$ to a phase shift amount $\varphi0$. In a case where the second bit value "$B_2$" of the modulation input code is "1", a data signal is applied to the second phase shifter 16B to add a phase shift amount $\varphi2$ to the phase shift amount $\varphi0$. In a case where the third bit value "$B_3$" of the modulation input code is "1", a data signal is applied to the third phase shifter 16C to add a phase shift amount $\varphi3$ to the phase shift amount $\varphi0$. In a case where a fourth bit value "$B_4$" of the modulation input code is "1", a data signal is applied to the fourth phase shifter 16D to add a phase shift amount $\varphi4$ to a phase shift amount $\varphi0$.

In a case where the modulation input code "$B_4B_3B_2B_1$" is "0000", the phase shift amount is $\varphi0$, so the electric field intensity is equivalent to the signal level "1". In a case where the modulation input code "$B_4B_3B_2B_1$" is "0001", the phase shift amount is $\varphi0+\varphi1$, so the electric field intensity is equivalent to the signal level "2". In a case where the modulation input code "$B_4B_3B_2B_1$" is "0010", the phase shift amount is $\varphi0+\varphi2$, so the electric field intensity is equivalent to the signal level "3". In a case where the modulation input code "$B_4B_3B_2B_1$" is "0100", the phase shift amount is $\varphi0+\varphi3$, so the electric field intensity is equivalent to the signal level "4". In a case where the modulation input code "$B_4B_3B_2B_1$" is "1000", the phase shift amount is $\varphi0+\varphi4$, so the electric field intensity is equivalent to the signal level "5".

In a case where the modulation input code "$B_4B_3B_2B_1$" is "0011", the phase shift amount is $\varphi0+\varphi1+\varphi2$, so the electric field intensity is equivalent to the signal level "6". In a case where the modulation input code "$B_4B_3B_2B_1$" is "0101", the phase shift amount is $\varphi0+\varphi1+\varphi3$, so the electric field intensity is equivalent to the signal level "7". In a case where the modulation input code "$B_4B_3B_2B_1$" is "1001", the phase shift amount is $\varphi0+\varphi1+\varphi4$, so the electric field intensity is equivalent to the signal level "8". In a case where the modulation input code "$B_4B_3B_2B_1$" is "0110", the phase shift amount is $\varphi0+\varphi2+\varphi3$, so the electric field intensity is equivalent to the signal level "9". In a case where the modulation input code "$B_4B_3B_2B_1$" is "1010", the phase shift amount is $\varphi0+\varphi2+\varphi4$, so the electric field intensity is equivalent to the signal level "10". In a case where the modulation input code "$B_4B_3B_2B_1$" is "1100", the phase shift amount is $\varphi0+\varphi3+\varphi4$, so the electric field intensity is equivalent to the signal level "11".

In a case where the modulation input code "$B_4B_3B_2B_1$" is "0111", the phase shift amount is $\varphi0+\varphi1+\varphi2+\varphi3$, so the electric field intensity is equivalent to the signal level "12". In a case where the modulation input code "$B_4B_3B_2B_1$" is "1011", the phase shift amount is $\varphi0+\varphi1+\varphi2+\varphi4$, so the electric field intensity is equivalent to the signal level "13". In a case where the modulation input code "$B_4B_3B_2B_1$" is "1101", the phase shift amount is φ0+φ1+φ3+φ4, so the electric field intensity is equivalent to the signal level "14". In a case where the modulation input code "$B_4B_3B_2B_1$" is "1110", the phase shift amount is φ0+φ2+φ3+φ4, so the electric field intensity is equivalent to the signal level "15". In a case where the modulation input code "$B_4B_3B_2B_1$" is "1111", the phase shift amount is φ0+φ1+φ2+φ3+φ4, so the electric field intensity is equivalent to the signal level "16".

A phase shift amount φ of the optical modulator 3B is as indicated in (Expression 7).

$$\Phi \triangleq \sum_{m=1}^{N=4} B_m \phi_m \quad \text{[Expression 7]}$$

The optical modulator 3B adjusts a ratio of the electrode lengths of the phase shifters so as to make the electric field intensities for the respective signal levels (1 to 16) at equal intervals. For example, in the case where the encoder 12 is for 4 bits, a ratio of the electrode length $L_1$ of the first phase shifter 16A, the electrode length $L_2$ of the second phase shifter 16B, an electrode length $L_3$ of the third phase shifter 16C, and an electrode length $L_4$ of the fourth phase shifter 16D is set to, for example, $L_1:L_2:L_3:L_4=153:234:284:328$. As a result, since the electric field intensities for the respective signal levels (1 to 16) are at equal intervals, a linear part of a sine curve, which represents a correspondence between the electric field intensity of the optical modulation signal and the phase shift amount, may be sufficiently ensured.

For example, the upper arm 15A1 performs intensity modulation of the optical signal with the data signals by using the phase shifters, and outputs the optical modulation signal after the intensity modulation to a multiplexing unit 23. The lower arm 15B1 performs intensity modulation of the optical signal with the data signals by using the phase shifters, and outputs the optical modulation signal after the intensity modulation to the multiplexing unit 23. Then, the multiplexing unit 23 multiplexes the optical modulation signal from the upper arm 15A1 and the optical modulation signal from the lower arm $15B_1$, and outputs an optical modulation signal after the multiplexing to an output unit 24.

In order to make the electric field intensities for the respective signal levels (1 to 16) at equal intervals, the optical modulator 3B of the third embodiment adjusts, while converting a gray code of the data signal into the modulation input code, the electrode lengths of the phase shifters of the upper arm 15A1 and the lower arm 15B1 to which the data signal according to the modulation input code after the conversion is applied. As a result, since the linear part of the sine curve, which represents the correspondence between the electric field intensity and the phase shift amount, is sufficiently ensured, a modulation loss and power consumption may be suppressed while making the signal level intervals equal.

Note that, in the optical modulator 3B of the third embodiment, a case has been exemplified where the electric field intensity is adjusted by adjusting the phase shift amount according to the modulation input code. However, the optical modulator 3B may adjust the optical intensity instead of the electric field intensity, and an embodiment in such a case will be described below as a fourth embodiment. Note that the same reference signs are provided to the same components as those of the optical modulator 3B of the third embodiment and the description of overlapping components and operations is omitted. Although the phase modulation is performed in the third embodiment, the case of the intensity modulation will be described in the fourth embodiment.

Figure 13:
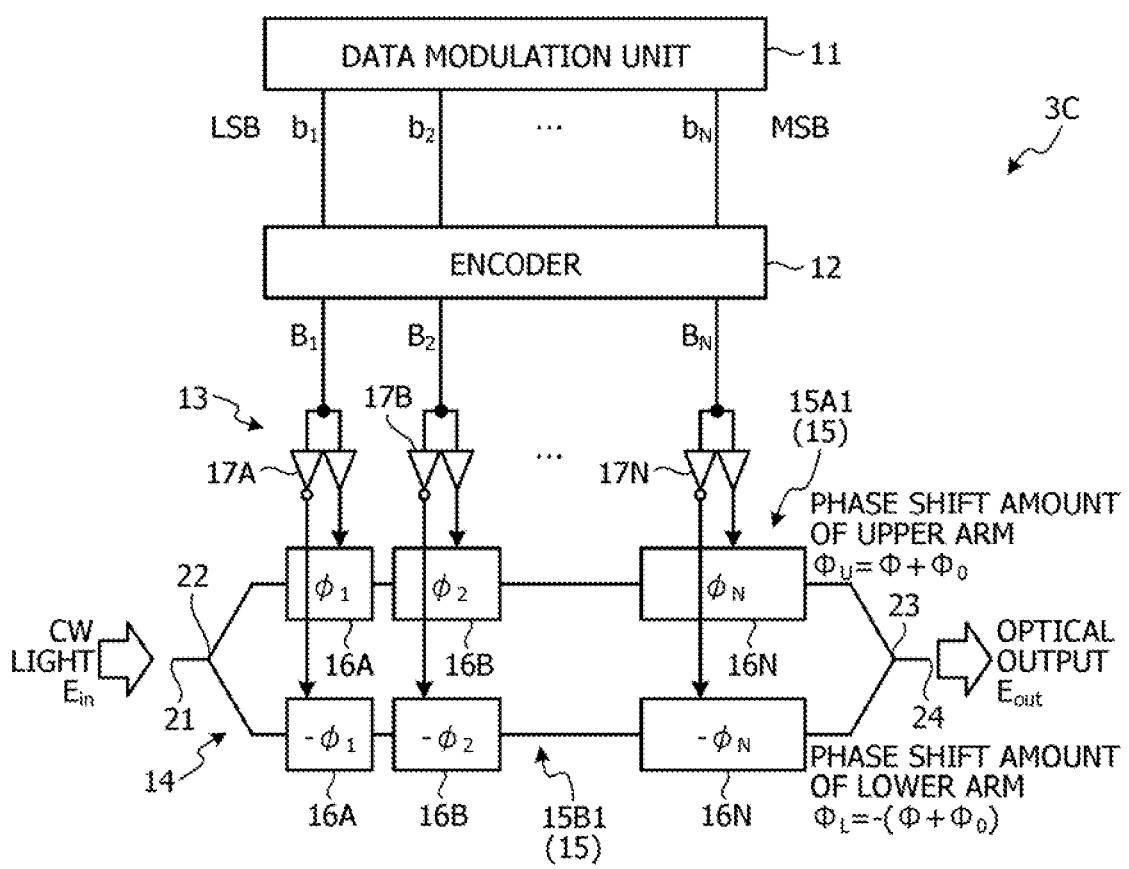
FIG. 13 is a schematic plan view illustrating an example of a configuration of an optical modulator of a fourth embodiment.

FIG. 13 is a schematic plan view illustrating an example of a configuration of an optical modulator 3C of the fourth embodiment.

Fourth Embodiment

The optical modulator 3C illustrated in FIG. 13 includes a data modulation unit 11, an encoder 12, an upper arm 15A1, a lower arm 15B1, and N DACs 13. The data modulation unit 11 performs modulation into a bit string data signal, which is an N-bit digital electric input signal.

The encoder 12 converts a bit string data signal into a modulation input code. The encoder 12 converts a first bit value bi in the bit string data signal into a first bit value Bi in the modulation input code. The encoder 12 converts a second bit value $b_2$ in the bit string data signal into a second bit value $B_2$ in the modulation input code. The encoder 12 converts an N-th bit value $b_N$ in the bit string data signal into an N-th bit value BN in the modulation input code.

The upper arm 15A1 includes N phase shifters connected in series, for example, a first phase shifter 16A, a second phase shifter 16B, and an N-th phase shifter 16N. The lower arm 15B1 also includes N phase shifters connected in series, for example, a first phase shifter 16A, a second phase shifter 16B, and an N-th phase shifter 16N. Note that the first phase shifters 16A of the upper arm 15A1 and the lower arm 15B1 have the same electrode length Li, and the second phase shifters 16B of the upper arm 15A1 and the lower arm 15B1 have the same electrode length $L_2$. The N-th phase shifters 16N of the upper arm 15A1 and the lower arm 15B1 have the same electrode length LN.

Since the DAC 13 is an N-bit DAC, the DAC 13 includes N voltage conversion units, for example, a first voltage conversion unit 17A, a second voltage conversion unit 17B, and an N-th voltage conversion unit 17N. The first voltage conversion unit 17A applies the data signal of the first bit value $B_1$ after the voltage conversion to an electrode of the first phase shifter 16A of the upper arm 15A1. The first voltage conversion unit 17A inverts the data signal of the first bit value $B_1$ after the voltage conversion, and applies the data signal of the first bit value $B_1$ after the inversion to an electrode of the first phase shifter 16A of the lower arm 15B1. The second voltage conversion unit 17B applies a data signal of the second bit value $B_2$ after voltage conversion to an electrode of the second phase shifter 16B of the upper arm 15A1. The second voltage conversion unit 17B inverts the data signal of the second bit value $B_2$ after the voltage conversion, and applies the data signal of the second bit value $B_2$ after the inversion to an electrode of the second phase shifter 16B of the lower arm 15B1. The N-th voltage conversion unit 17N applies a data signal of the N-th bit value $B_N$ after voltage conversion to an electrode of the N-th phase shifter 16N of the upper arm 15A1. The N-th voltage conversion unit 17N inverts the data signal of the N-th bit value BN after the voltage conversion, and applies the data signal of the N-th bit value BN after the inversion to an electrode of the N-th phase shifter 16N of the lower arm 15B1.

The first phase shifter 16A of the upper arm 15A1 performs intensity modulation of an optical signal with the data signal of the first bit value $B_1$ from the first voltage conversion unit 17A. Furthermore, the first phase shifter 16A of the lower arm 15B1 performs intensity modulation of an optical signal with the data signal of the first bit value $B_1$ after the inversion from the first voltage conversion unit 17A. The second phase shifter 16B of the upper arm 15A1 performs intensity modulation of the optical signal with the data signal of the second bit value $B_2$ from the second voltage conversion unit 17B.

Furthermore, the second phase shifter 16B of the lower arm 15B1 performs intensity modulation of the optical signal with the data signal of the second bit value $B_2$ after the inversion from the second voltage conversion unit 17B. The N-th phase shifter 16N of the upper arm 15A1 performs intensity modulation of the optical signal with the data signal of the N-th bit value BN from the N-th voltage conversion unit 17N. Furthermore, the N-th phase shifter 16N of the lower arm 15B1 performs intensity modulation of the optical signal with the data signal of the N-th bit value BN after the inversion from the N-th voltage conversion unit 17N.

Figure 14:
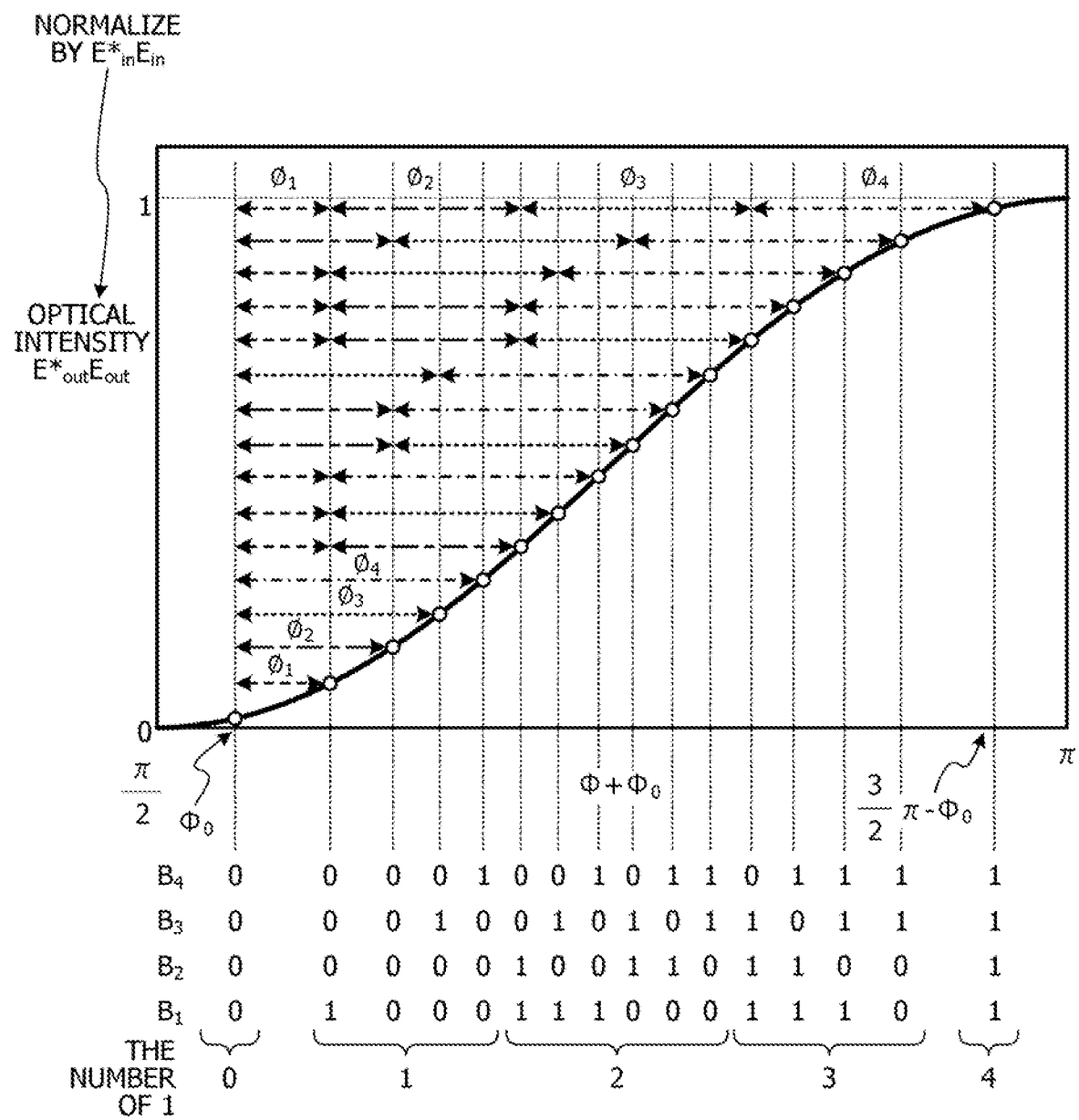
FIG. 14 is an explanatory diagram illustrating an example of a correspondence between an optical intensity of an optical modulation signal and a phase shift amount of the optical modulator.

FIG. 14 is an explanatory diagram illustrating an example of a correspondence between an optical intensity of an optical modulation signal and a phase shift amount of the optical modulator 3C. Note that, for convenience of description, a case where the N bits are 4 bits will be described. In a case where the first bit value "$B_1$" of the modulation input code is "1", a data signal is applied to the first phase shifter 16A to add a phase shift amount $\varphi 1$ to a phase shift amount $\varphi 0$. In a case where the second bit value "$B_2$" of the modulation input code is "1", a data signal is applied to the second phase shifter 16B to add a phase shift amount $\varphi 2$ to the phase shift amount $\varphi 0$. In a case where the third bit value "$B_3$" of the modulation input code is "1", a data signal is applied to the third phase shifter 16C to add a phase shift amount $\varphi 3$ to the phase shift amount $\varphi 0$. In a case where a fourth bit value "$B_4$" of the modulation input code is "1", a data signal is applied to the fourth phase shifter 16D to add a phase shift amount $\varphi 4$ to the phase shift amount $\varphi 0$.

In a case where the modulation input code "$B_4B_3B_2B_1$" is "0000", the phase shift amount is $\varphi 0$, so the optical intensity is equivalent to a signal level "1". In a case where the modulation input code "$B_4B_3B_2B_1$" is "0001", the phase shift amount is $\varphi 0+\varphi 1$, so the optical intensity is equivalent to a signal level "2". In a case where the modulation input code "$B_4B_3B_2B_1$" is "0010", the phase shift amount is $\varphi 0+\varphi 2$, so the optical intensity is equivalent to a signal level "3". In a case where the modulation input code "$B_4B_3B_2B_1$" is "0100", the phase shift amount is $\varphi 0+\varphi 3$, so the optical intensity is equivalent to a signal level "4". In a case where the modulation input code "$B_4B_3B_2B_1$" is "1000", the phase shift amount is $\varphi 0+\varphi 4$, so the optical intensity is equivalent to a signal level "5".

In a case where the modulation input code "$B_4B_3B_2B_1$" is "0011", the phase shift amount is $\varphi 0+\varphi 1+\varphi 2$, so the optical intensity is equivalent to a signal level "6". In a case where the modulation input code "$B_4B_3B_2B_1$" is "0101", the phase shift amount is $\varphi 0+\varphi 1+\varphi 3$, so the optical intensity is equivalent to a signal level "7". In a case where the modulation input code "$B_4B_3B_2B_1$" is "1001", the phase shift amount is $\varphi 0+\varphi 1+\varphi 4$, so the optical intensity is equivalent to a signal level "8". In a case where the modulation input code "$B_4B_3B_2B_1$" is "0110", the phase shift amount is $\varphi 0+\varphi 2+\varphi 3$, so the optical intensity is equivalent to a signal level "9". In a case where the modulation input code "$B_4B_3B_2B_1$" is "1010", the phase shift amount is $\varphi 0+\varphi 2+\varphi 4$, so the optical intensity is equivalent to a signal level "10". In a case where the modulation input code "$B_4B_3B_2B_1$" is "1100", the phase shift amount is $\varphi 0+\varphi 3+\varphi 4$, so the optical intensity is equivalent to a signal level "11".

In a case where the modulation input code "$B_4B_3B_2B_1$" is "0111", the phase shift amount is $\varphi 0+\varphi 1+\varphi 2+\varphi 3$, so the optical intensity is equivalent to a signal level "12". In a case where the modulation input code "$B_4B_3B_2B_1$" is "1011", the phase shift amount is $\varphi 0+\varphi 1+\varphi 2+\varphi 4$, so the optical intensity is equivalent to a signal level "13". In a case where the modulation input code "$B_4B_3B_2B_1$" is "1101", the phase shift amount is $\varphi 0+\varphi 1+\varphi 3+\varphi 4$, so the optical intensity is equivalent to a signal level "14". In a case where the modulation input code "$B_4B_3B_2B_1$" is "1110", the phase shift amount is $\varphi 0+\varphi 2+\varphi 3+\varphi 4$, so the optical intensity is equivalent to a signal level "15". In a case where the modulation input code "$B_4B_3B_2B_1$" is "1111", the phase shift amount is $\varphi 0+\varphi 1+\varphi 2+\varphi 3+\varphi 4$, so the optical intensity is equivalent to a signal level "16".

The optical intensity of the optical modulator 3C is as indicated in (Expression 8).

$$E_{out}^* E_{out} = E_{in}^* E_{in} \frac{1+\cos 2(\Phi+\Phi_0)}{2} \qquad \text{[Expression 8]}$$

The optical modulator 3C adjusts a ratio of the electrode lengths of the phase shifters so as to make the optical intensities for the respective signal levels (1to 16) at equal intervals. As a result, since the optical intensities for the respective signal levels (1 to 16) are at equal intervals, a linear part of a sine curve, which represents a correspondence between the optical intensity of the optical modulation signal and the phase shift amount, may be sufficiently ensured.

For example, the upper arm 15A1 performs intensity modulation of the optical signal with the data signals by using the phase shifters, and outputs the optical modulation signal after the intensity modulation to a multiplexing unit 23. The lower arm 15B1 performs intensity modulation of the optical signal with the data signals by using the phase shifters, and outputs the optical modulation signal after the intensity modulation to the multiplexing unit 23. Then, the multiplexing unit 23 multiplexes the optical modulation signal from the upper arm 15A1 and the optical modulation signal from the lower arm 15B1, and outputs an optical modulation signal after the multiplexing to an output unit 24.

In order to make the optical intensities for the respective signal levels (1to 16) at equal intervals, the optical modulator 3C of the fourth embodiment adjusts, while converting a gray code of the data signal into the modulation input code, the electrode lengths of the phase shifters of the upper arm 15A1 and the lower arm 15B1 to which the data signal according to the modulation input code after the conversion is applied. As a result, since the linear part of the sine curve, which represents the correspondence between the optical intensity and the phase shift amount, is sufficiently ensured, a modulation loss and power consumption may be suppressed while making the signal level intervals equal.

Fifth Embodiment

Figure 15:
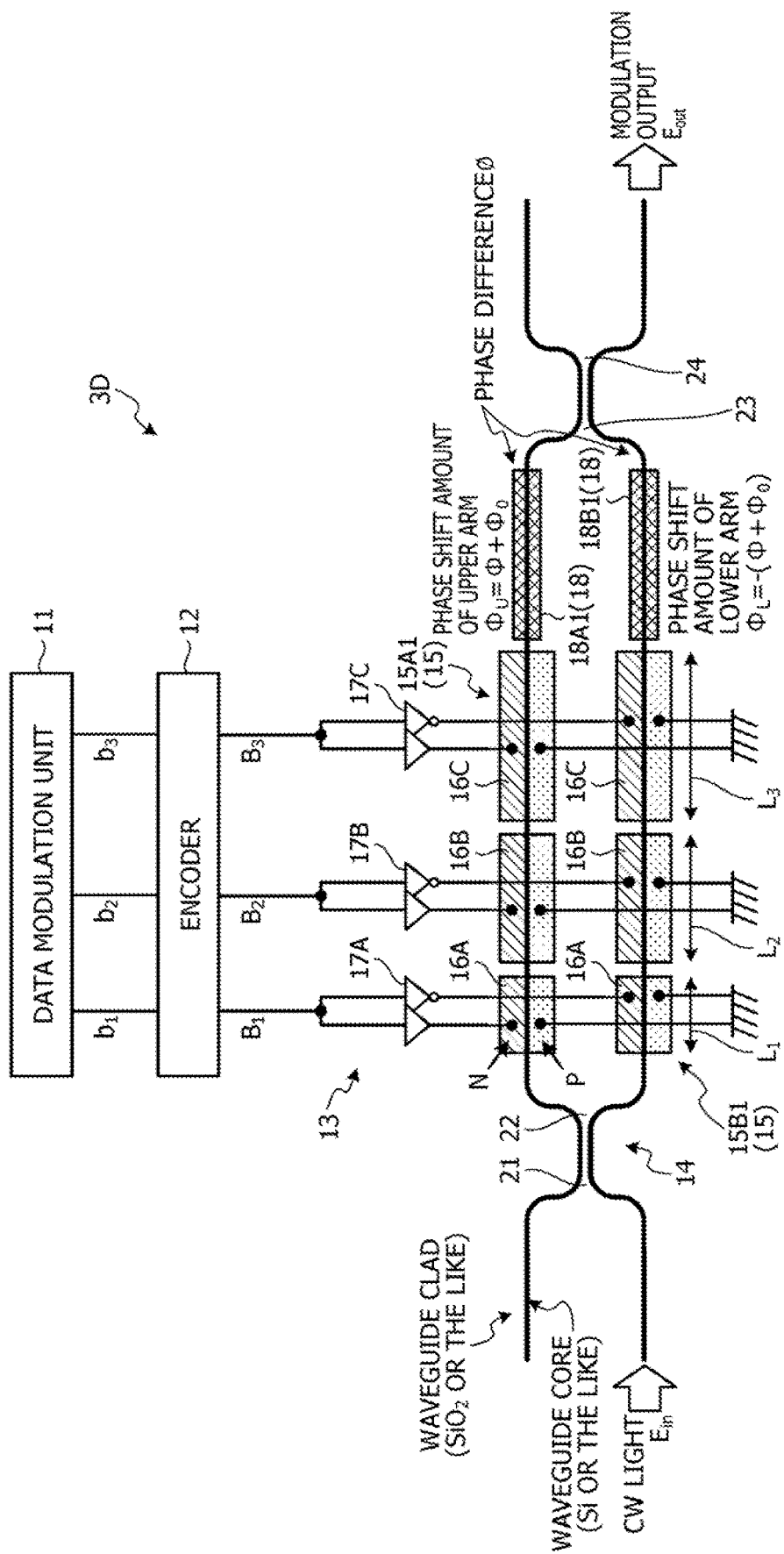
FIG. 15 is a schematic plan view illustrating an example of a configuration of an optical modulator of a fifth embodiment.

FIG. 15 is a schematic plan view illustrating an example of a configuration of an optical modulator 3D of a fifth embodiment. The optical modulator 3D illustrated in FIG. 15 includes a data modulation unit 11, an encoder 12, a DAC 13, an optical waveguide 14, two arms 15 arranged on the optical waveguide 14, and two heaters 18. The data modulation unit 11 performs modulation into a bit string data signal, which is a 3-bit digital electric input signal. The encoder 12 converts a bit string data signal into a modulation input code. The encoder 12 converts a first bit value $b_1$ in the bit string data signal into a first bit value $B_1$ in the modulation input code. The encoder 12 converts a second bit value $b_2$ in the bit string data signal into a second bit value $B_2$ in the modulation input code. The encoder 12 converts a third bit value $b_3$ in the bit string data signal into a third bit value $B_3$ in the modulation input code.

FIG. 16 is an explanatory diagram illustrating an example of a correspondence between an input and an output of the encoder 12 for 3 bits. As illustrated in FIG. 16, the encoder 12 converts a gray code "$b_3b_2b_1$" of a data signal into a modulation input code "$B_3B_2B_1$". In a case where the gray code is "100", the encoder 12 converts the gray code "100" into a modulation input code "111". In a case where the gray code is "001", the encoder 12 converts the gray code "001" into a modulation input code "001". In a case where the gray code is "011", the encoder 12 converts the gray code "011" into a modulation input code "010". In a case where the gray code is "010", the encoder 12 converts the gray code "010" into a modulation input code "100". In a case where the gray code is "110", the encoder 12 converts the gray code "110" into a modulation input code "011". In a case where the gray code is "111", the encoder 12 converts the gray code "111" into a modulation input code "101". In a case where the gray code is "101", the encoder 12 converts the gray code "101" into a modulation input code "110". In a case where the gray code is "100", the encoder 12 converts the gray code "100" into a modulation input code "111".

The DAC 13 converts a modulation input code of a data signal from the encoder 12 into an analog signal, for example, into a voltage. Since the DAC 13 is a 3-bit DAC, the DAC 13 includes three voltage conversion units, for example, a first voltage conversion unit 17A, a second voltage conversion unit 17B, and a third voltage conversion unit 17C. The first voltage conversion unit 17A converts a data signal of the first bit value $B_1$ of the modulation input code from the encoder 12 into a voltage. The second voltage conversion unit 17B converts a data signal of the second bit value $B_2$ of the modulation input code from the encoder 12 into a voltage. The third voltage conversion unit 17C converts a data signal of the third bit value $B_3$ of the modulation input code from the encoder 12 into a voltage.

The optical waveguide 14 includes a waveguide core of Si or the like and a waveguide clad of $SiO_2$ or the like. The optical waveguide 14 includes an input unit 21, a branch unit 22, a multiplexing unit 23, and an output unit 24. The input unit 21 inputs an optical signal (continuous wave (CW) light) from a light source 2. The branch unit 22 branches an optical signal from the input unit 21 to each of the arms 15. The two arms 15 are, for example, a Mach-Zehnder (MZ) interferometer including an upper arm 15A1 and a lower arm 15B1, for example.

The upper arm 15A1 performs intensity modulation of an optical signal from the light source 2 with a data signal after analog conversion, and outputs a horizontally polarized optical modulation signal after the intensity modulation. The lower arm 15B1 performs intensity modulation of an optical signal from the light source 2 with a data signal after analog conversion, and outputs a vertically polarized optical modulation signal after the intensity modulation. Note that, since the data signal is a 3-bit digital signal, each of the arms 15 outputs an 8-value optical modulation signal having the signal level 1 to the signal level 8.

The upper arm 15A1 includes a first phase shifter group, which is a plurality of phase shifters connected in series, for example, a first phase shifter 16A, a second phase shifter 16B, and a third phase shifter 16C. Note that the phase shifter includes an N-type and a P-type. The lower arm 15B1 includes a second phase shifter group, which is also a plurality of phase shifters connected in series, for example, a first phase shifter 16A, a second phase shifter 16B, and a third phase shifter 16C. Note that the first phase shifters 16A of the upper arm 15A1 and the lower arm 15B1 have the same electrode length Li, and the second phase shifters 16B of the upper arm 15A1 and the lower arm 15B1 have the same electrode length $L_2$. Moreover, the third phase shifters 16C of the upper arm 15A1 and the lower arm 15B1 have the same electrode length $L_3$.

The first voltage conversion unit 17A applies the data signal of the first bit value $B_1$ after the voltage conversion to an electrode of the first phase shifter 16A of the upper arm 15A1. The first voltage conversion unit 17A inverts the data signal of the first bit value $B_1$ after the voltage conversion, and applies the data signal of the first bit value $B_1$ after the inversion to an electrode of the first phase shifter 16A of the lower arm 15B1. The second voltage conversion unit 17B applies the data signal of the second bit value $B_2$ after the voltage conversion to an electrode of the second phase shifter 16B of the upper arm 15A1. The second voltage conversion unit 17B inverts the data signal of the second bit value $B_2$ after the voltage conversion, and applies the data signal of the second bit value $B_2$ after the inversion to an electrode of the second phase shifter 16B of the lower arm 15B1. The third voltage conversion unit 17C applies the data signal of the third bit value $B_3$ after the voltage conversion to an electrode of the third phase shifter 16C of the upper arm 15A1. The third voltage conversion unit 17C inverts the data signal of the third bit value $B_3$ after the voltage conversion, and applies the data signal of the third bit value $B_3$ after the inversion to an electrode of the third phase shifter 16C of the lower arm 15B1.

Phase shift amounts φ1, φ2, φ3, and φ0 of the optical modulator 3D are as indicated in (Expression 9). The phase shift amount φ1 is about 0.57 rad, the phase shift amount φ2 is about 0.91 rad, the phase shift amount φ3 is about 1.2 rad, and the phase shift amount φ0 is about 3.37 rad.

$$\phi_1 \sim 0.57 \text{rad}$$
$$\phi_2 \sim 0.91 \text{rad}$$
$$\phi_3 \sim 1.2 \text{rad}$$
$$\Phi_0 = \frac{3}{2}\pi - \frac{\phi_1 + \phi_2 + \phi_3}{2} \sim 3.37 \text{rad}$$
[Expression 9]

In the optical modulator 3D, a ratio of the electrode length $L_1$ of the first phase shifter 16A, the electrode length $L_2$ of the second phase shifter 16B, and the electrode length $L_3$ of the third phase shifter 16C is set to, for example, $L_1:L_2:L_3=21:34:45$ so as to make electric field intensities for the respective signal levels (1 to 8) at equal intervals. As a result, since the electric field intensities for the respective signal levels (1 to 8) are at equal intervals, a linear part of a sine curve, which represents a correspondence between the electric field intensity of an 8 amplitude shift keying (ASK) modulation signal and the phase shift amount, may be sufficiently ensured.

The heaters 18 includes an upper heater 18A1 and a lower heater 18B1. The upper heater 18A1 adjusts a phase shift amount of the upper arm 15A1 according to temperature adjustment. Furthermore, the lower heater 18B1 adjusts a phase shift amount of the lower arm 15B1 according to temperature adjustment.

The first phase shifter 16A of the upper arm 15A1 performs intensity modulation of an optical signal with the data signal of the first bit value $B_1$ from the first voltage conversion unit 17A. Furthermore, the first phase shifter 16A of the lower arm 15B1 performs intensity modulation of an optical signal with the data signal of the first bit value $B_1$ after the inversion from the first voltage conversion unit 17A. The second phase shifter 16B of the upper arm 15A1 performs intensity modulation of the optical signal with the data signal of the second bit value $B_2$ from the second voltage conversion unit 17B. Furthermore, the second phase shifter 16B of the lower arm 15B1 performs intensity modulation of the optical signal with the data signal of the second bit value $B_2$ after the inversion from the second voltage conversion unit 17B. The third phase shifter 16C of the upper arm 15A1 performs intensity modulation of the optical signal with the data signal of the third bit value $B_3$ from the third voltage conversion unit 17C. Furthermore, the third phase shifter 16C of the lower arm 15B1 performs intensity modulation of the optical signal with the data signal of the third bit value $B_3$ after the inversion from the third voltage conversion unit 17C.

Figure 17:
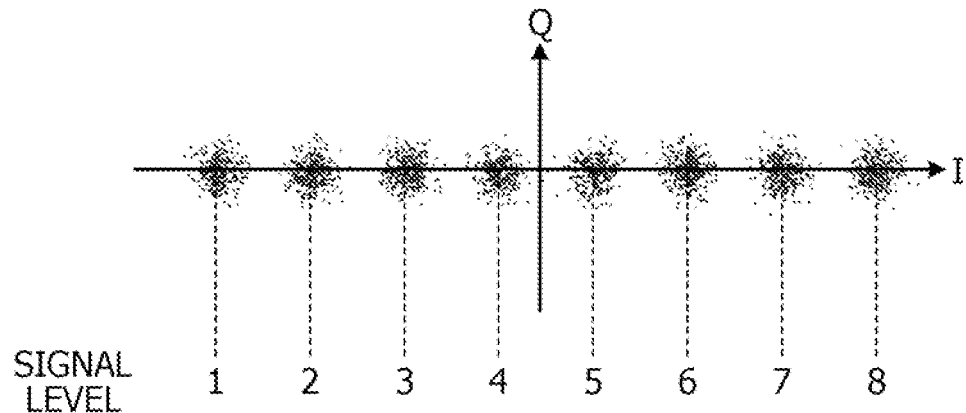
FIG. 17 is an explanatory diagram illustrating an example of a symbol of the optical modulator.

The upper arm 15A1 outputs the optical modulation signal after the intensity modulation with the data signal to the multiplexing unit 23. Moreover, the lower arm 15B1 outputs the optical modulation signal after the intensity modulation with the data signal to the multiplexing unit 23. The multiplexing unit 23 multiplexes the optical modulation signal after the intensity modulation by the upper arm 15A1 and the optical modulation signal after the intensity modulation by the lower arm 15B1, and outputs an 8 ASK modulation signal. FIG. 17 is an explanatory diagram illustrating an example of a symbol of the optical modulator 3D. The symbol illustrated in FIG. 17 is a symbol of an 8 ASK modulation signal output by the optical modulator 3D.

In order to make the electric field intensities for the respective signal levels (1 to 8) at equal intervals, the optical modulator 3D of the fifth embodiment adjusts, while converting the gray code of the data signal into the modulation input code, the electrode lengths of the phase shifters of the upper arm 15A1 and the lower arm 15B1 to which the data signal according to the modulation input code after the conversion is applied. As a result, since the linear part of the sine curve, which represents the correspondence between the electric field intensity and the phase shift amount, is sufficiently ensured, a modulation loss and power consumption may be suppressed while making the signal level intervals equal.

Sixth Embodiment

Figure 18:
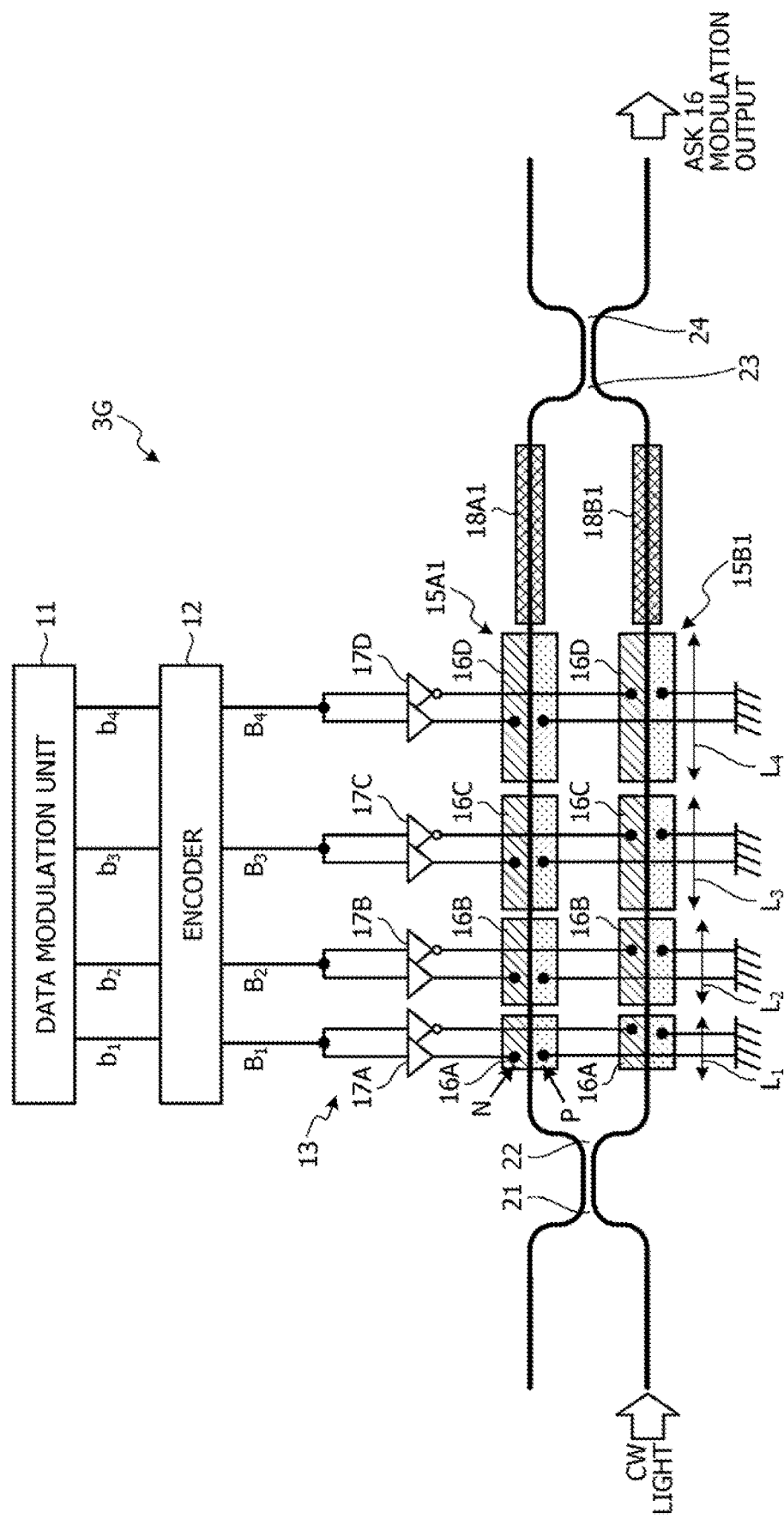
FIG. 18 is a schematic plan view illustrating an example of a configuration of an optical modulator of a sixth embodiment.

FIG. 18 is a schematic plan view illustrating an example of a configuration of an optical modulator 3G of a sixth embodiment. Note that the same reference signs are provided to the same components as those of the optical modulator 3D of the fifth embodiment and the description of overlapping components and operations is omitted. A data modulation unit 11 in the optical modulator 3G illustrated in FIG. 18 performs modulation into a data signal which is a 4-bit digital electric input signal. The encoder 12 converts a bit string data signal into a modulation input code. The encoder 12 converts a first bit value bi in the bit string data signal into a first bit value $B_1$ in the modulation input code. The encoder 12 converts a second bit value $b_2$ in the bit string data signal into a second bit value $B_2$ in the modulation input code. The encoder 12 converts a third bit value $b_3$ in the bit string data signal into a third bit value $B_3$ in the modulation input code. The encoder 12 converts a fourth bit value $b_4$ in the bit string data signal into a fourth bit value $B_4$ in the modulation input code.

FIG. 19 is an explanatory diagram illustrating an example of a correspondence between an input and an output of the encoder 12 for 4 bits. As illustrated in FIG. 19, the encoder 12 converts a gray code "$b_4b_3b_2b_1$" of a data signal into a modulation input code "$B_4B_3B_2B_1$". For example, in a case where the gray code is "1000", the encoder 12 converts the gray code "1000" into a modulation input code "1111". For example, in a case where the gray code is "1001", the encoder 12 converts the gray code "1001" into a modulation input code "1110". For example, in a case where the gray code is "1011", the encoder 12 converts the gray code "1011" into a modulation input code "1101".

Since a DAC 13 is a 4-bit DAC, the DAC 13 includes four voltage conversion units, for example, a first voltage conversion unit 17A, a second voltage conversion unit 17B, a third voltage conversion unit 17C, and a fourth voltage conversion unit 17D. The first voltage conversion unit 17A converts a data signal of the first bit value $B_1$ of the modulation input code from the encoder 12 into a voltage. The second voltage conversion unit 17B converts a data signal of the second bit value $B_2$ of the modulation input code from the encoder 12 into a voltage. The third voltage conversion unit 17C converts a data signal of the third bit value $B_3$ of the modulation input code from the encoder 12 into a voltage. The fourth voltage conversion unit 17D converts a data signal of the fourth bit value $B_4$ of the modulation input code from the encoder 12 into a voltage.

The upper arm 15A1 performs intensity modulation of an optical signal from the light source 2 with a data signal after analog conversion, and outputs a horizontally polarized optical modulation signal after the intensity modulation. The lower arm 15B1 performs intensity modulation of an optical signal from the light source 2 with a data signal after analog conversion, and outputs a vertically polarized optical modulation signal after the intensity modulation. Note that, since the data signal is a 4-bit digital signal, each of the arms 15 outputs a 16-value optical modulation signal having a signal level 1 to a signal level 16.

The upper arm 15A1 includes a first phase shifter group, which is a plurality of phase shifters connected in series, for example, a first phase shifter 16A, a second phase shifter 16B, a third phase shifter 16C, and a fourth phase shifter 16D. The lower arm 15B1 includes a second phase shifter group, which is also a plurality of phase shifters connected in series, for example, a first phase shifter 16A, a second phase shifter 16B, a third phase shifter 16C, and a fourth phase shifter 16D. Note that the first phase shifters 16A of the upper arm 15A1 and the lower arm 15B1 have the same electrode length $L_1$, and the second phase shifters 16B of the upper arm 15A1 and the lower arm 15B1 have the same electrode length $L_2$. Moreover, the third phase shifters 16C of the upper arm 15A1 and the lower arm 15B1 have the same electrode length $L_3$, and the fourth phase shifters 16D of the upper arm 15A1 and the lower arm 15B1 have the same electrode length $L_4$.

The first voltage conversion unit 17A applies the data signal of the first bit value $B_1$ after the voltage conversion to an electrode of the first phase shifter 16A of the upper arm 15A1. The first voltage conversion unit 17A inverts the data signal of the first bit value Bi after the voltage conversion, and applies the data signal of the first bit value $B_1$ after the inversion to an electrode of the first phase shifter 16A of the lower arm 15B1. The second voltage conversion unit 17B applies the data signal of the second bit value $B_2$ after the voltage conversion to an electrode of the second phase shifter 16B of the upper arm 15A1. The second voltage conversion unit 17B inverts the data signal of the second bit value $B_2$ after the voltage conversion, and applies the data signal of the second bit value $B_2$ after the inversion to an electrode of the second phase shifter 16B of the lower arm 15B1.

The third voltage conversion unit 17C applies the data signal of the third bit value $B_3$ after the voltage conversion to an electrode of the third phase shifter 16C of the upper arm 15A1. The third voltage conversion unit 17C inverts the data signal of the third bit value $B_3$ after the voltage conversion, and applies the data signal of the third bit value $B_3$ after the inversion to an electrode of the third phase shifter 16C of the lower arm 15B1. The fourth voltage conversion unit 17D applies the data signal of the fourth bit value $B_4$ after the voltage conversion to an electrode of the fourth phase shifter 16D of the upper arm 15A1. The fourth voltage conversion unit 17D inverts the data signal of the fourth bit value $B_4$ after the voltage conversion, and applies the data signal of the fourth bit value $B_4$ after the inversion to an electrode of the fourth phase shifter 16D of the lower arm 15B1.

In the optical modulator 3G, a ratio of the electrode lengths of the first phase shifter 16A, the second phase shifter 16B, the third phase shifter 16C, and the fourth phase shifter 16D is set to, for example, $L_1:L_2:L_3:L_4=153:234:284:328$ so as to make the electric field intensities for the respective signal levels (1 to 16) at equal intervals. As a result, since the electric field intensities for the respective signal levels (1 to 16) are at equal intervals, a linear part of a sine curve, which represents a correspondence between the electric field intensity of a 16 ASK modulation signal and a phase shift amount, may be sufficiently ensured.

The first phase shifter 16A of the upper arm 15A1 performs intensity modulation of an optical signal with the data signal of the first bit value $B_1$ from the first voltage conversion unit 17A. Furthermore, the first phase shifter 16A of the lower arm 15B1 performs intensity modulation of an optical signal with the data signal of the first bit value $B_1$ after the inversion from the first voltage conversion unit 17A. The second phase shifter 16B of the upper arm 15A1 performs intensity modulation of the optical signal with the data signal of the second bit value $B_2$ from the second voltage conversion unit 17B. Furthermore, the second phase shifter 16B of the lower arm 15B1 performs intensity modulation of the optical signal with the data signal of the second bit value $B_2$ after the inversion from the second voltage conversion unit 17B. The third phase shifter 16C of the upper arm 15A1 performs intensity modulation of the optical signal with the data signal of the third bit value $B_3$ from the third voltage conversion unit 17C. Furthermore, the third phase shifter 16C of the lower arm 15B1 performs intensity modulation of the optical signal with the data signal of the third bit value $B_3$ after the inversion from the third voltage conversion unit 17C. The fourth phase shifter 16D of the upper arm 15A1 performs intensity modulation of the optical signal with the data signal of the fourth bit value $B_4$ from the fourth voltage conversion unit 17D. Furthermore, the fourth phase shifter 16D of the lower arm 15B1 performs intensity modulation of the optical signal with the data signal of the fourth bit value $B_4$ after the inversion from the fourth voltage conversion unit 17D.

Figure 20:
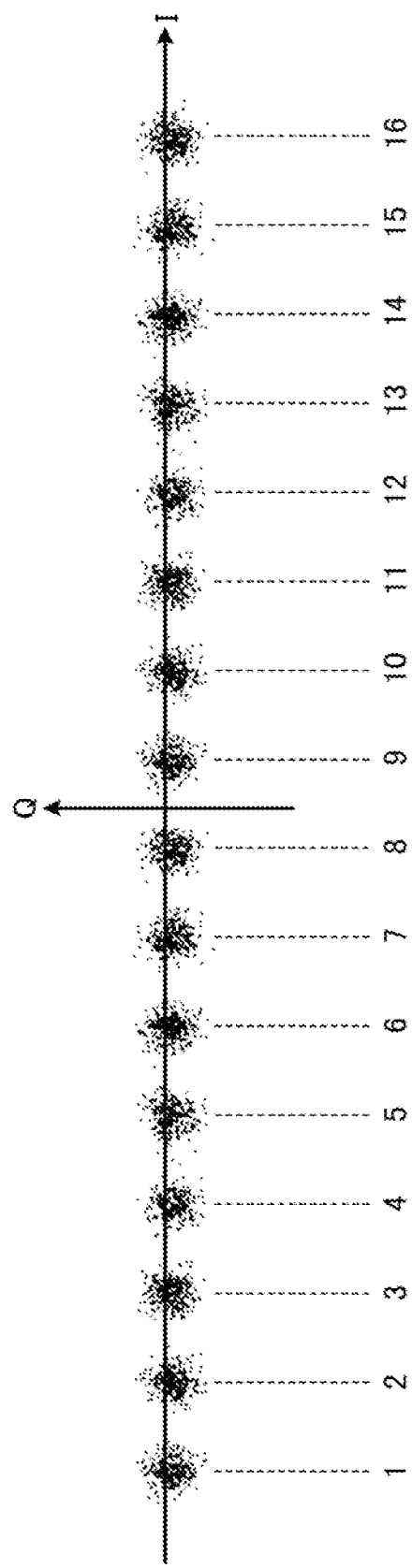
FIG. 20 is an explanatory diagram illustrating an example of a symbol of the optical modulator.

The upper arm 15A1 outputs the optical modulation signal after the intensity modulation with the data signal to a multiplexing unit 23. Moreover, the lower arm 15B1 outputs the optical modulation signal after the intensity modulation with the data signal to the multiplexing unit 23. The multiplexing unit 23 multiplexes the optical modulation signal after the intensity modulation by the upper arm 15A1 and the optical modulation signal after the intensity modulation by the lower arm 15B1, and outputs a 16 ASK modulation signal. FIG. 20 is an explanatory diagram illustrating an example of a symbol of the optical modulator 3G. The symbol illustrated in FIG. 20 is a symbol of a 16 ASK modulation signal output by the optical modulator 3G.

In order to make the electric field intensities for the respective signal levels (1 to 16) at equal intervals, the optical modulator 3G of the sixth embodiment adjusts, while converting the gray code of the data signal into the modulation input code, the electrode lengths of the phase shifters to which the data signal according to the modulation input code after the conversion is applied. As a result, since the linear part of the sine curve, which represents the correspondence between the electric field intensity and the phase shift amount, is sufficiently ensured, a modulation loss and power consumption may be suppressed while making the signal level intervals equal.

Seventh Embodiment

Figure 21:
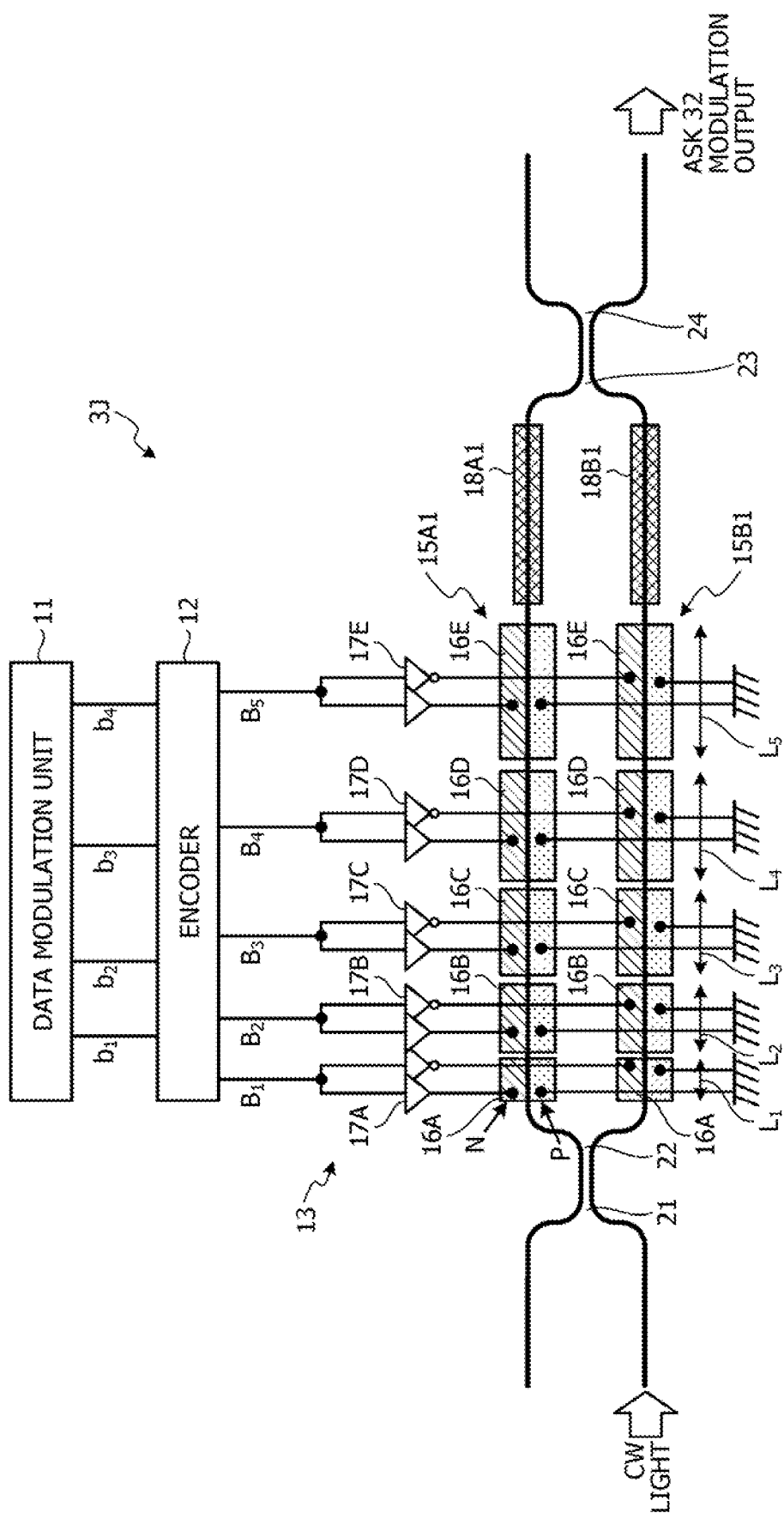
FIG. 21 is a schematic plan view illustrating an example of a configuration of an optical modulator of a seventh embodiment.

FIG. 21 is a schematic plan view illustrating an example of a configuration of an optical modulator 3J of a seventh embodiment. Note that the same reference signs are provided to the same components as those of the optical modulator 3D of the fifth embodiment and the description of overlapping components and operations is omitted. A data modulation unit 11 in the optical modulator 3J illustrated in FIG. 21 performs modulation into a data signal, which is a 5-bit digital electric input signal. An encoder 12 converts a bit string data signal into a modulation input code. The encoder 12 converts a first bit value $b_1$ in the bit string data signal into a first bit value $B_1$ in the modulation input code. The encoder 12 converts a second bit value $b_2$ in the bit string data signal into a second bit value $B_2$ in the modulation input code. The encoder 12 converts a third bit value $b_3$ in the bit string data signal into a third bit value $B_3$ in the modulation input code. The encoder 12 converts a fourth bit value $b_4$ in the bit string data signal into a fourth bit value $B_4$ in the modulation input code. The encoder 12 converts a fifth bit value $b_5$ in the bit string data signal into a fifth bit value $B_5$ in the modulation input code.

FIG. 22 is an explanatory diagram illustrating an example of a correspondence between an input and an output of the encoder 12 for 5 bits. As illustrated in FIG. 22, the encoder 12 converts a gray code "$b_5b_4b_3b_2b_1$" of a data signal into a modulation input code "$B_5B_4B_3B_2B_1$". For example, in a case where the gray code is "10000", the encoder 12 converts the gray code "10000" into a modulation input code "11111". For example, in a case where the gray code is "10001", the encoder 12 converts the gray code "10001" into a modulation input code "11110". For example, in a case where the gray code is "10011", the encoder 12 converts the gray code "10011" into a modulation input code "11101".

FIG. 23A is an explanatory diagram illustrating an example of a correspondence between a signal level of the encoder 12 for 5 bits and a modulation input code. In FIG. 23A, it is assumed that the signal level is "1" in a case where the modulation input code "$B_5B_4B_3B_2B_1$" is "00000", and the signal level is "2" in a case where the modulation input code "$B_5B_4B_3B_2B_1$" is "00001". It is assumed that the signal level is "3" in a case where the modulation input code "$B_5B_4B_3B_2B_1$" is "00010", and the signal level is "4" in a case where the modulation input code "$B_5B_4B_3B_2B_1$" is "00100". It is assumed that the signal level is "5" in a case where the modulation input code "$B_5B_4B_3B_2B_1$" is "01000", and the signal level is "6" in a case where the modulation input code "$B_5B_4B_3B_2B_1$" is "10000".

It is assumed that the signal level is "27" in a case where the modulation input code "$B_5B_4B_3B_2B_1$" is "01111", and the signal level is "28" in a case where the modulation input code "$B_5B_4B_3B_2B_1$" is "10111". It is assumed that the signal level is "29" in a case where the modulation input code "$B_5B_4B_3B_2B_1$" is "11011", and the signal level is "30" in a case where the modulation input code "$B_5B_4B_3B_2B_1$" is "11101". It is assumed that the signal level is "31" in a case where the modulation input code "$B_5B_4B_3B_2B_1$" is "11110", and the signal level is "23" in a case where the modulation input code "$B_5B_4B_3B_2B_1$" is "11111".

The number of "1" in the modulation input code "$B_5B_4B_3B_2B_1$" is focused. The signal level is "1" in a case where the number of bit values "1" is 0, the signal levels are "2" to "6" in a case where the number of bit values "1" is 1, and the signal levels are "7" to "16" in a case where the number of bit values "1" is 2. The signal levels are "17" to "26" in a case where the number of bit values "1" is 3, the signal levels are "27" to "31" in a case where the number of bit values "1" is 4, and the signal level is "32" in a case where the number of bit values "1" is 5. Bit strings in which the number of bit values "1" is 4 have bit configurations in which "1" and "0" are inverted and horizontally inverted when the bit strings are arranged in order from the smallest N-digit binary number. Bit strings in which the number of bit values "1" is 3 have bit configurations in which "1" and "0" are inverted and horizontally inverted when the bit strings are arranged in order from the smallest N-digit binary number. Bit strings in which the number of bit values "1" is 2 have bit configurations in which "1" and "0" are inverted and horizontally inverted when the bit strings are arranged in order from the smallest N-digit binary number. Bit strings in which the number of bit values "1" is 1 have bit configurations in which "1" and "0" are inverted and horizontally inverted when the bit strings are arranged in order from the smallest N-digit binary number.

In addition, the bit configurations in the modulation input code "$B_5B_4B_3B_2B_1$" of the signal levels "1" and "32" are symmetrical in which "0" and "1" are bit-inverted, and the bit configurations in the modulation input code "$B_5B_4B_3B_2B_1$" of the signal levels "2" and "31" are symmetrical. The bit configurations in the modulation input code "$B_5B_4B_3B_2B_1$" of the signal levels "3" and "30" are symmetrical, and the bit configurations in the modulation input code "$B_5B_4B_3B_2B_1$" of the signal levels "4" and "29" are symmetrical. The bit configurations in the modulation input code "$B_5B_4B_3B_2B_1$" of the signal levels "5" and "28" are symmetrical, and the bit configurations in the modulation input code "$B_5B_4B_3B_2B_1$" of the signal levels "6" and "27" are symmetrical. The bit configurations in the modulation input code "$B_5B_4B_3B_2B_1$" of the signal levels "7" and "26" are symmetrical, and the bit configurations in the modulation input code "$B_5B_4B_3B_2B_1$" of the signal levels "8" and "25" are symmetrical.

In order to obtain a correspondence between an increase in the signal level and an increase in a phase shift amount, as a prerequisite for lengths of $B_1$, $B_2$, $B_3$, $B_4$, and $B_5$, it is assumed that relationships of the length of $B_1$<the length of $B_2$<the length of $B_3$<the length of $B_4$<the length of $B_5$<the length of $B_1+B_2$, the length of $B_1+B_5$<the length of $B_2+B_3$, the length of $B_2+B_5$<the length of $B_3+B_4$, and the length of $B_4+B_5$<the length of $B_1+B_2+B_3$ are ensured. Note that the length of $B_1$ is an electrode length of a first phase shifter 16A, the length of $B_2$ is an electrode length of a second phase shifter 16B, the length of $B_3$ is an electrode length of a third phase shifter 16C, the length of $B_4$ is an electrode length of a fourth phase shifter 16D, and the length of $B_5$ is an electrode length of a fifth phase shifter 16E. As a result, the correspondence between an increase in the signal level and an increase in the phase shift amount may be directly obtained from the signal level "1" to the signal level "16". Furthermore, the correspondence between an increase in the signal level and an increase in the phase shift amount may be also obtained from the signal level "17" to the signal level "32", because signs of the signal level "1" to the signal level "16" are inverted by folding back.

FIG. 23B is an explanatory diagram illustrating an example of a creation rule of the symbol mapping illustrated in FIG. 23A. Note that, for convenience of description, it is assumed that the number of bits N of the modulation input code in the symbol mapping is N=5 bits. As the creation rule, N-digit binary numbers in which the number of bit values "1" is N−1 (for example, "4") are arranged from the smallest, N-digit binary numbers in which the number of bit values "1" is N−2 (for example, "3") are arranged from the smallest, N-digit binary numbers in which the number of bit values "1" is N−3 (for example, "2") are arranged from the smallest, and N-digit binary numbers in which the number of bit values "1" is N−4 (for example, "1") are arranged from the smallest.

Moreover, as the creation rule, "1" and "0" in the N-digit binary numbers in which the number of bit values "1" is N−1 (for example, "4") after the rearrangement are inverted, "1" and "0" in the N-digit binary numbers in which the number of bit values "1" is N−2 (for example, "3") after the rearrangement are inverted, "1" and "0" in the N-digit binary numbers in which the number of bit values "1" is N−3 (for example, "2") after the rearrangement are inverted, and "1" and "0" in the N-digit binary numbers in which the number of bit values "1" is N−4 (for example, "1") after the rearrangement are inverted.

Moreover, as the creation rule, the N-digit binary numbers in which the number of bit values "1" is N−1 (for example, "4") after the inversion are horizontally inverted, the N-digit binary numbers in which the number of bit values "1" is N−2 (for example, "3") after the inversion are horizontally inverted, the N-digit binary numbers in which the number of bit values "1" is N−3 (for example, "2") after the inversion are horizontally inverted, and the N-digit binary numbers in which the number of bit values "1" is N−4 (for example, "1") after the inversion are horizontally inverted. Then, the symbol mapping illustrated in FIG. 23A conforming to these creation rules may be created.

Since a DAC 13 is a 5-bit DAC, the DAC 13 includes five voltage conversion units, for example, a first voltage conversion unit 17A, a second voltage conversion unit 17B, a third voltage conversion unit 17C, a fourth voltage conversion unit 17D, and a fifth voltage conversion unit 17E. The first voltage conversion unit 17A converts a data signal of the first bit value $B_1$ of the modulation input code from the encoder 12 into a voltage. The second voltage conversion unit 17B converts a data signal of the second bit value $B_2$ of the modulation input code from the encoder 12 into a voltage. The third voltage conversion unit 17C converts a data signal of the third bit value $B_3$ of the modulation input code from the encoder 12 into a voltage. The fourth voltage conversion unit 17D converts a data signal of the fourth bit value $B_4$ of the modulation input code from the encoder 12 into a voltage. The fifth voltage conversion unit 17E converts a data signal of the fifth bit value $B_5$ of the modulation input code from the encoder 12 into a voltage.

An upper arm 15A1 performs intensity modulation of an optical signal from a light source 2 with a data signal after analog conversion, and outputs a horizontally polarized optical modulation signal after the intensity modulation. A lower arm 15B1 performs intensity modulation of an optical signal from the light source 2 with a data signal after analog conversion, and outputs a vertically polarized optical modulation signal after the intensity modulation. Note that, since the data signal is a 5-bit digital signal, each of the arms 15 outputs a 32-value optical modulation signal having the signal level 1 to the signal level 32.

The upper arm 15A1 includes a first phase shifter group, which is a plurality of phase shifters connected in series, for example, a first phase shifter 16A, a second phase shifter 16B, a third phase shifter 16C, a fourth phase shifter 16D, and a fifth phase shifter 16E. The lower arm 15B1 includes a second phase shifter group, which is also a plurality of phase shifters connected in series, for example, a first phase shifter 16A, a second phase shifter 16B, a third phase shifter 16C, a fourth phase shifter 16D, and a fifth phase shifter 16E. Note that the first phase shifters 16A of the upper arm 15A1 and the lower arm 15B1 have the same electrode length $L_1$, and the second phase shifters 16B of the upper arm 15A1 and the lower arm 15B1 have the same electrode length $L_2$. The third phase shifters 16C of the upper arm 15A1 and the lower arm 15B1 have the same electrode length $L_3$, and the fourth phase shifters 16D of the upper arm 15A1 and the lower arm 15B1 have the same electrode length $L_4$. The fifth phase shifters 16E of the upper arm 15A1 and the lower arm 15B1 have the same electrode length $L_5$.

The first voltage conversion unit 17A applies the data signal of the first bit value $B_1$ after the voltage conversion to an electrode of the first phase shifter 16A of the upper arm 15A1. The first voltage conversion unit 17A inverts the data signal of the first bit value $B_1$ after the voltage conversion, and applies the data signal of the first bit value $B_1$ after the inversion to an electrode of the first phase shifter 16A of the lower arm 15B1. The second voltage conversion unit 17B applies the data signal of the second bit value $B_2$ after the voltage conversion to an electrode of the second phase shifter 16B of the upper arm 15A1. The second voltage conversion unit 17B inverts the data signal of the second bit value $B_2$ after the voltage conversion, and applies the data signal of the second bit value $B_2$ after the inversion to an electrode of the second phase shifter 16B of the lower arm 15B1. The third voltage conversion unit 17C applies the data signal of the third bit value $B_3$ after the voltage conversion to an electrode of the third phase shifter 16C of the upper arm 15A1. The third voltage conversion unit 17C inverts the data signal of the third bit value $B_3$ after the voltage conversion, and applies the data signal of the third bit value $B_3$ after the inversion to an electrode of the third phase shifter 16C of the lower arm 15B1.

The fourth voltage conversion unit 17D applies the data signal of the fourth bit value $B_4$ after the voltage conversion to an electrode of the fourth phase shifter 16D of the upper arm 15A1. The fourth voltage conversion unit 17D inverts the data signal of the fourth bit value $B_4$ after the voltage conversion, and applies the data signal of the fourth bit value $B_4$ after the inversion to an electrode of the fourth phase shifter 16D of the lower arm 15B1. The fifth voltage conversion unit 17E applies the data signal of the fifth bit value $B_5$ after the voltage conversion to an electrode of the fifth phase shifter 16E of the upper arm 15A1. The fifth voltage conversion unit 17E inverts the data signal of the fifth bit value $B_5$ after the voltage conversion, and applies the data signal of the fifth bit value $B_5$ after the inversion to an electrode of the fifth phase shifter 16E of the lower arm 15B1.

The optical modulator 3J adjusts a ratio of the phase shift amounts (electrode lengths) of the first to fifth phase shifters 16A to 16E so as to make electric field intensities for the respective signal levels (1 to 32) at equal intervals. For example, a ratio of the electrode lengths of the first phase shifter 16A, the second phase shifter 16B, the third phase shifter 16C, the fourth phase shifter 16D, and the fifth phase shifter 16E is set to, for example, $L_1:L_2:L_3:L_4:L_5=117:177:213:236:257$. As a result, since the electric field intensities for the respective signal levels (1 to 32) are at equal intervals, a linear part of a sine curve, which represents a correspondence between the electric field intensity of a 32 ASK modulation signal and the phase shift amount, may be sufficiently ensured.

The first phase shifter 16A of the upper arm 15A1 performs intensity modulation of an optical signal with the data signal of the first bit value $B_1$ from the first voltage conversion unit 17A. Furthermore, the first phase shifter 16A of the lower arm 15B1 performs intensity modulation of an optical signal with the data signal of the first bit value $B_1$ after the inversion from the first voltage conversion unit 17A. The second phase shifter 16B of the upper arm 15A1 performs intensity modulation of the optical signal with the data signal of the second bit value $B_2$ from the second voltage conversion unit 17B. Furthermore, the second phase shifter 16B of the lower arm 15B1 performs intensity modulation of the optical signal with the data signal of the second bit value $B_2$ after the inversion from the second voltage conversion unit 17B. The third phase shifter 16C of the upper arm 15A1 performs intensity modulation of the optical signal with the data signal of the third bit value $B_3$ from the third voltage conversion unit 17C. Furthermore, the third phase shifter 16C of the lower arm 15B1 performs intensity modulation of the optical signal with the data signal of the third bit value $B_3$ after the inversion from the third voltage conversion unit 17C. The fourth phase shifter 16D of the upper arm 15A1 performs intensity modulation of the optical signal with the data signal of the fourth bit value $B_4$ from the fourth voltage conversion unit 17D. Furthermore, the fourth phase shifter 16D of the lower arm 15B1 performs intensity modulation of the optical signal with the data signal of the fourth bit value $B_4$ after the inversion from the fourth voltage conversion unit 17D. The fifth phase shifter 16E of the upper arm 15A1 performs intensity modulation of the optical signal with the data signal of the fifth bit value $B_5$ from the fifth voltage conversion unit 17E. Furthermore, the fifth phase shifter 16E of the lower arm 15B1 performs intensity modulation of the optical signal with the data signal of the fifth bit value $B_5$ after the inversion from the fifth voltage conversion unit 17E.

Figure 24:
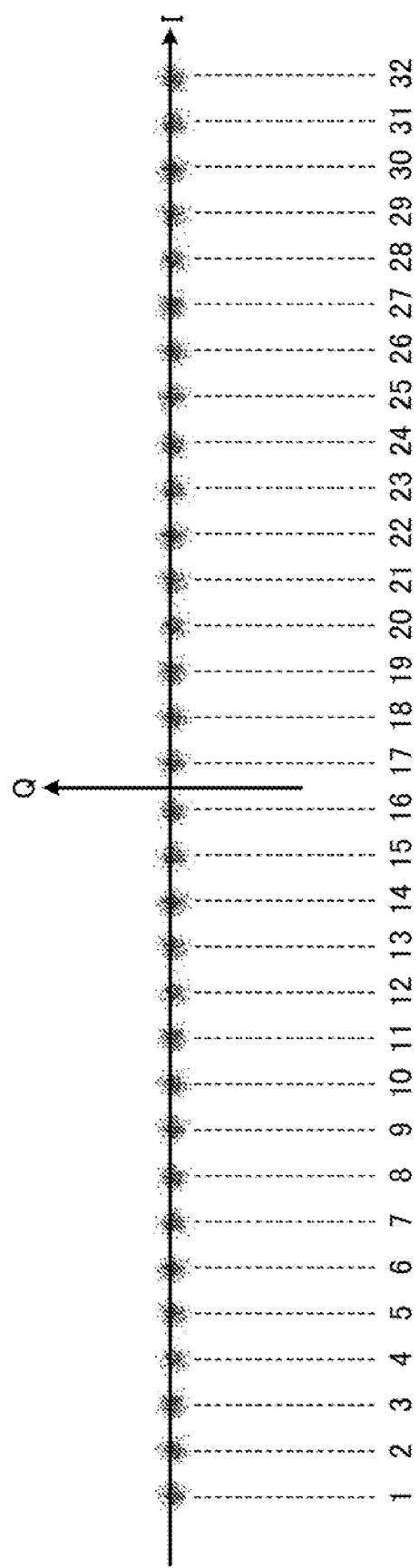
FIG. 24 is an explanatory diagram illustrating an example of a symbol of the optical modulator.

The upper arm 15A1 outputs the optical modulation signal after the intensity modulation with the data signal to a multiplexing unit 23. Moreover, the lower arm 15B1 outputs the optical modulation signal after the intensity modulation with the data signal to the multiplexing unit 23. The multiplexing unit 23 multiplexes the optical modulation signal after the intensity modulation by the upper arm 15A1 and the optical modulation signal after the intensity modulation by the lower arm 15B1, and outputs a 32 ASK modulation signal. FIG. 24 is an explanatory diagram illustrating an example of a symbol of the optical modulator 3J. The symbol illustrated in FIG. 24 is a symbol of a 32 ASK modulation signal output by the optical modulator 3J.

In order to make the electric field intensities for the respective signal levels (1 to 32) at equal intervals, the optical modulator 3J of the seventh embodiment adjusts, while converting the gray code of the data signal into the modulation input code, the electrode lengths of the phase shifters to which the data signal according to the modulation input code after the conversion is applied. As a result, since the linear part of the sine curve, which represents the correspondence between the electric field intensity and the phase shift amount, is sufficiently ensured, a modulation loss and power consumption may be suppressed while making the signal level intervals equal.

Figure 25A:
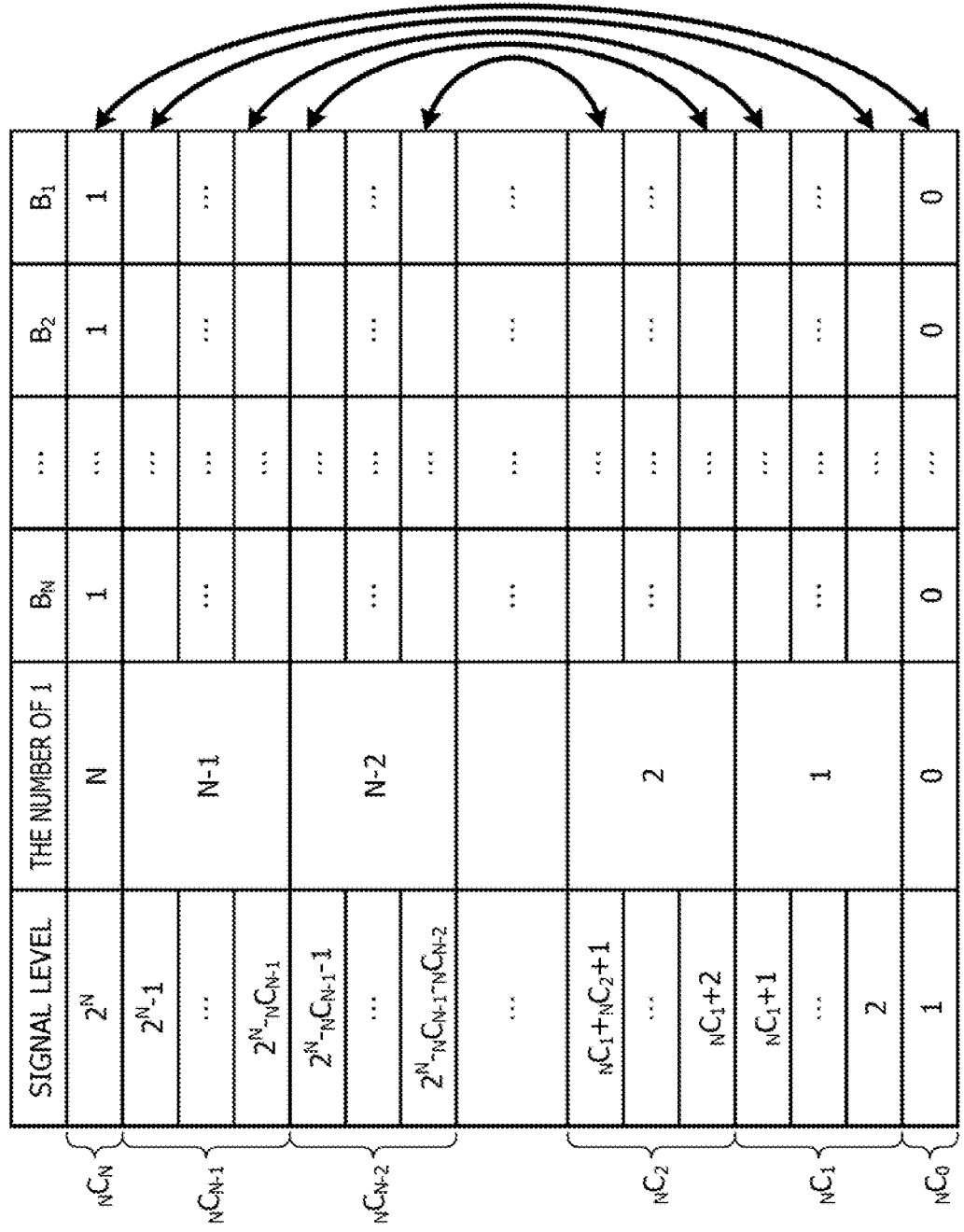
FIG. 25A is an explanatory diagram illustrating an example of a correspondence (symbol mapping) between a signal level of an encoder for N bits and a modulation input code.

Note that, although the encoder 12 for 5 bits has been exemplified for convenience of description, the encoder 12 is not limited to the encoder for 5 bits, and an encoder 12 for N bits may be used. FIG. 25A is an explanatory diagram illustrating an example of a correspondence between a signal level of the encoder 12 for N bits and a modulation input code. As illustrated in FIG. 25A, bit configurations in the signal level and the modulation input code are symmetrical in which "0" and "1" are reversed.

FIG. 25B is an explanatory diagram illustrating an example of a creation rule of the symbol mapping illustrated in FIG. 25A. Note that, for convenience of description, it is assumed that the number of bits N of the modulation input code in the symbol mapping is N bits. As the creation rule, N-digit binary numbers in which the number of bit values "1" is N−1 are arranged from the smallest, N-digit binary numbers in which the number of bit values "1" is N−2 are arranged from the smallest, and N-digit binary numbers until the number of bit values "1" becomes 1 are sequentially arranged from the smallest.

Moreover, as the creation rule, "1" and "0" in the N-digit binary numbers in which the number of bit values "1" is N−1 after the rearrangement are inverted, "1" and "0" in the N-digit binary numbers in which the number of bit values "1" is N−2 after the rearrangement are inverted, and "1" and "0" in the N-digit binary numbers until the number of bit values "1" becomes 1 are sequentially inverted.

Moreover, as the creation rule, the N-digit binary numbers in which the number of bit values "1" is N−1 after the inversion are horizontally inverted, the N-digit binary numbers in which the number of bit values "1" is N−2 after the inversion are horizontally inverted, and the N-digit binary numbers until the number of bit values "1" becomes 1 are sequentially horizontally inverted. Then, the symbol mapping illustrated in FIG. 25A conforming to these creation rules may be created. Note that the correspondence between an increase in the signal level and an increase in the phase shift amount is a relationship that satisfies the creation rule of the symbol mapping of FIG. 25B. As a result, the correspondence between an increase in the signal level and an increase in the phase shift amount may be directly obtained from a signal level "1" to a signal level "$2^N/2$". Furthermore, the correspondence between an increase in the signal level and an increase in the phase shift amount may be also ensured from a signal level "$(2^N/2)+1$" to a signal level "$2^N$", because signs of the signal level "1" to the signal level "$2^N/2$" are inverted by folding back.

Eighth Embodiment

Figure 26:
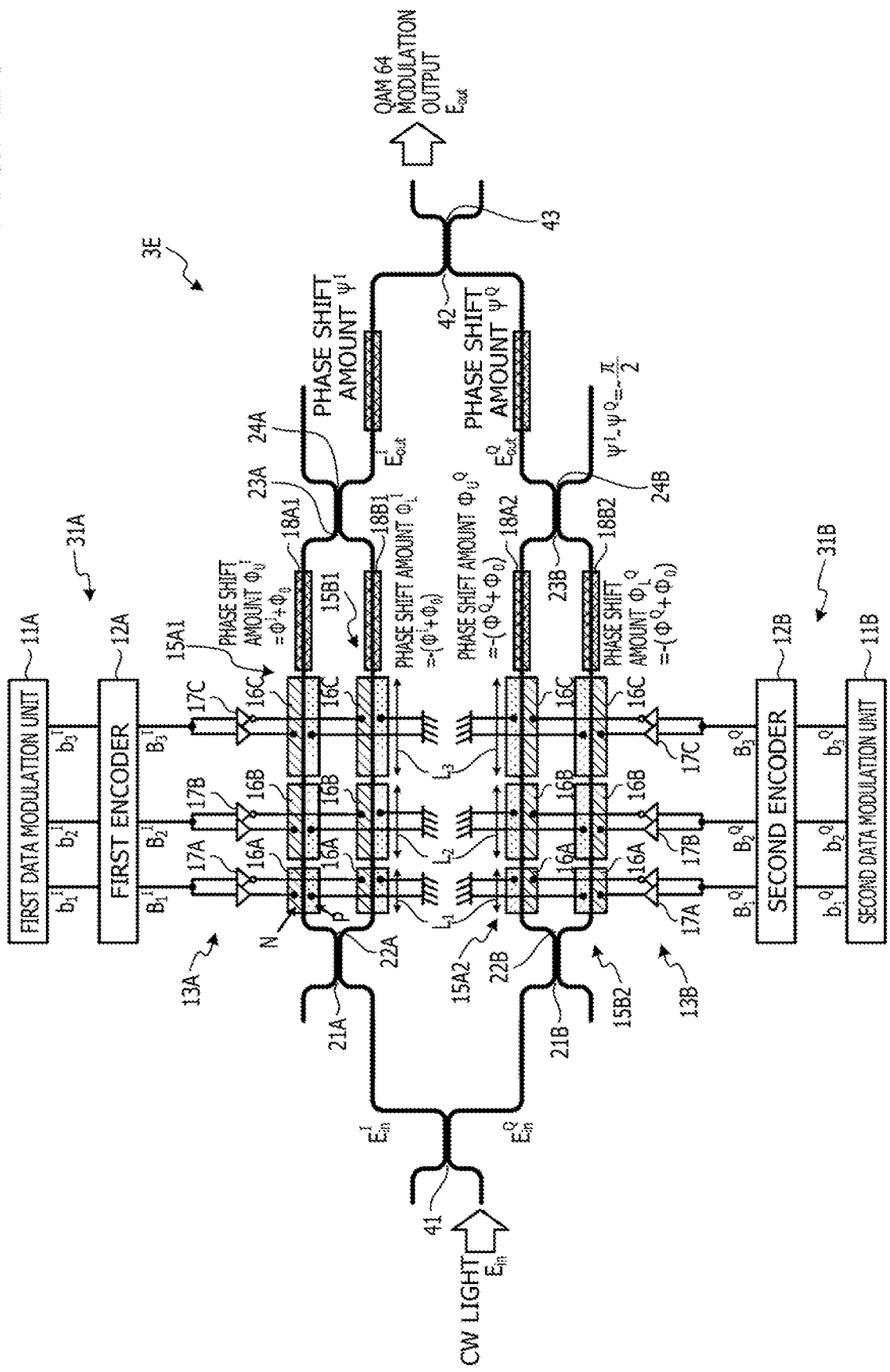
FIG. 26 is a schematic plan view illustrating an example of a configuration of an optical modulator of an eighth embodiment.

FIG. 26 is a schematic plan view illustrating an example of a configuration of an optical modulator 3E of an eighth embodiment. The optical modulator 3E illustrated in FIG. 26 includes an input-side branch unit 41, a first optical modulation unit 31A, a second optical modulation unit 31B, an output-side multiplexing unit 42, and an output-side branch unit 43. The input-side branch unit 41 branches an optical signal from a light source 2 into an I-side optical signal and a Q-side optical signal, outputs the I-side optical signal to the first optical modulation unit 31A, and at the same time, outputs the Q-side optical signal to the second optical modulation unit 31B. The first optical modulation unit 31A is a modulation unit that performs intensity modulation of an I-side optical signal and outputs an I-side 8 ASK modulation signal after the intensity modulation. The second optical modulation unit 31B is a modulation unit that performs intensity modulation of a Q-side optical signal and outputs a Q-side 8 ASK modulation signal after the intensity modulation.

The first optical modulation unit 31A includes a first data modulation unit 11A, a first encoder 12A, a first DAC 13A, a first optical waveguide 14A, and a first upper arm 15A1 and a first lower arm 15B1 arranged on the first optical waveguide 14A. The first optical modulation unit 31A includes a first upper heater 18A1 and a first lower heater 18B1. The first data modulation unit 11A performs modulation into an I-side bit string data signal. The first encoder 12A converts an I-side bit string data signal into a modulation input code. The first encoder 12A converts a first bit value $b_1$ in the I-side bit string data signal into a first bit value $B_1$ in the modulation input code. The first encoder 12A converts a second bit value $b_2$ in the I-side bit string data signal into a second bit value $B_2$ in the modulation input code. The first encoder 12A converts a third bit value $b_3$ in the I-side bit string data signal into a third bit value $B_3$ in the modulation input code.

FIG. 27 is an explanatory diagram illustrating an example of a correspondence between an input and an output of each of the first encoder 12A and second encoder 12B for 3 bits. As illustrated in FIG. 27, the first encoder 12A converts a gray code "$b_3b_2b_1$" of an I-side data signal into a modulation input code "$B_3B_2B_1$". In a case where the gray code is "100", the first encoder 12A converts the gray code "100" into a modulation input code "111". In a case where the gray code is "001", the first encoder 12A converts the gray code "001" into a modulation input code "001". In a case where the gray code is "011", the first encoder 12A converts the gray code "011" into a modulation input code "010". In a case where the gray code is "010", the first encoder 12A converts the gray code "010" into a modulation input code "100". In a case where the gray code is "110", the first encoder 12A converts the gray code "110" into a modulation input code "011". In a case where the gray code is "111", the first encoder 12A converts the gray code "111" into a modulation input code "101". In a case where the gray code is "101", the first encoder 12A converts the gray code "101" into a modulation input code "110". In a case where the gray code is "100", the first encoder 12A converts the gray code "100" into a modulation input code "111".

The first DAC 13A converts a modulation input code of an I-side data signal from the first encoder 12A into an analog signal, for example, into a voltage. Since the first DAC 13A is a 3-bit DAC, the first DAC 13A includes three voltage conversion units, for example, a first voltage conversion unit 17A, a second voltage conversion unit 17B, and a third voltage conversion unit 17C. The first voltage conversion unit 17A converts an I-side data signal of the first bit value $B_1$ of the modulation input code from the first encoder 12A into a voltage. The second voltage conversion unit 17B converts an I-side data signal of the second bit value $B_2$ of the modulation input code from the first encoder 12A into a voltage. The third voltage conversion unit 17C converts an I-side data signal of the third bit value $B_3$ of the modulation input code from the first encoder 12A into a voltage.

The first optical waveguide 14A includes a waveguide core of Si or the like and a waveguide clad of $SiO_2$ or the like. The first optical waveguide 14A includes a first input unit 21A, a first branch unit 22A, a first multiplexing unit 23A, and a first output unit 24A. The first input unit 21A inputs an I-side optical signal (CW light) from the input-side branch unit 41. The first branch unit 22A branches an I-side optical signal from the first input unit 21A into the first upper arm 15A1 and the first lower arm 15B1. The first upper arm 15A1 and the first lower arm 15B1 are, for example, an MZ interferometer.

The first upper arm 15A1 performs intensity modulation of an I-side optical signal with an I-side data signal after analog conversion, and outputs a horizontally polarized optical modulation signal after the intensity modulation. The first lower arm 15B1 performs intensity modulation of an I-side optical signal with an I-side data signal after analog conversion, and outputs a vertically polarized optical modulation signal after the intensity modulation. Note that, since the I-side data signal is a 3-bit digital signal, each of the first upper arm 15A1 and the first lower arm 15B1 outputs an I-side 8 ASK modulation signal, which is an 8-value optical modulation signal having a signal level 1 to a signal level 8.

The first upper arm 15A1 includes a first phase shifter group, which is a plurality of phase shifters connected in series, for example, a first phase shifter 16A, a second phase shifter 16B, and a third phase shifter 16C. The first lower arm 15B1 includes a second phase shifter group, which is also a plurality of phase shifters connected in series, for example, a first phase shifter 16A, a second phase shifter 16B, and a third phase shifter 16C. Note that the first phase shifters 16A of the first upper arm 15A1 and the first lower arm 15B1 have the same electrode length $L_i$, and the second phase shifters 16B of the first upper arm 15A1 and the first lower arm 15B1 have the same electrode length $L_2$. Moreover, the third phase shifters 16C of the first upper arm 15A1 and the first lower arm 15B1 have the same electrode length $L_3$.

The first voltage conversion unit 17A applies the I-side data signal of the first bit value $B_1$ after the voltage conversion to an electrode of the first phase shifter 16A of the first upper arm 15A1. The first voltage conversion unit 17A inverts the I-side data signal of the first bit value $B_1$ after the voltage conversion, and applies the I-side data signal of the first bit value $B_1$ after the inversion to an electrode of the first phase shifter 16A of the first lower arm 15B1. The second voltage conversion unit 17B applies the I-side data signal of the second bit value $B_2$ after the voltage conversion to an electrode of the second phase shifter 16B of the first upper arm 15A1. The second voltage conversion unit 17B inverts the I-side data signal of the second bit value $B_2$ after the voltage conversion, and applies the I-side data signal of the second bit value $B_2$ after the inversion to an electrode of the second phase shifter 16B of the first lower arm 15B1. The third voltage conversion unit 17C applies the I-side data signal of the third bit value $B_3$ after the voltage conversion to an electrode of the third phase shifter 16C of the first upper arm 15A1. The third voltage conversion unit 17C inverts the I-side data signal of the third bit value $B_3$ after the voltage conversion, and applies the I-side data signal of the third bit value $B_3$ after the inversion to an electrode of the third phase shifter 16C of the first lower arm 15B1.

The first upper heater 18A1 adjusts a phase shift amount of the first upper arm 15A1 according to temperature adjustment. Furthermore, the first lower heater $18B_1$ adjusts a phase shift amount of the first lower arm 15B1 according to temperature adjustment.

The first phase shifter 16A of the first upper arm 15A1 performs intensity modulation of an I-side optical signal with the I-side data signal of the first bit value $B_1$ from the first voltage conversion unit 17A. Furthermore, the first phase shifter 16A of the first lower arm 15B1 performs intensity modulation of an I-side optical signal with the I-side data signal of the first bit value $B_1$ after the inversion from the first voltage conversion unit 17A. The second phase shifter 16B of the first upper arm 15A1 performs intensity modulation of the I-side optical signal with the I-side data signal of the second bit value $B_2$ from the second voltage conversion unit 17B. Furthermore, the second phase shifter 16B of the first lower arm 15B1 performs intensity modulation of the I-side optical signal with the I-side data signal of the second bit value $B_2$ after the inversion from the second voltage conversion unit 17B. The third phase shifter 16C of the first upper arm 15A1 performs intensity modulation of the I-side optical signal with the I-side data signal of the third bit value $B_3$ from the third voltage conversion unit 17C. Furthermore, the third phase shifter 16C of the first lower arm 15B1 performs intensity modulation of the I-side optical signal with the I-side data signal of the third bit value $B_3$ after the inversion from the third voltage conversion unit 17C.

The first upper arm 15A1 outputs the I-side optical modulation signal after the intensity modulation with the I-side data signal to the first multiplexing unit 23A. Moreover, the first lower arm 15B1 outputs the I-side optical modulation signal after the intensity modulation with the I-side data signal to the first multiplexing unit 23A. The first multiplexing unit 23A multiplexes the I-side optical modulation signal after the intensity modulation by the first upper arm 15A1 and the I-side optical modulation signal after the intensity modulation by the first lower arm 15B1. Then, the first multiplexing unit 23A outputs, from the first output unit 24A, an I-side 8 ASK modulation signal after the multiplexing as an output of the first optical modulation unit 31A. The first output unit 24A adjusts a phase shift of the I-side 8 ASK modulation signal with the heaters and then outputs the I-side 8 ASK modulation signal after the phase shift adjustment to the output-side multiplexing unit 42.

In the first optical modulation unit 31A, a ratio of the electrode lengths of the first phase shifter 16A, the second phase shifter 16B, and the third phase shifter 16C is set to, for example, $L_1:L_2:L_3=21:34:45$ so as to make optical intensities for the respective signal levels (1 to 8) at equal intervals. As a result, since the optical intensities for the respective signal levels (1 to 8) are at equal intervals, a linear part of a sine curve, which represents a correspondence between the optical intensity of the 8 ASK modulation signal and the phase shift amount, may be sufficiently ensured.

The second optical modulation unit 31B includes a second data modulation unit 11B, the second encoder 12B, a second DAC 13B, a second optical waveguide 14B, and a second upper arm 15A2 and a second lower arm 15B2 arranged on the second optical waveguide 14B. The second optical modulation unit 31B includes a second upper heater 18A2 and a second lower heater 18B2. The second data modulation unit 11B performs modulation into a Q-side bit string data signal. The second encoder 12B converts a Q-side bit string data signal into a modulation input code. The second encoder 12B converts a first bit value $b_1$ in the Q-side bit string data signal into a first bit value $B_1$ in the modulation input code. The second encoder 12B converts a second bit value $b_2$ in the Q-side bit string data signal into a second bit value $B_2$ in the modulation input code. The second encoder 12B converts a third bit value $b_3$ in the Q-side bit string data signal into a third bit value $B_3$ in the modulation input code.

As illustrated in FIG. 27, the second encoder 12B converts a gray code "$b_3b_2b_1$" of a Q-side data signal into a modulation input code "$B_3B_2B_1$". In a case where the gray code is "100", the second encoder 12B converts the gray code "100" into a modulation input code "111". In a case where the gray code is "001", the second encoder 12B converts the gray code "001" into a modulation input code "001". In a case where the gray code is "011", the second encoder 12B converts the gray code "011" into a modulation input code "010". In a case where the gray code is "010", the second encoder 12B converts the gray code "010" into a modulation input code "100". In a case where the gray code is "110", the second encoder 12B converts the gray code "110" into a modulation input code "011". In a case where the gray code is "111", the second encoder 12B converts the gray code "111" into a modulation input code "101". In a case where the gray code is "101", the second encoder 12B converts the gray code "101" into a modulation input code "110". In a case where the gray code is "100", the second encoder 12B converts the gray code "100" into a modulation input code "111".

The second DAC 13B converts a modulation input code of a Q-side data signal from the second encoder 12B into an analog signal, for example, into a voltage. Since the second DAC 13B is a 3-bit DAC, the second DAC 13B includes three voltage conversion units, for example, a first voltage conversion unit 17A, a second voltage conversion unit 17B, and a third voltage conversion unit 17C. The first voltage conversion unit 17A converts a Q-side data signal of the first bit value $B_1$ of the modulation input code from the second encoder 12B into a voltage. The second voltage conversion unit 17B converts a Q-side data signal of the second bit value $B_2$ of the modulation input code from the second encoder 12B into a voltage. The third voltage conversion unit 17C converts a Q-side data signal of the third bit value $B_3$ of the modulation input code from the second encoder 12B into a voltage.

The second optical waveguide 14B includes a waveguide core of Si or the like and a waveguide clad of $SiO_2$ or the like. The second optical waveguide 14B includes a second input unit 21B, a second branch unit 22B, a second multiplexing unit 23B, and a second output unit 24B. The second input unit 21B inputs a Q-side optical signal (CW light) from the input-side branch unit 41. The second branch unit 22B branches a Q-side optical signal from the second input unit 21B into the second upper arm 15A2 and the second lower arm 15B2. The second upper arm 15A2 and the second lower arm 15B2 are, for example, an MZ interferometer.

The second upper arm 15A2 performs intensity modulation of a Q-side optical signal with a Q-side data signal after analog conversion, and outputs a horizontally polarized optical modulation signal after the intensity modulation. The second lower arm 15B2 performs intensity modulation of a Q-side optical signal with a Q-side data signal after analog conversion, and outputs a vertically polarized optical modulation signal after the intensity modulation. Note that, since the Q-side data signal is a 3-bit digital signal, each of the second upper arm 15A2 and the second lower arm 15B2 outputs a Q-side 8 ASK modulation signal, which is an 8-value optical modulation signal having a signal level 1 to a signal level 8.

The second upper arm 15A2 includes a first phase shifter group, which is a plurality of phase shifters connected in series, for example, a first phase shifter 16A, a second phase shifter 16B, and a third phase shifter 16C. The second lower arm 15B2 includes a second phase shifter group, which is also a plurality of phase shifters connected in series, for example, a first phase shifter 16A, a second phase shifter 16B, and a third phase shifter 16C. Note that the first phase shifters 16A of the second upper arm 15A2 and the second lower arm 15B2 have the same electrode length $L_1$, and the second phase shifters 16B of the second upper arm 15A2 and the second lower arm 15B2 have the same electrode length $L_2$. Moreover, the third phase shifters 16C of the second upper arm 15A2 and the second lower arm 15B2 have the same electrode length $L_3$.

The first voltage conversion unit 17A applies the Q-side data signal of the first bit value $B_1$ after the voltage conversion to an electrode of the first phase shifter 16A of the second upper arm 15A2. The first voltage conversion unit 17A inverts the Q-side data signal of the first bit value $B_1$ after the voltage conversion, and applies the Q-side data signal of the first bit value $B_1$ after the inversion to an electrode of the first phase shifter 16A of the second lower arm 15B2. The second voltage conversion unit 17B applies the Q-side data signal of the second bit value $B_2$ after the voltage conversion to an electrode of the second phase shifter 16B of the second upper arm 15A2. The second voltage conversion unit 17B inverts the Q-side data signal of the second bit value $B_2$ after the voltage conversion, and applies the Q-side data signal of the second bit value $B_2$ after the inversion to an electrode of the second phase shifter 16B of the second lower arm 15B2. The third voltage conversion unit 17C applies the Q-side data signal of the third bit value $B_3$ after the voltage conversion to an electrode of the third phase shifter 16C of the second upper arm 15A2. The third voltage conversion unit 17C inverts the Q-side data signal of the third bit value $B_3$ after the voltage conversion, and applies the Q-side data signal of the third bit value $B_3$ after the inversion to an electrode of the third phase shifter 16C of the second lower arm 15B2.

In the second optical modulation unit 31B, a ratio of the electrode lengths of the first phase shifter 16A, the second phase shifter 16B, and the third phase shifter 16C is set to, for example, $L_1:L_2:L_3=21:34:45$ so as to make optical intensities for the respective signal levels (1 to 8) at equal intervals. As a result, since the optical intensities for the respective signal levels (1 to 8) are at equal intervals, a linear part of a sine curve, which represents a correspondence between the optical intensity of the 8 ASK modulation signal and the phase shift amount, may be sufficiently ensured.

The second upper heater 18A2 adjusts a phase shift amount of the second upper arm 15A2 according to temperature adjustment. Furthermore, the second lower heater 18B2 adjusts a phase shift amount of the second lower arm 15B2 according to temperature adjustment.

The first phase shifter 16A of the second upper arm 15A2 performs intensity modulation of a Q-side optical signal with the Q-side data signal of the first bit value $B_1$ from the first voltage conversion unit 17A. Furthermore, the first phase shifter 16A of the second lower arm 15B2 performs intensity modulation of a Q-side optical signal with the Q-side data signal of the first bit value $B_1$ after the inversion from the first voltage conversion unit 17A. The second phase shifter 16B of the second upper arm 15A2 performs intensity modulation of the Q-side optical signal with the Q-side data signal of the second bit value $B_2$ from the second voltage conversion unit 17B. Furthermore, the second phase shifter 16B of the second lower arm 15B2 performs intensity modulation of the Q-side optical signal with the Q-side data signal of the second bit value $B_2$ after the inversion from the second voltage conversion unit 17B. The third phase shifter 16C of the second upper arm 15A2 performs intensity modulation of the Q-side optical signal with the Q-side data signal of the third bit value $B_3$ from the third voltage conversion unit 17C. Furthermore, the third phase shifter 16C of the second lower arm 15B2 performs intensity modulation of the Q-side optical signal with the Q-side data signal of the third bit value $B_3$ after the inversion from the third voltage conversion unit 17C.

The second upper arm 15A2 outputs the Q-side optical modulation signal after the intensity modulation with the Q-side data signal to the second multiplexing unit 23B. Moreover, the second lower arm 15B2 outputs the Q-side optical modulation signal after the intensity modulation with the Q-side data signal to the second multiplexing unit 23B. The second multiplexing unit 23B multiplexes the Q-side optical modulation signal after the intensity modulation by the second upper arm 15A2 and the Q-side optical modulation signal after the intensity modulation by the second lower arm 15B2. The second multiplexing unit 23B outputs, from the second output unit 24B, a Q-side 8 ASK modulation signal after the multiplexing as an output of the second optical modulation unit 31B. The second output unit 24B adjusts a phase shift of the Q-side 8 ASK modulation signal with the heaters and then outputs the Q-side 8 ASK modulation signal after the phase shift adjustment to the output-side multiplexing unit 42. The output-side multiplexing unit 42 multiplexes the I-side 8 ASK modulation signal and the Q-side 8 ASK modulation signal, and outputs a 64 quadrature amplitude modulation (QAM) modulation signal after the multiplexing to the output-side branch unit 43.

A phase shift amount $\varphi$ of the optical modulator 3E is as indicated in (Expression 10).

$$\Phi^{I,Q} \triangleq \sum_{m=1}^{N=3} B_m^{I,Q} \phi_m \qquad \text{[Expression 10]}$$

Phase shift amounts $\varphi 1$, $\varphi 2$, $\varphi 3$, and $\varphi 0$ of the optical modulator 3E are as indicated in (Expression 11). The phase shift amount $\varphi 1$ is about 0.57 rad, the phase shift amount $\varphi 2$ is about 0.91 rad, the phase shift amount $\varphi 3$ is about 1.2 rad, and the phase shift amount $\varphi 0$ is about 3.37 rad.

$$\phi_1 \sim 0.57 \text{ rad} \quad \phi_2 \sim 0.91 \text{ rad} \quad \phi_3 \sim 1.2 \text{rad} \qquad \text{[Expression 11]}$$

$$\Phi_0^{I,Q} = \frac{3}{2}\pi - \frac{\phi_1 + \phi_2 + \phi_3}{2} \sim 3.37 \text{rad}$$

The optical intensity of the first optical modulation unit 31A or the second optical modulation unit 31B is as indicated in (Expression 12).

$$E_{out}^{I,Q} = \frac{E_{in}^{I,Q}}{2}\left(e^{i\Phi_U^{I,Q}} + e^{i\Phi_L^{I,Q}}\right) = \frac{E_{in}^{I,Q}}{2}\cos(\Phi^{I,Q} + \Phi_0^{I,Q}) \qquad \text{[Expression 12]}$$

$$E_{in}^Q = \frac{1}{\sqrt{2}} E_{in}$$

The optical intensity of the optical modulator 3E is as indicated in (Expression 13).

$$E_{out} = \frac{1}{\sqrt{2}}\left(e^{i\psi^I} E_{out}^I + e^{i\psi^Q} i E_{out}^Q\right) = \qquad \text{[Expression 13]}$$

$$\frac{E_{in}}{4} e^{i\psi^Q} \left(\cos(\Phi^I + \Phi_0^I) + i\cos(\Phi^Q + \Phi_0^Q)\right)$$

Figure 28:
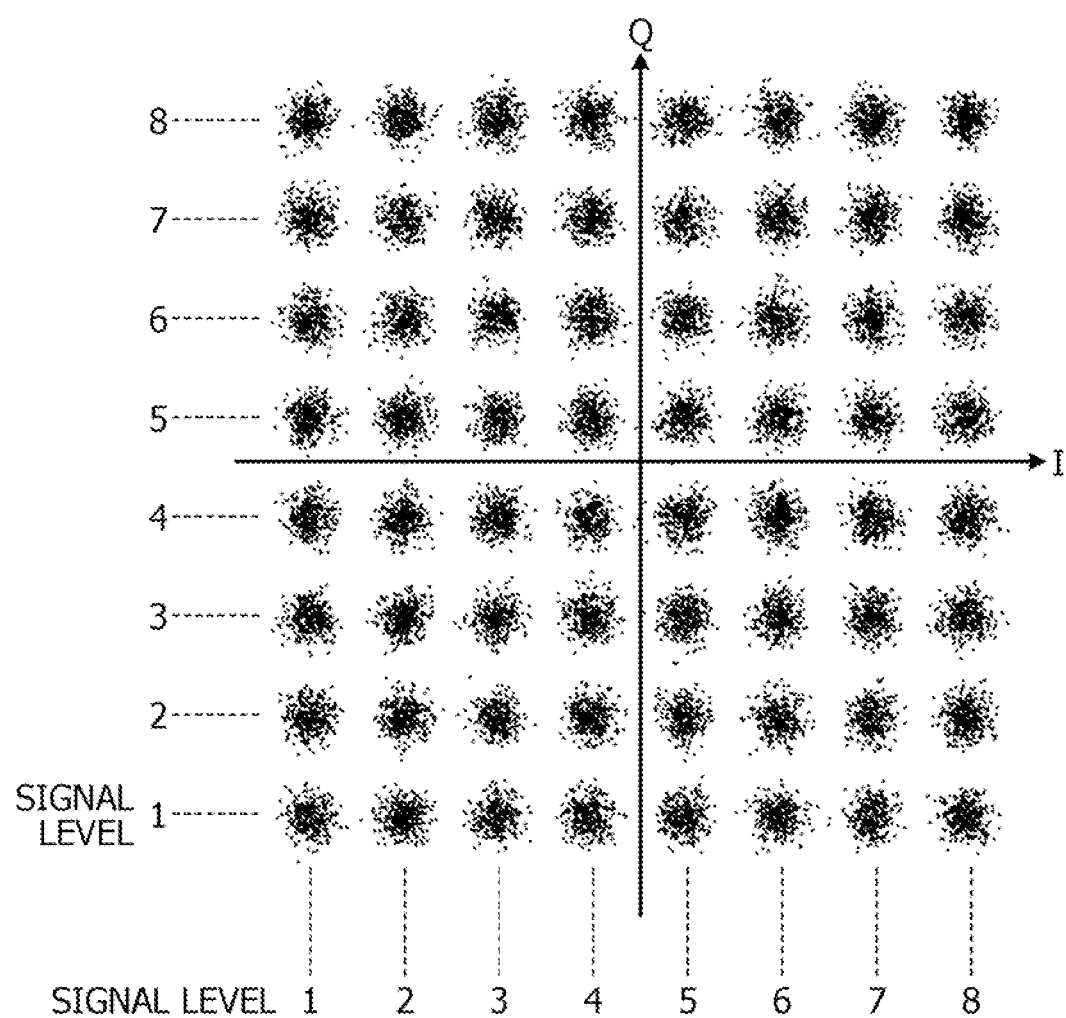
FIG. 28 is an explanatory diagram illustrating an example of a symbol of the optical modulator.

Then, the optical modulator 3E multiplexes the I-side 8 ASK modulation signal after the intensity modulation from the first optical modulation unit 31A and the Q-side 8 ASK modulation signal after the intensity modulation from the second optical modulation unit 31B, and outputs the 64 QAM modulation signal as an optical signal after the multiplexing. FIG. 28 is an explanatory diagram illustrating an example of a symbol of the optical modulator 3E. The symbol illustrated in FIG. 28 is a symbol of a 64 QAM modulation signal output by the optical modulator 3E.

In order to make the optical intensities for the respective signal levels (1 to 8) at equal intervals, the optical modulator 3E of the eighth embodiment adjusts, while converting the gray code of the data signal into the modulation input code, the electrode lengths of the phase shifters in the first optical modulation unit 31A and the second optical modulation unit 31B to which the data signal according to the modulation input code after the conversion is applied. As a result, since the linear part of the sine curve, which represents the correspondence between the optical intensity and the phase shift amount, is sufficiently ensured, a modulation loss and power consumption may be suppressed while making the signal level intervals equal.

Note that, for convenience of description, a case has been exemplified in which, in a state where electrode lengths of the first phase shifter group and the second phase shifter group are set to lengths at which the intervals of intensities of symbol points of a first optical modulation signal become equal, the first encoder 12A of the eighth embodiment encodes an input first data signal into a bit string in which the number of bits to be 1 increases or decreases according to the intensities of the symbol points of the first optical modulation signal. However, the present embodiment is not limited to the state where the electrode lengths of the first phase shifter group and the second phase shifter group are set to the lengths at which the intervals of the intensities of the symbol points of the first optical modulation signal become equal. For example, the present embodiment may be applied also to a case where a slight error occurs in the intervals of the intensities of the symbol points due to manufacturing variation or the like. Lengths of error ranges of the intervals of intensities of the symbol points are equal within a range of ±20% or less.

For example, in a state where the electrode lengths of the first phase shifter group and the second phase shifter group are set to predetermined lengths predetermined by the intervals of the intensities of the symbol points of the first optical modulation signal, the first encoder 12A encodes the input first data signal into the bit string in which the number of bits to be 1 increases or decreases according to the intensities of the symbol points of the first optical modulation signal. Even in this case, a modulation loss and power consumption may be suppressed.

A case has been exemplified in which, in a state where electrode lengths of a third phase shifter group and a fourth phase shifter group are set to lengths at which the intervals of intensities of symbol points of a second optical modulation signal become equal, the second encoder 12B encodes an input second data signal into a bit string in which the number of bits to be 1 increases or decreases according to the intensities of the symbol points of the second optical modulation signal. However, the present embodiment is not limited to the state where the electrode lengths of the third phase shifter group and the fourth phase shifter group are set to the lengths at which the intervals of the intensities of the symbol points of the second optical modulation signal become equal. For example, the present embodiment may be applied also to a case where a slight error occurs in the intervals of the intensities of the symbol points due to manufacturing variation or the like. Lengths of error ranges of the intervals of intensities of the symbol points are equal within a range of ±20% or less.

For example, in a state where the electrode lengths of the third phase shifter group and the fourth phase shifter group are set to predetermined lengths predetermined by the intervals of the intensities of the symbol points of the second optical modulation signal, the second encoder 12B encodes the input second data signal into the bit string in which the number of bits to be 1 increases or decreases according to the intensities of the symbol points of the second optical modulation signal. Even in this case, a modulation loss and power consumption may be suppressed.

Ninth Embodiment

Figure 29:
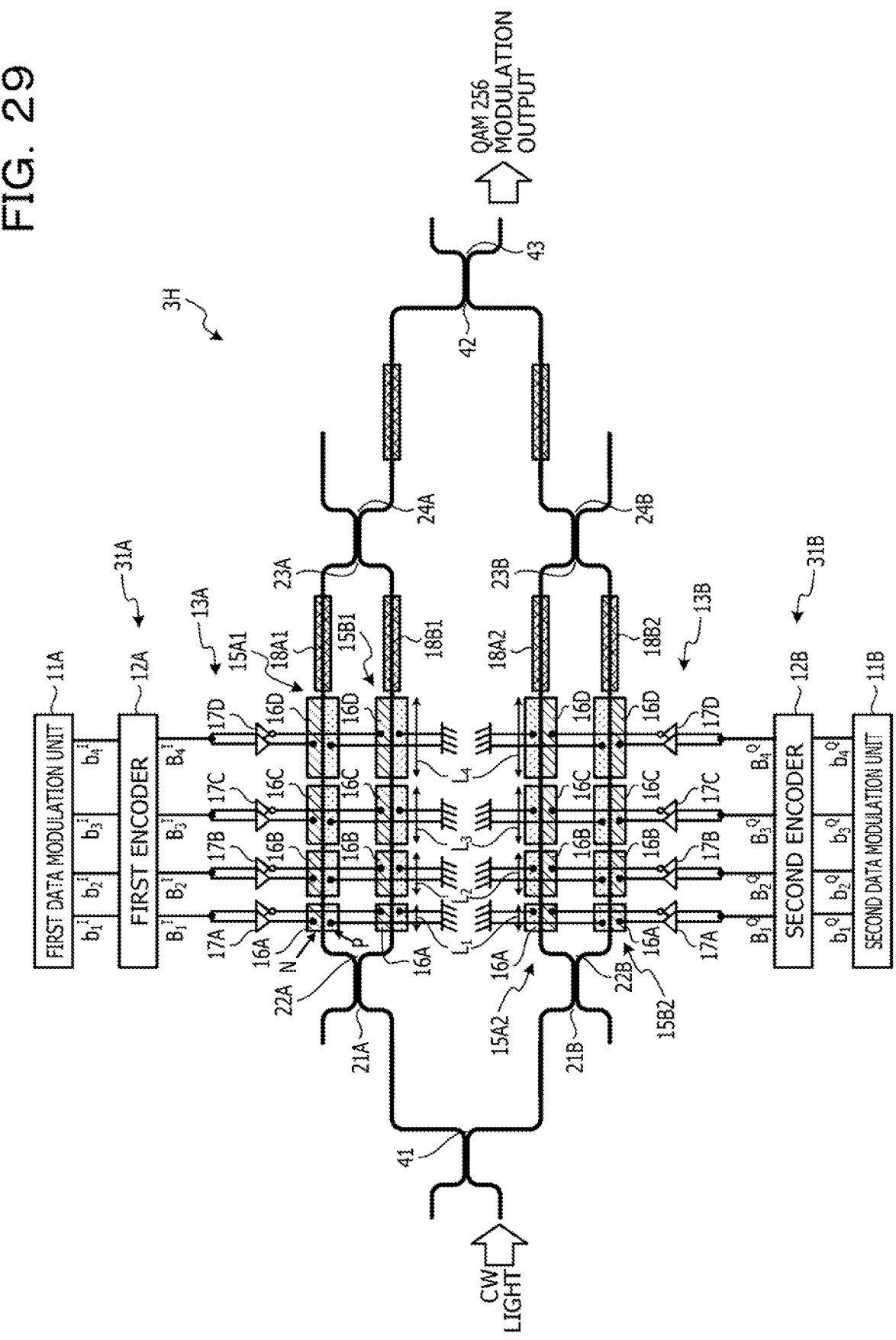
FIG. 29 is a schematic plan view illustrating an example of a configuration of an optical modulator of a ninth embodiment.

FIG. 29 is a schematic plan view illustrating an example of a configuration of an optical modulator 3H of a ninth embodiment. Note that the same reference signs are provided to the same components as those of the optical modulator 3E of the eighth embodiment and the description of overlapping components and operations is omitted. The optical modulator 3H illustrated in FIG. 29 includes an input-side branch unit 41, a first optical modulation unit 31A, a second optical modulation unit 31B, an output-side multiplexing unit 42, and an output-side branch unit 43. The first optical modulation unit 31A is a modulation unit that performs intensity modulation of an I-side optical signal and outputs an I-side 16 ASK modulation signal after the intensity modulation. The second optical modulation unit 31B is a modulation unit that performs intensity modulation of a Q-side optical signal and outputs a Q-side 16 ASK modulation signal after the intensity modulation.

A first data modulation unit 11A performs modulation into an I-side bit string data signal. The first encoder 12A converts a first bit value $b_1$ in the I-side bit string data signal into a first bit value $B_1$ in the modulation input code. The first encoder 12A converts a second bit value $b_2$ in the I-side bit string data signal into a second bit value $B_2$ in the modulation input code. The first encoder 12A converts a third bit value $b_3$ in the I-side bit string data signal into a third bit value $B_3$ in the modulation input code. The first encoder 12A converts a fourth bit value $b_4$ in the I-side bit string data signal into a fourth bit value $B_4$ in the modulation input code.

FIG. 30 is an explanatory diagram illustrating an example of a correspondence between an input and an output of each of the first encoder 12A and second encoder 12B for 4 bits. As illustrated in FIG. 30, the first encoder 12A converts a gray code "$b_4 b_3 b_2 b_1$" of an I-side data signal into a modulation input code "$B_4 B_3 B_2 B_1$". For example, in a case where the gray code is "1000", the first encoder 12A converts the gray code "1000" into a modulation input code "1111". For example, in a case where the gray code is "1001", the first encoder 12A converts the gray code "1001" into a modulation input code "1110". For example, in a case where the gray code is "1011", the first encoder 12A converts the gray code "1011" into a modulation input code "1101".

Since a first DAC 13A is a 4-bit DAC, the first DAC 13A includes four voltage conversion units, for example, a first voltage conversion unit 17A, a second voltage conversion unit 17B, a third voltage conversion unit 17C, and a fourth voltage conversion unit 17D. The first voltage conversion unit 17A converts an I-side data signal of the first bit value Bi of the modulation input code from the first encoder 12A into a voltage. The second voltage conversion unit 17B converts an I-side data signal of the second bit value $B_2$ of the modulation input code from the first encoder 12A into a voltage. The third voltage conversion unit 17C converts an I-side data signal of the third bit value $B_3$ of the modulation input code from the first encoder 12A into a voltage. The fourth voltage conversion unit 17D converts an I-side data signal of the fourth bit value $B_4$ of the modulation input code from the first encoder 12A into a voltage.

A first upper arm 15A1 performs intensity modulation of an I-side optical signal with an I-side data signal after analog conversion, and outputs a horizontally polarized optical modulation signal after the intensity modulation. A first lower arm 15B1 performs intensity modulation of an I-side optical signal with an I-side data signal after analog conversion, and outputs a vertically polarized optical modulation signal after the intensity modulation. Note that, since the I-side data signal is a 4-bit digital signal, each of the first upper arm 15A1 and the first lower arm 15B1 outputs a 16 ASK modulation signal, which is a 16-value optical modulation signal having a signal level 1 to a signal level 16.

The first upper arm 15A1 includes a first phase shifter group, which is a plurality of phase shifters connected in series, for example, a first phase shifter 16A, a second phase shifter 16B, a third phase shifter 16C, and a fourth phase shifter 16D. The first lower arm 15B1 includes a second phase shifter group, which is also a plurality of phase shifters connected in series, for example, a first phase shifter 16A, a second phase shifter 16B, a third phase shifter 16C, and a fourth phase shifter 16D. Note that the first phase shifters 16A of the first upper arm 15A1 and the first lower arm 15B1 have the same electrode length Li, and the second phase shifters 16B of the first upper arm 15A1 and the first lower arm 15B1 have the same electrode length $L_2$. Moreover, the third phase shifters 16C of the first upper arm 15A1 and the first lower arm 15B1 have the same electrode length $L_3$, and the fourth phase shifters 16D of the first upper arm 15A1 and the first lower arm 15B1 have the same electrode length $L_4$.

The first voltage conversion unit 17A applies the I-side data signal of the first bit value $B_1$ after the voltage conversion to an electrode of the first phase shifter 16A of the first upper arm 15A1. The first voltage conversion unit 17A inverts the I-side data signal of the first bit value $B_1$ after the voltage conversion, and applies the I-side data signal of the first bit value $B_1$ after the inversion to an electrode of the first phase shifter 16A of the first lower arm 15B1. The second voltage conversion unit 17B applies the I-side data signal of the second bit value $B_2$ after the voltage conversion to an electrode of the second phase shifter 16B of the first upper arm 15A1. The second voltage conversion unit 17B inverts the I-side data signal of the second bit value $B_2$ after the voltage conversion, and applies the I-side data signal of the second bit value $B_2$ after the inversion to an electrode of the second phase shifter 16B of the first lower arm 15B1.

The third voltage conversion unit 17C applies the I-side data signal of the third bit value $B_3$ after the voltage conversion to an electrode of the third phase shifter 16C of the first upper arm 15A1. The third voltage conversion unit 17C inverts the I-side data signal of the third bit value $B_3$ after the voltage conversion, and applies the I-side data signal of the third bit value $B_3$ after the inversion to an electrode of the third phase shifter 16C of the first lower arm 15B1. The fourth voltage conversion unit 17D applies the I-side data signal of the fourth bit value $B_4$ after the voltage conversion to an electrode of the fourth phase shifter 16D of the first upper arm 15A1. The fourth voltage conversion unit 17D inverts the I-side data signal of the fourth bit value $B_4$ after the voltage conversion, and applies the I-side data signal of the fourth bit value $B_4$ after the inversion to an electrode of the fourth phase shifter 16D of the first lower arm 15B1.

The first phase shifter 16A of the first upper arm 15A1 performs intensity modulation of an I-side optical signal with the I-side data signal of the first bit value $B_1$ from the first voltage conversion unit 17A. Furthermore, the first phase shifter 16A of the first lower arm 15B1 performs intensity modulation of an I-side optical signal with the I-side data signal of the first bit value $B_1$ after the inversion from the first voltage conversion unit 17A. The second phase shifter 16B of the first upper arm 15A1 performs intensity modulation of the I-side optical signal with the I-side data signal of the second bit value $B_2$ from the second voltage conversion unit 17B. Furthermore, the second phase shifter 16B of the first lower arm 15B1 performs intensity modulation of the I-side optical signal with the I-side data signal of the second bit value $B_2$ after the inversion from the second voltage conversion unit 17B. The third phase shifter 16C of the first upper arm 15A1 performs intensity modulation of the I-side optical signal with the I-side data signal of the third bit value $B_3$ from the third voltage conversion unit 17C. Furthermore, the third phase shifter 16C of the first lower arm 15B1 performs intensity modulation of the I-side optical signal with the I-side data signal of the third bit value $B_3$ after the inversion from the third voltage conversion unit 17C. The fourth phase shifter 16D of the first upper arm 15A1 performs intensity modulation of the I-side optical signal with the I-side data signal of the fourth bit value $B_4$ from the fourth voltage conversion unit 17D. Furthermore, the fourth phase shifter 16D of the first lower arm 15B1 performs intensity modulation of the I-side optical signal with the I-side data signal of the fourth bit value $B_4$ after the inversion from the fourth voltage conversion unit 17D.

The first upper arm 15A1 outputs the I-side optical modulation signal after the intensity modulation with the I-side data signal to a first multiplexing unit 23A. Moreover, the first lower arm 15B1 outputs the I-side optical modulation signal after the intensity modulation with the I-side data signal to the first multiplexing unit 23A. The first multiplexing unit 23A multiplexes the I-side optical modulation signal after the intensity modulation by the first upper arm 15A1 and the I-side optical modulation signal after the intensity modulation by the first lower arm 15B1. The first multiplexing unit 23A outputs, from a first output unit 24A, an I-side 16 ASK modulation signal after the multiplexing as an output of the first optical modulation unit 31A. The first output unit 24A adjusts a phase shift of the I-side 16 ASK modulation signal with heaters and then outputs the I-side 16 ASK modulation signal after the phase shift adjustment to the output-side multiplexing unit 42.

In the first optical modulation unit 31A, a ratio of the electrode lengths of the first phase shifter 16A, the second phase shifter 16B, the third phase shifter 16C, and the fourth phase shifter 16D is set to, for example, $L_1:L_2:L_3:L_4=153:234:284:328$ so as to make optical intensities for the respective signal levels (1 to 16) at equal intervals. As a result, since the optical intensities for the respective signal levels (1 to 16) are at equal intervals, a linear part of a sine curve, which represents a correspondence between the optical intensity of the 16 ASK modulation signal and a phase shift amount, may be sufficiently ensured.

A second data modulation unit 11B performs modulation into a Q-side bit string data signal. The second encoder 12B converts a first bit value bi in the Q-side bit string data signal into a first bit value $B_1$ in the modulation input code. The second encoder 12B converts a second bit value $b_2$ in the Q-side bit string data signal into a second bit value $B_2$ in the modulation input code. The second encoder 12B converts a third bit value $b_3$ in the Q-side bit string data signal into a third bit value $B_3$ in the modulation input code. The second encoder 12B converts a fourth bit value $b_4$ in the Q-side bit string data signal into a fourth bit value $B_4$ in the modulation input code.

As illustrated in FIG. 30, the second encoder 12B converts a gray code "$b_4b_3b_2b_1$" of a Q-side data signal into a modulation input code "$B_4B_3B_2B_1$". For example, in a case where the gray code is "1000", the second encoder 12B converts the gray code "1000" into a modulation input code "1111". For example, in a case where the gray code is "1001", the second encoder 12B converts the gray code "1001" into a modulation input code "1110". For example, in a case where the gray code is "1011", the second encoder 12B converts the gray code "1011" into a modulation input code "1101".

Since a second DAC 13B is a 4-bit DAC, the second DAC 13B includes four voltage conversion units, for example, a first voltage conversion unit 17A, a second voltage conversion unit 17B, a third voltage conversion unit 17C, and a fourth voltage conversion unit 17D. The first voltage conversion unit 17A converts a Q-side data signal of the first bit value $B_1$ of the modulation input code from the second encoder 12B into a voltage. The second voltage conversion unit 17B converts a Q-side data signal of the second bit value $B_2$ of the modulation input code from the second encoder 12B into a voltage. The third voltage conversion unit 17C converts a Q-side data signal of the third bit value $B_3$ of the modulation input code from the second encoder 12B into a voltage. The fourth voltage conversion unit 17D converts a Q-side data signal of the fourth bit value $B_4$ of the modulation input code from the second encoder 12B into a voltage.

A second upper arm 15A2 performs intensity modulation of a Q-side optical signal with a Q-side data signal after analog conversion, and outputs a horizontally polarized optical modulation signal after the intensity modulation. A second lower arm 15B2 performs intensity modulation of a Q-side optical signal with a Q-side data signal after analog conversion, and outputs a vertically polarized optical modulation signal after the intensity modulation. Note that, since the Q-side data signal is a 4-bit digital signal, each of the second upper arm 15A2 and the second lower arm 15B2 outputs a Q-side 16 ASK modulation signal, which is a 16-value optical modulation signal having a signal level 1 to a signal level 16.

The second upper arm 15A2 includes a first phase shifter group, which is a plurality of phase shifters connected in series, for example, a first phase shifter 16A, a second phase shifter 16B, a third phase shifter 16C, and a fourth phase shifter 16D. The second lower arm 15B2 includes a second phase shifter group, which is also a plurality of phase shifters connected in series, for example, a first phase shifter 16A, a second phase shifter 16B, a third phase shifter 16C, and a fourth phase shifter 16D. Note that the first phase shifters 16A of the second upper arm 15A2 and the second lower arm 15B2 have the same electrode length $L_1$, and the second phase shifters 16B of the second upper arm 15A2 and the second lower arm 15B2 have the same electrode length $L_2$. The third phase shifters 16C of the second upper arm 15A2 and the second lower arm 15B2 have the same electrode length $L_3$, and the fourth phase shifters 16D of the second upper arm 15A2 and the second lower arm 15B2 have the same electrode length $L_4$.

The first voltage conversion unit 17A applies the Q-side data signal of the first bit value $B_1$ after the voltage conversion to an electrode of the first phase shifter 16A of the second upper arm 15A2. The first voltage conversion unit 17A inverts the Q-side data signal of the first bit value $B_1$ after the voltage conversion, and applies the Q-side data signal of the first bit value $B_1$ after the inversion to an electrode of the first phase shifter 16A of the second lower arm 15B2. The second voltage conversion unit 17B applies the Q-side data signal of the second bit value $B_2$ after the voltage conversion to an electrode of the second phase shifter 16B of the second upper arm 15A2. The second voltage conversion unit 17B inverts the Q-side data signal of the second bit value $B_2$ after the voltage conversion, and applies the Q-side data signal of the second bit value $B_2$ after the inversion to an electrode of the second phase shifter 16B of the second lower arm 15B2.

The third voltage conversion unit 17C applies the Q-side data signal of the third bit value $B_3$ after the voltage conversion to an electrode of the third phase shifter 16C of the second upper arm 15A2. The third voltage conversion unit 17C inverts the Q-side data signal of the third bit value $B_3$ after the voltage conversion, and applies the Q-side data signal of the third bit value $B_3$ after the inversion to an electrode of the third phase shifter 16C of the second lower arm 15B2. The fourth voltage conversion unit 17D applies the Q-side data signal of the fourth bit value $B_4$ after the voltage conversion to an electrode of the fourth phase shifter 16D of the second upper arm 15A2. The fourth voltage conversion unit 17D inverts the Q-side data signal of the fourth bit value $B_4$ after the voltage conversion, and applies the Q-side data signal of the fourth bit value $B_4$ after the inversion to an electrode of the fourth phase shifter 16D of the second lower arm 1562.

In the second optical modulation unit 31B, a ratio of the electrode lengths of the first phase shifter 16A, the second phase shifter 16B, the third phase shifter 16C, and the fourth phase shifter 16D is set to, for example, $L_1:L_2:L_3:L_4=153:234:284:328$ so as to make optical intensities for the respective signal levels (1 to 16) at equal intervals. As a result, since the optical intensities for the respective signal levels (1 to 16) are at equal intervals, a linear part of a sine curve, which represents a correspondence between the optical intensity of the 16 ASK modulation signal and a phase shift amount, may be sufficiently ensured.

The first phase shifter 16A of the second upper arm 15A2 performs intensity modulation of a Q-side optical signal with the Q-side data signal of the first bit value $B_1$ from the first voltage conversion unit 17A. Furthermore, the first phase shifter 16A of the second lower arm 15B2 performs intensity modulation of a Q-side optical signal with the Q-side data signal of the first bit value $B_1$ after the inversion from the first voltage conversion unit 17A. The second phase shifter 16B of the second upper arm 15A2 performs intensity modulation of the Q-side optical signal with the Q-side data signal of the second bit value $B_2$ from the second voltage conversion unit 17B. Furthermore, the second phase shifter 16B of the second lower arm 15B2 performs intensity modulation of the Q-side optical signal with the Q-side data signal of the second bit value $B_2$ after the inversion from the second voltage conversion unit 17B. The third phase shifter 16C of the second upper arm 15A2 performs intensity modulation of the Q-side optical signal with the Q-side data signal of the third bit value $B_3$ from the third voltage conversion unit 17C. Furthermore, the third phase shifter 16C of the second lower arm 15B2 performs intensity modulation of the Q-side optical signal with the Q-side data signal of the third bit value $B_3$ after the inversion from the third voltage conversion unit 17C. The fourth phase shifter 16D of the second upper arm 15A2 performs intensity modulation of the Q-side optical signal with the Q-side data signal of the fourth bit value $B_4$ from the fourth voltage conversion unit 17D. Furthermore, the fourth phase shifter 16D of the second lower arm 15B2 performs intensity modulation of the Q-side optical signal with the Q-side data signal of the fourth bit value $B_4$ after the inversion from the fourth voltage conversion unit 17D.

The second upper arm 15A2 outputs the Q-side optical modulation signal after the intensity modulation with the Q-side data signal to a second multiplexing unit 23B. Moreover, the second lower arm 15B2 outputs the Q-side optical modulation signal after the intensity modulation with the Q-side data signal to the second multiplexing unit 23B. The second multiplexing unit 23B multiplexes the Q-side optical modulation signal after the intensity modulation by the second upper arm 15A2 and the Q-side optical modulation signal after the intensity modulation by the second lower arm 15B2. The second multiplexing unit 23B outputs, from a second output unit 24B, a Q-side 16 ASK modulation signal after the multiplexing as an output of the second optical modulation unit 31B. The second output unit 24B adjusts a phase shift of the Q-side 16 ASK modulation signal with heaters and then outputs the Q-side 16 ASK modulation signal after the phase shift adjustment to the output-side multiplexing unit 42. The output-side multiplexing unit 42 multiplexes the I-side 16 ASK modulation signal and the Q-side 16 ASK modulation signal, and outputs a 256 QAM modulation signal after the multiplexing to the output-side branch unit 43.

Figure 31:
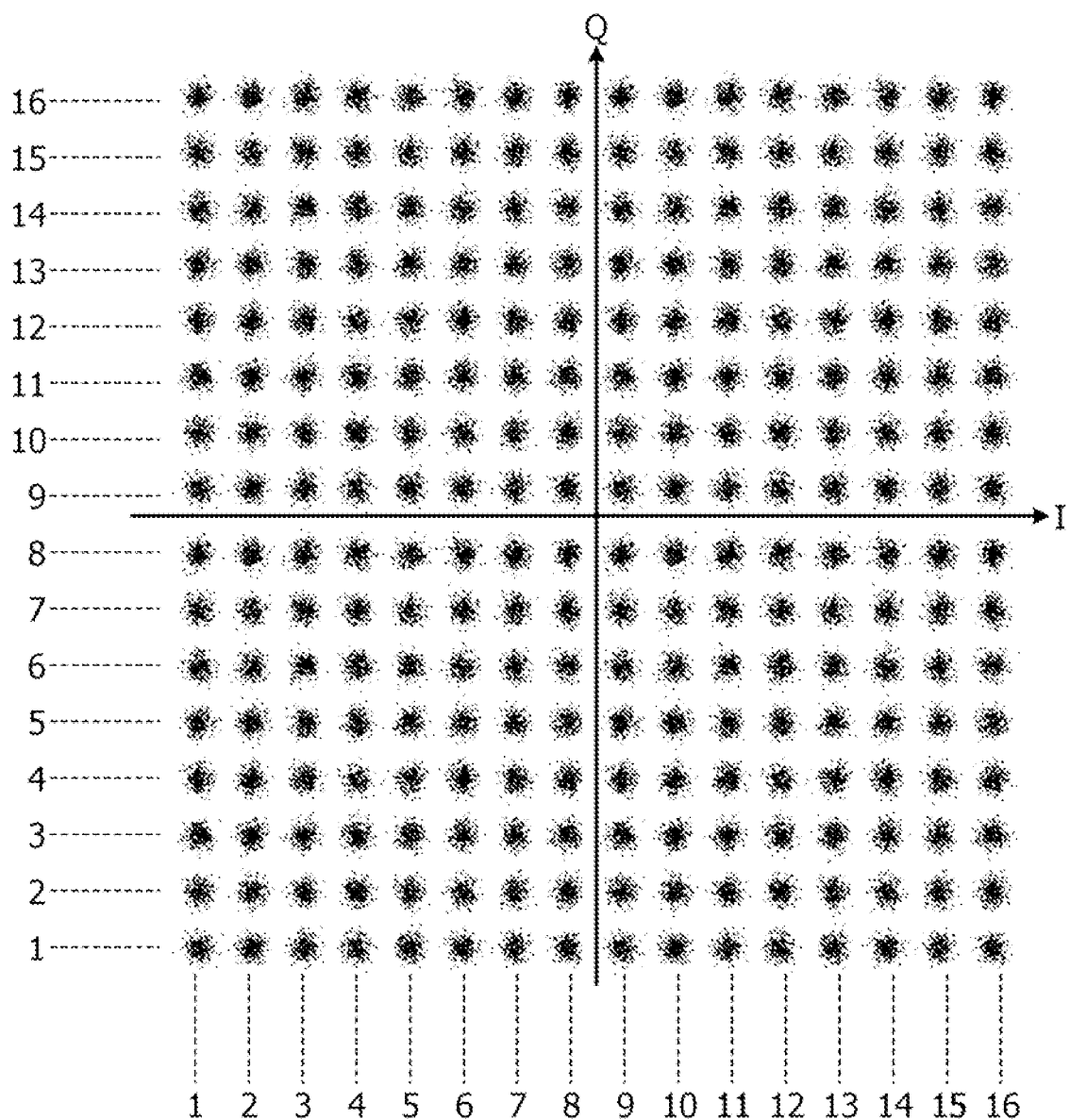
FIG. 31 is an explanatory diagram illustrating an example of a symbol of the optical modulator.

Then, the optical modulator 3H multiplexes the I-side 16 ASK modulation signal from the first optical modulation unit 31A and the Q-side 16 ASK modulation signal from the second optical modulation unit 31B, and outputs the 256 QAM modulation signal as an optical signal after the multiplexing. FIG. 31 is an explanatory diagram illustrating an example of a symbol of the optical modulator 3H. The symbol illustrated in FIG. 31 is a symbol of a 256 QAM modulation signal output by the optical modulator 3H.

In order to make the optical intensities for the respective signal levels (1to 16) at equal intervals, the optical modulator 3H of the ninth embodiment adjusts, while converting the gray code of the data signal into the modulation input code, the electrode lengths of the phase shifters in the first optical modulation unit 31A and the second optical modulation unit 31B to which the data signal according to the modulation input code after the conversion is applied. As a result, since the linear part of the sine curve, which represents the correspondence between the optical intensity and the phase shift amount, is sufficiently ensured, a modulation loss and power consumption may be suppressed while making the signal level intervals equal.

Tenth Embodiment

Figure 32:
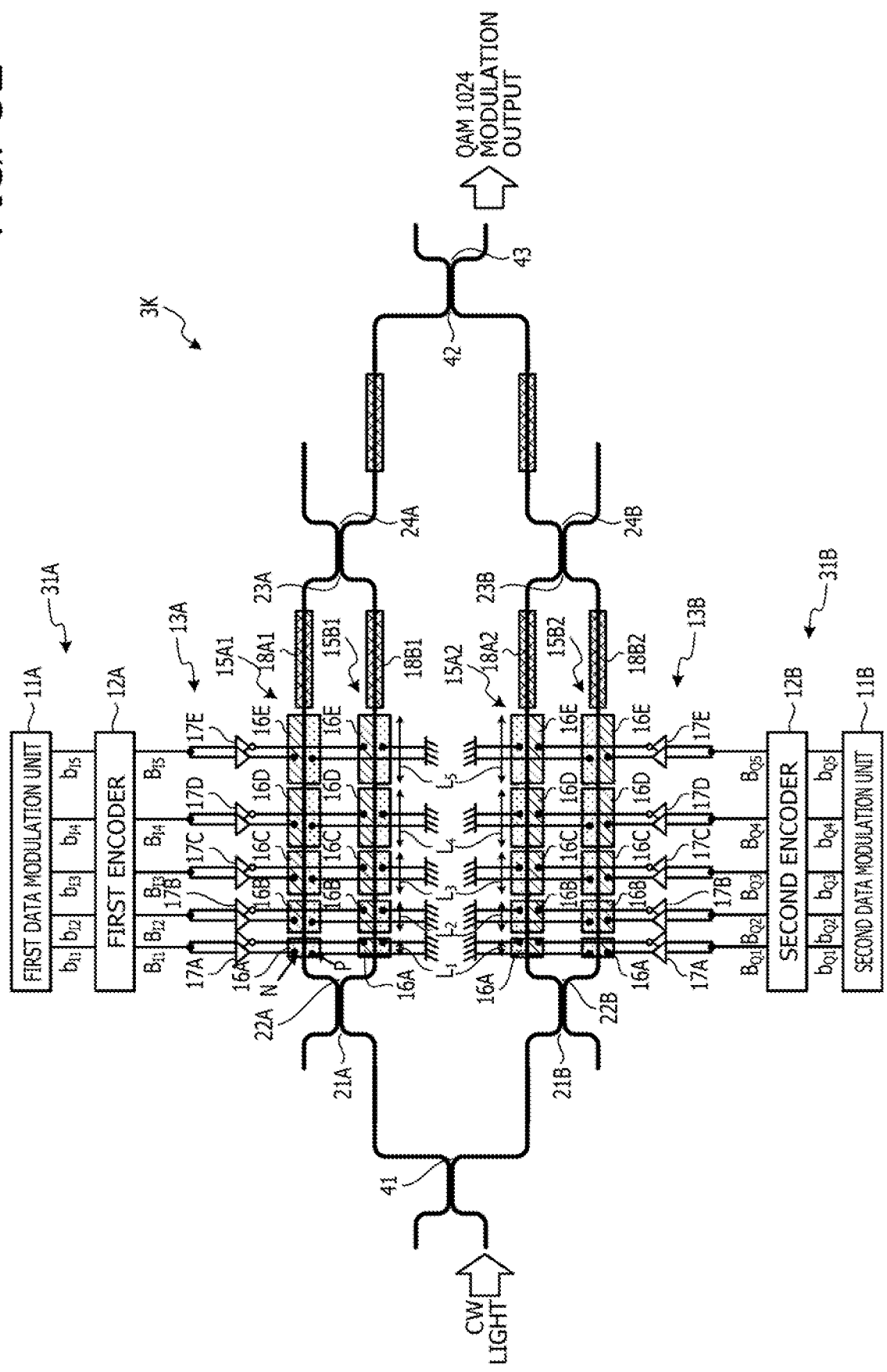
FIG. 32 is a schematic plan view illustrating an example of a configuration of an optical modulator of a tenth embodiment.

FIG. 32 is a schematic plan view illustrating an example of a configuration of an optical modulator 3K of a tenth embodiment. Note that the same reference signs are provided to the same components as those of the optical modulator 3E of the eighth embodiment and the description of overlapping components and operations is omitted. The optical modulator 3K illustrated in FIG. 32 includes an input-side branch unit 41, a first optical modulation unit 31A, a second optical modulation unit 31B, an output-side multiplexing unit 42, and an output-side branch unit 43. The first optical modulation unit 31A is a modulation unit that performs intensity modulation of an I-side optical signal and outputs an I-side 32 ASK modulation signal after the intensity modulation. The second optical modulation unit 31B is a modulation unit that performs intensity modulation of a Q-side optical signal and outputs a Q-side 32 ASK modulation signal after the intensity modulation.

The first data modulation unit 11A performs modulation into an I-side bit string data signal. The first encoder 12A converts a first bit value $b_1$ in the I-side bit string data signal into a first bit value $B_1$ in the modulation input code. The first encoder 12A converts a second bit value $b_2$ in the I-side bit string data signal into a second bit value $B_2$ in the modulation input code. The first encoder 12A converts a third bit value $b_3$ in the I-side bit string data signal into a third bit value $B_3$ in the modulation input code. The first encoder 12A converts a fourth bit value $b_4$ in the I-side bit string data signal into a fourth bit value $B_4$ in the modulation input code. The first encoder 12A converts a fifth bit value $b_5$ in the I-side bit string data signal into a fifth bit value $B_5$ in the modulation input code.

FIG. 33 is an explanatory diagram illustrating an example of a correspondence between an input and an output of each of the first encoder 12A and second encoder 12B for 5 bits. As illustrated in FIG. 33, the first encoder 12A converts a gray code "$b_5b_4b_3b_2b_1$" of an I-side data signal into a modulation input code "$B_5B_4B_3B_2B_1$". For example, in a case where the gray code is "10000", the first encoder 12A converts the gray code "10000" into a modulation input code "11111". For example, in a case where the gray code is "10001", the first encoder 12A converts the gray code "10001" into a modulation input code "11110". For example, in a case where the gray code is "10011", the first encoder 12A converts the gray code "10011" into a modulation input code "11101".

Since a first DAC 13A is a 5-bit DAC, the DAC 13 includes five voltage conversion units, for example, a first voltage conversion unit 17A, a second voltage conversion unit 17B, a third voltage conversion unit 17C, a fourth voltage conversion unit 17D, and a fifth voltage conversion unit 17E. The first voltage conversion unit 17A converts an I-side data signal of the first bit value $B_1$ of the modulation input code from the first encoder 12A into a voltage. The second voltage conversion unit 17B converts an I-side data signal of the second bit value $B_2$ of the modulation input code from the first encoder 12A into a voltage. The third voltage conversion unit 17C converts an I-side data signal of the third bit value $B_3$ of the modulation input code from the first encoder 12A into a voltage. The fourth voltage conversion unit 17D converts an I-side data signal of the fourth bit value $B_4$ of the modulation input code from the first encoder 12A into a voltage. The fifth voltage conversion unit 17E converts an I-side data signal of the fifth bit value $B_5$ of the modulation input code from the first encoder 12A into a voltage.

A first upper arm 15A1 performs intensity modulation of an I-side optical signal with an I-side data signal after analog conversion, and outputs a horizontally polarized optical modulation signal after the intensity modulation. A first lower arm 15B1 performs intensity modulation of an I-side optical signal with an I-side data signal after analog conversion, and outputs a vertically polarized optical modulation signal after the intensity modulation. Note that, since the I-side data signal is a 5-bit digital signal, each of the first upper arm 15A1 and the first lower arm 15B1 outputs a 32 ASK modulation signal, which is a 32-value optical modulation signal having a signal level 1 to a signal level 32.

The first upper arm 15A1 includes a first phase shifter group, which is a plurality of phase shifters connected in series, for example, a first phase shifter 16A, a second phase shifter 16B, a third phase shifter 16C, a fourth phase shifter 16D, and a fifth phase shifter 16E. The first lower arm 15B1 includes a second phase shifter group, which is also a plurality of phase shifters connected in series, for example, a first phase shifter 16A, a second phase shifter 16B, a third phase shifter 16C, a fourth phase shifter 16D, and a fifth phase shifter 16E. Note that the first phase shifters 16A of the first upper arm 15A1 and the first lower arm 15B1 have the same electrode length Li, and the second phase shifters 16B of the first upper arm 15A1 and the first lower arm 15B1 have the same electrode length $L_2$. The third phase shifters 16C of the first upper arm 15A1 and the first lower arm 15B1 have the same electrode length $L_3$, and the fourth phase shifters 16D of the first upper arm 15A1 and the first lower arm 15B1 have the same electrode length $L_4$. Moreover, the fifth phase shifters 16E of the first upper arm 15A1 and the first lower arm 15B1 have the same electrode length $L_5$.

The first voltage conversion unit 17A applies the I-side data signal of the first bit value $B_1$ after the voltage conversion to an electrode of the first phase shifter 16A of the first upper arm 15A1. The first voltage conversion unit 17A inverts the I-side data signal of the first bit value $B_1$ after the voltage conversion, and applies the I-side data signal of the first bit value $B_1$ after the inversion to an electrode of the first phase shifter 16A of the first lower arm 15B1. The second voltage conversion unit 17B applies the I-side data signal of the second bit value $B_2$ after the voltage conversion to an electrode of the second phase shifter 16B of the first upper arm 15A1. The second voltage conversion unit 17B inverts the I-side data signal of the second bit value $B_2$ after the voltage conversion, and applies the I-side data signal of the second bit value $B_2$ after the inversion to an electrode of the second phase shifter 16B of the first lower arm 15B1. The third voltage conversion unit 17C applies the I-side data signal of the third bit value $B_3$ after the voltage conversion to an electrode of the third phase shifter 16C of the first upper arm 15A1. The third voltage conversion unit 17C inverts the I-side data signal of the third bit value $B_3$ after the voltage conversion, and applies the I-side data signal of the third bit value $B_3$ after the inversion to an electrode of the third phase shifter 16C of the first lower arm 15B1.

The fourth voltage conversion unit 17D applies the I-side data signal of the fourth bit value $B_4$ after the voltage conversion to an electrode of the fourth phase shifter 16D of the first upper arm 15A1. The fourth voltage conversion unit 17D inverts the I-side data signal of the fourth bit value $B_4$ after the voltage conversion, and applies the I-side data signal of the fourth bit value $B_4$ after the inversion to an electrode of the fourth phase shifter 16D of the first lower arm 15B1. The fifth voltage conversion unit 17E applies the I-side data signal of the fifth bit value $B_5$ after the voltage conversion to an electrode of the fifth phase shifter 16E of the first upper arm 15A1. The fifth voltage conversion unit 17E inverts the I-side data signal of the fifth bit value $B_5$ after the voltage conversion, and applies the I-side data signal of the fifth bit value $B_5$ after the inversion to an electrode of the fifth phase shifter 16E of the first lower arm 15B1.

The first phase shifter 16A of the first upper arm 15A1 performs intensity modulation of an I-side optical signal with the I-side data signal of the first bit value $B_1$ from the first voltage conversion unit 17A. Furthermore, the first phase shifter 16A of the first lower arm 15B1 performs intensity modulation of an I-side optical signal with the I-side data signal of the first bit value $B_1$ after the inversion from the first voltage conversion unit 17A. The second phase shifter 16B of the first upper arm 15A1 performs intensity modulation of the I-side optical signal with the I-side data signal of the second bit value $B_2$ from the second voltage conversion unit 17B. Furthermore, the second phase shifter 16B of the first lower arm 15B1 performs intensity modulation of the I-side optical signal with the I-side data signal of the second bit value $B_2$ after the inversion from the second voltage conversion unit 17B. The third phase shifter 16C of the first upper arm 15A1 performs intensity modulation of the I-side optical signal with the I-side data signal of the third bit value $B_3$ from the third voltage conversion unit 17C. Furthermore, the third phase shifter 16C of the first lower arm 15B1 performs intensity modulation of the I-side optical signal with the I-side data signal of the third bit value $B_3$ after the inversion from the third voltage conversion unit 17C. The fourth phase shifter 16D of the first upper arm 15A1 performs intensity modulation of the I-side optical signal with the I-side data signal of the fourth bit value $B_4$ from the fourth voltage conversion unit 17D. Furthermore, the fourth phase shifter 16D of the first lower arm 15B1 performs intensity modulation of the I-side optical signal with the I-side data signal of the fourth bit value $B_4$ after the inversion from the fourth voltage conversion unit 17D. The fifth phase shifter 16E of the first upper arm 15A1 performs intensity modulation of the I-side optical signal with the I-side data signal of the fifth bit value $B_5$ from the fifth voltage conversion unit 17E. Furthermore, the fifth phase shifter 16E of the first lower arm 15B1 performs intensity modulation of the I-side optical signal with the I-side data signal of the fifth bit value $B_5$ after the inversion from the fifth voltage conversion unit 17E.

The first upper arm 15A1 outputs the I-side optical modulation signal after the intensity modulation with the I-side data signal to a first multiplexing unit 23A. Moreover, the first lower arm 15B1 outputs the I-side optical modulation signal after the intensity modulation with the I-side data signal to the first multiplexing unit 23A. The first multiplexing unit 23A multiplexes the I-side optical modulation signal after the intensity modulation by the first upper arm 15A1 and the I-side optical modulation signal after the intensity modulation by the first lower arm 15B1. The first multiplexing unit 23A outputs, from a first output unit 24A, an I-side 32 ASK modulation signal after the multiplexing as an output of the first optical modulation unit 31A. The first output unit 24A adjusts a phase shift of the I-side 32 ASK modulation signal with heaters and then outputs the I-side 32 ASK modulation signal after the phase shift adjustment to the output-side multiplexing unit 42.

The first optical modulation unit 31A adjusts a ratio of the electrode lengths (phase shift amounts) of the first to fifth phase shifters 16A to 16E so as to make optical intensities for the respective signal levels (1 to 32) at equal intervals. For example, a ratio of the electrode lengths of the first phase shifter 16A, the second phase shifter 16B, the third phase shifter 16C, the fourth phase shifter 16D, and the fifth phase shifter 16E is set to, for example, $L_1:L_2:L_3:L_4:L_5=117:177:$ 213:236:257. As a result, since the optical intensities for the respective signal levels (1 to 32) are at equal intervals, a linear part of a sine curve, which represents a correspondence between the optical intensity of the 32 ASK modulation signal and the phase shift amount, may be sufficiently ensured.

A second data modulation unit 11B performs modulation into a Q-side bit string data signal. The second encoder 12B converts a first bit value bi in the Q-side bit string data signal into a first bit value $B_1$ in the modulation input code. The second encoder 12B converts a second bit value $b_2$ in the Q-side bit string data signal into a second bit value $B_2$ in the modulation input code. The second encoder 12B converts a third bit value $b_3$ in the Q-side bit string data signal into a third bit value $B_3$ in the modulation input code. The second encoder 12B converts a fourth bit value $b_4$ in the Q-side bit string data signal into a fourth bit value $B_4$ in the modulation input code. The second encoder 12B converts a fifth bit value $b_5$ in the Q-side bit string data signal into a fifth bit value $B_5$ in the modulation input code.

As illustrated in FIG. 33, the second encoder 12B converts a gray code "$b_5b_4b_3b_2b_1$" of a Q-side data signal into a modulation input code "$B_5B_4B_3B_2B_1$". For example, in a case where the gray code is "10000", the second encoder 12B converts the gray code "10000" into a modulation input code "11111". For example, in a case where the gray code is "10001", the second encoder 12B converts the gray code "10001" into a modulation input code "11110". For example, in a case where the gray code is "10011", the second encoder 12B converts the gray code "10011" into a modulation input code "11101".

Since a second DAC 13B is a 5-bit DAC, the second DAC 13B includes five voltage conversion units, for example, a first voltage conversion unit 17A, a second voltage conversion unit 17B, a third voltage conversion unit 17C, a fourth voltage conversion unit 17D, and a fifth voltage conversion unit 17E. The first voltage conversion unit 17A converts a Q-side data signal of the first bit value $B_1$ of the modulation input code from the second encoder 12B into a voltage. The second voltage conversion unit 17B converts a Q-side data signal of the second bit value $B_2$ of the modulation input code from the second encoder 12B into a voltage. The third voltage conversion unit 17C converts a Q-side data signal of the third bit value $B_3$ of the modulation input code from the second encoder 12B into a voltage. The fourth voltage conversion unit 17D converts a Q-side data signal of the fourth bit value $B_4$ of the modulation input code from the second encoder 12B into a voltage. The fifth voltage conversion unit 17E converts a Q-side data signal of the fifth bit value $B_5$ of the modulation input code from the second encoder 12B into a voltage.

A second upper arm 15A2 performs intensity modulation of a Q-side optical signal with a Q-side data signal after analog conversion, and outputs a horizontally polarized optical modulation signal after the intensity modulation. A second lower arm 15B2 performs intensity modulation of a Q-side optical signal with a Q-side data signal after analog conversion, and outputs a vertically polarized optical modulation signal after the intensity modulation. Note that, since the Q-side data signal is a 5-bit digital signal, each of the second upper arm 15A2 and the second lower arm 15B2 outputs a Q-side 32 ASK modulation signal, which is a 32-value optical modulation signal having a signal level 1 to a signal level 32.

The second upper arm 15A2 includes a first phase shifter group, which is a plurality of phase shifters connected in series, for example, a first phase shifter 16A, a second phase shifter 16B, a third phase shifter 16C, a fourth phase shifter 16D, and a fifth phase shifter 16E. The second lower arm 15B2 includes a second phase shifter group, which is also a plurality of phase shifters connected in series, for example, a first phase shifter 16A, a second phase shifter 16B, a third phase shifter 16C, a fourth phase shifter 16D, and a fifth phase shifter 16E. Note that the first phase shifters 16A of the second upper arm 15A2 and the second lower arm 15B2 have the same electrode length $L_i$, and the second phase shifters 16B of the second upper arm 15A2 and the second lower arm 15B2 have the same electrode length $L_2$. The third phase shifters 16C of the second upper arm 15A2 and the second lower arm 15B2 have the same electrode length $L_3$, and the fourth phase shifters 16D of the second upper arm 15A2 and the second lower arm 15B2 have the same electrode length $L_4$. Moreover, the fifth phase shifters 16E of the second upper arm 15A2 and the second lower arm 15B2 have the same electrode length $L_5$.

The first voltage conversion unit 17A applies the Q-side data signal of the first bit value $B_1$ after the voltage conversion to an electrode of the first phase shifter 16A of the second upper arm 15A2. The first voltage conversion unit 17A inverts the Q-side data signal of the first bit value $B_1$ after the voltage conversion, and applies the Q-side data signal of the first bit value $B_1$ after the inversion to an electrode of the first phase shifter 16A of the second lower arm 1562. The second voltage conversion unit 17B applies the Q-side data signal of the second bit value $B_2$ after the voltage conversion to an electrode of the second phase shifter 16B of the second upper arm 15A2. The second voltage conversion unit 17B inverts the Q-side data signal of the second bit value $B_2$ after the voltage conversion, and applies the Q-side data signal of the second bit value $B_2$ after the inversion to an electrode of the second phase shifter 16B of the second lower arm 15B2. The third voltage conversion unit 17C applies the Q-side data signal of the third bit value $B_3$ after the voltage conversion to an electrode of the third phase shifter 16C of the second upper arm 15A2. The third voltage conversion unit 17C inverts the Q-side data signal of the third bit value $B_3$ after the voltage conversion, and applies the Q-side data signal of the third bit value $B_3$ after the inversion to an electrode of the third phase shifter 16C of the second lower arm 15B2.

The fourth voltage conversion unit 17D applies the Q-side data signal of the fourth bit value $B_4$ after the voltage conversion to an electrode of the fourth phase shifter 16D of the second upper arm 15A2. The fourth voltage conversion unit 17D inverts the Q-side data signal of the fourth bit value $B_4$ after the voltage conversion, and applies the Q-side data signal of the fourth bit value $B_4$ after the inversion to an electrode of the fourth phase shifter 16D of the second lower arm 15B2. The fifth voltage conversion unit 17E applies the Q-side data signal of the fifth bit value $B_5$ after the voltage conversion to an electrode of the fifth phase shifter 16E of the second upper arm 15A2. The fifth voltage conversion unit 17E inverts the Q-side data signal of the fifth bit value $B_5$ after the voltage conversion, and applies the Q-side data signal of the fifth bit value $B_5$ after the inversion to an electrode of the fifth phase shifter 16E of the second lower arm 15B2.

The second optical modulation unit 31B adjusts a ratio of the electrode lengths (phase shift amounts) of the first to fifth phase shifters 16A to 16E so as to make optical intensities for the respective signal levels (1 to 32) at equal intervals. For example, a ratio of the electrode lengths of the first phase shifter 16A, the second phase shifter 16B, the third phase shifter 16C, the fourth phase shifter 16D, and the fifth phase shifter 16E is set to, for example, $L_1:L_2:L_3:L_4:L_5=117:177:213:236:257$. As a result, since the optical intensities for the respective signal levels (1 to 32) are at equal intervals, a linear part of a sine curve, which represents a correspondence between the optical intensity of the 32 ASK modulation signal and the phase shift amount, may be sufficiently ensured.

The first phase shifter 16A of the second upper arm 15A2 performs intensity modulation of a Q-side optical signal with the Q-side data signal of the first bit value $B_1$ from the first voltage conversion unit 17A. Furthermore, the first phase shifter 16A of the second lower arm 15B2 performs intensity modulation of a Q-side optical signal with the Q-side data signal of the first bit value $B_1$ after the inversion from the first voltage conversion unit 17A. The second phase shifter 16B of the second upper arm 15A2 performs intensity modulation of the Q-side optical signal with the Q-side data signal of the second bit value $B_2$ from the second voltage conversion unit 17B. Furthermore, the second phase shifter 16B of the second lower arm 15B2 performs intensity modulation of the Q-side optical signal with the Q-side data signal of the second bit value $B_2$ after the inversion from the second voltage conversion unit 17B. The third phase shifter 16C of the second upper arm 15A2 performs intensity modulation of the Q-side optical signal with the Q-side data signal of the third bit value $B_3$ from the third voltage conversion unit 17C. Furthermore, the third phase shifter 16C of the second lower arm 15B2 performs intensity modulation of the Q-side optical signal with the Q-side data signal of the third bit value $B_3$ after the inversion from the third voltage conversion unit 17C. The fourth phase shifter 16D of the second upper arm 15A2 performs intensity modulation of the Q-side optical signal with the Q-side data signal of the fourth bit value $B_4$ from the fourth voltage conversion unit 17D. Furthermore, the fourth phase shifter 16D of the second lower arm 15B2 performs intensity modulation of the Q-side optical signal with the Q-side data signal of the fourth bit value $B_4$ after the inversion from the fourth voltage conversion unit 17D. The fifth phase shifter 16E of the second upper arm 15A2 performs intensity modulation of the Q-side optical signal with the Q-side data signal of the fifth bit value $B_5$ from the fifth voltage conversion unit 17E. Furthermore, the fifth phase shifter 16E of the second lower arm 15B2 performs intensity modulation of the Q-side optical signal with the Q-side data signal of the fifth bit value $B_5$ after the inversion from the fifth voltage conversion unit 17E.

The second upper arm 15A2 outputs the Q-side optical modulation signal after the intensity modulation with the Q-side data signal to a second multiplexing unit 23B. Moreover, the second lower arm 15B2 outputs the Q-side optical modulation signal after the intensity modulation with the Q-side data signal to the second multiplexing unit 23B. The second multiplexing unit 23B multiplexes the Q-side optical modulation signal after the intensity modulation by the second upper arm 15A2 and the Q-side optical modulation signal after the intensity modulation by the second lower arm 15B2. The second multiplexing unit 23B outputs, from a second output unit 24B, a Q-side 32 ASK modulation signal after the multiplexing as an output of the second optical modulation unit 31B. The second output unit 24B adjusts a phase shift of the Q-side 32 ASK modulation signal with heaters and then outputs the Q-side 32 ASK modulation signal after the phase shift adjustment to the output-side multiplexing unit 42. The output-side multiplexing unit 42 multiplexes the I-side 32 ASK modulation signal and the Q-side 32 ASK modulation signal, and outputs a 1024 QAM modulation signal after the multiplexing to the output-side branch unit 43.

Figure 34:
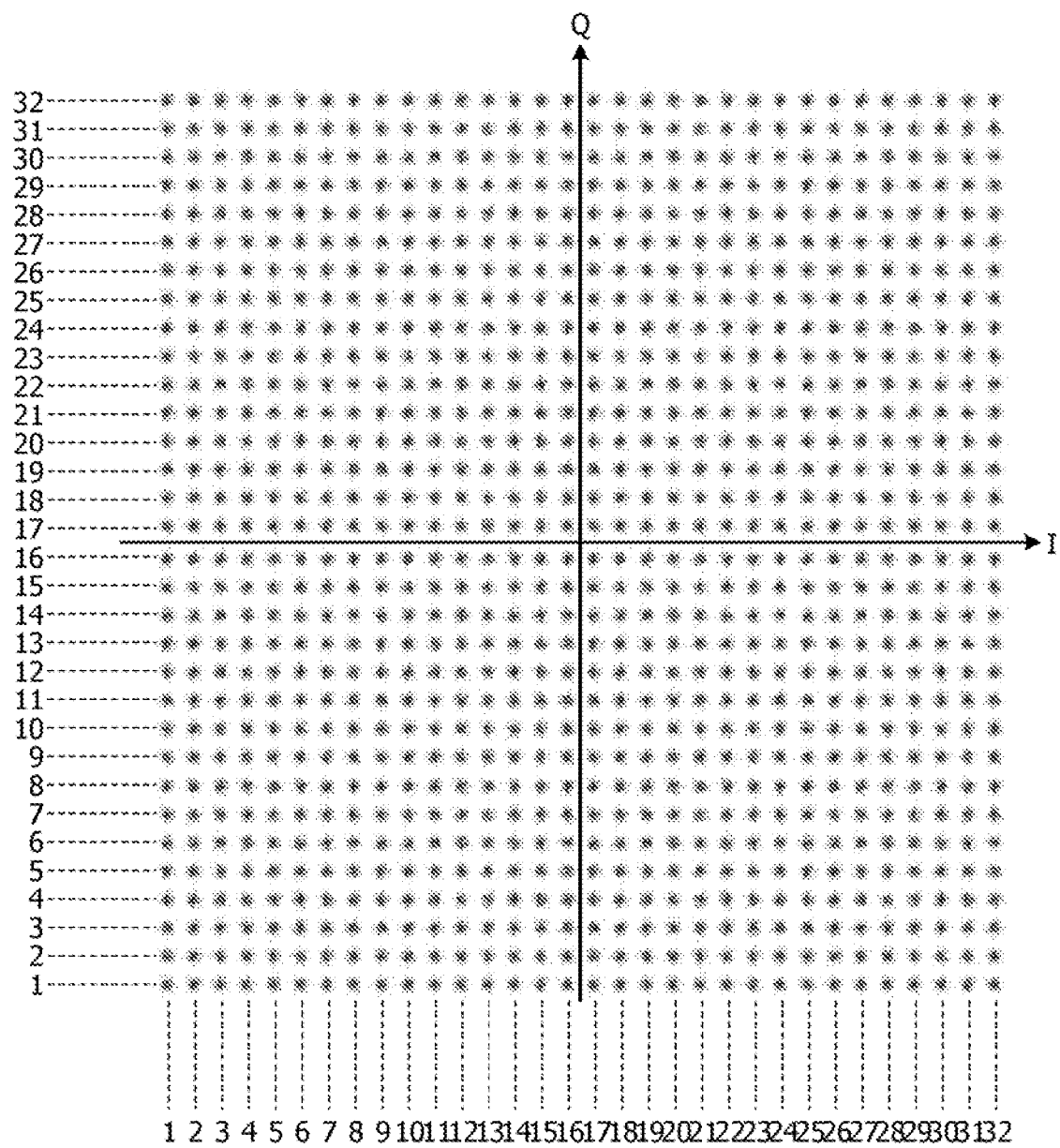
FIG. 34 is an explanatory diagram illustrating an example of a symbol of the optical modulator.

Then, the optical modulator 3K multiplexes the I-side 32 ASK modulation signal from the first optical modulation unit 31A and the Q-side 32 ASK modulation signal from the second optical modulation unit 31B, and outputs the 1024 QAM modulation signal as an optical signal after the multiplexing. FIG. 34 is an explanatory diagram illustrating an example of a symbol of the optical modulator 3K. The symbol illustrated in FIG. 34 is a symbol of a 1024 QAM modulation signal output by the optical modulator 3K.

In order to make the optical intensities for the respective signal levels (1 to 32) at equal intervals, the optical modulator 3K of the tenth embodiment adjusts, while converting the gray code of the data signal into the modulation input code, the electrode lengths of the phase shifters in the first optical modulation unit 31A and the second optical modulation unit 31B to which the data signal according to the modulation input code after the conversion is applied. As a result, since the linear part of the sine curve, which represents the correspondence between the optical intensity and the phase shift amount, is sufficiently ensured, a modulation loss and power consumption may be suppressed while making the signal level intervals equal.

Eleventh Embodiment

Figure 35:
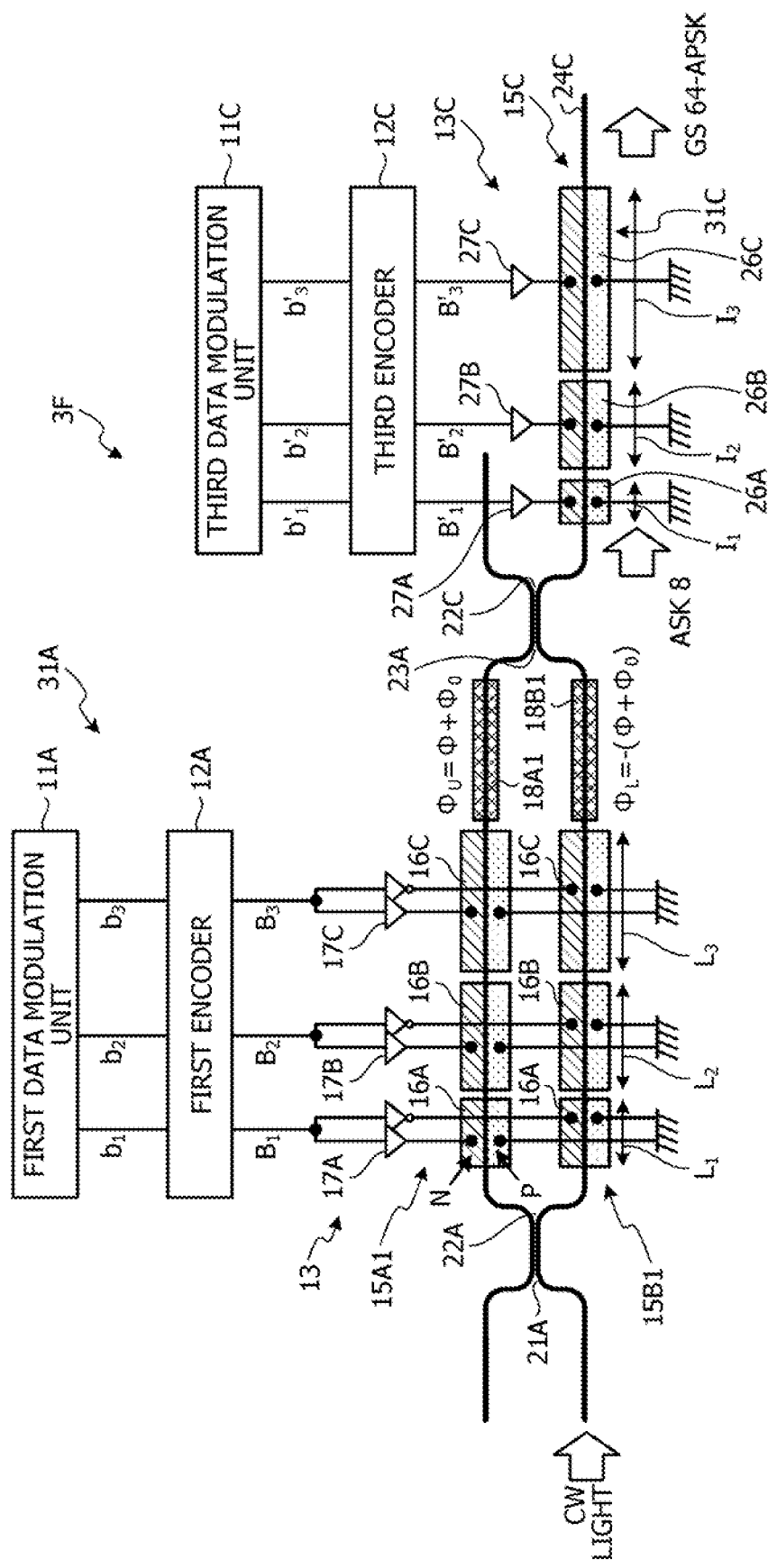
FIG. 35 is a schematic plan view illustrating an example of a configuration of an optical modulator of an eleventh embodiment.

FIG. 35 is a schematic plan view illustrating an example of a configuration of an optical modulator 3F of an eleventh embodiment. The optical modulator 3F illustrated in FIG. 35 includes a first optical modulation unit 31A and a third optical modulation unit 31C. The first optical modulation unit 31A is a modulation unit that performs intensity modulation of an optical signal and outputs an 8 ASK modulation signal after the intensity modulation. The third optical modulation unit 31C is a modulation unit that performs intensity modulation of an 8 ASK modulation signal after intensity modulation by the first optical modulation unit 31A and outputs a geometrical shaping (GS) 64 amplitude and phase shift keying (APSK) modulation signal after the intensity modulation.

The first optical modulation unit 31A includes a first data modulation unit 11A, a first encoder 12A, a first DAC 13A, a first optical waveguide 14A, and a first upper arm 15A1 and a first lower arm 15B1 arranged on the first optical waveguide 14A. Moreover, the first optical modulation unit 31A includes a first upper heater 18A1 and a first lower heater 18B1. The first data modulation unit 11A performs modulation into a bit string data signal. The first encoder 12A converts a bit string data signal into a modulation input code. The first encoder 12A converts a first bit value bi in the bit string data signal into a first bit value $B_1$ in the modulation input code. The first encoder 12A converts a second bit value $b_2$ in the bit string data signal into a second bit value $B_2$ in the modulation input code. The first encoder 12A converts a third bit value $b_3$ in the bit string data signal into a third bit value $B_3$ in the modulation input code.

FIG. 36 is an explanatory diagram illustrating an example of a correspondence between an input and an output of each of the first encoder 12A and third encoder 12C for 3 bits. As illustrated in FIG. 36, the first encoder 12A converts a gray code "$b_3b_2b_1$" of a data signal into a modulation input code "$B_3B_2B_1$". In a case where the gray code is "100", the first encoder 12A converts the gray code "100" into a modulation input code "111". In a case where the gray code is "001", the first encoder 12A converts the gray code "001" into a modulation input code "001". In a case where the gray code is "011", the first encoder 12A converts the gray code "011" into a modulation input code "010". In a case where the gray code is "010", the first encoder 12A converts the gray code "010" into a modulation input code "100". In a case where the gray code is "110", the first encoder 12A converts the gray code "110" into a modulation input code "011". In a case where the gray code is "111", the first encoder 12A converts the gray code "111" into a modulation input code "101". In a case where the gray code is "101", the first encoder 12A converts the gray code "101" into a modulation input code "110". In a case where the gray code is "100", the first encoder 12A converts the gray code "100" into a modulation input code "111".

The first DAC 13A converts a modulation input code of a data signal from the first encoder 12A into an analog signal, for example, into a voltage. Since the first DAC 13A is a 3-bit DAC, the first DAC 13A includes three voltage conversion units, for example, a first voltage conversion unit 17A, a second voltage conversion unit 17B, and a third voltage conversion unit 17C. The first voltage conversion unit 17A converts a data signal of the first bit value $B_1$ of the modulation input code from the first encoder 12A into a voltage. The second voltage conversion unit 17B converts a data signal of the second bit value $B_2$ of the modulation input code from the first encoder 12A into a voltage. The third voltage conversion unit 17C converts a data signal of the third bit value $B_3$ of the modulation input code from the first encoder 12A into a voltage.

The first optical waveguide 14A includes a waveguide core of Si or the like and a waveguide clad of 902 or the like. The first optical waveguide 14A includes a first input unit 21A, a first branch unit 22A, a first multiplexing unit 23A, and a first output unit 24A. The first input unit 21A inputs an optical signal (CW light) from a light source 2. The first branch unit 22A branches an optical signal from the first input unit 21A into the first upper arm 15A1 and the first lower arm 15B1. The first upper arm 15A1 and the first lower arm 15B1 are, for example, an MZ interferometer.

The first upper arm 15A1 performs intensity modulation of an optical signal from the light source 2 with a data signal after analog conversion, and outputs a horizontally polarized optical modulation signal after the intensity modulation. The first lower arm 15B1 performs intensity modulation of an optical signal from the light source 2 with a data signal after analog conversion, and outputs a vertically polarized optical modulation signal after the intensity modulation. Note that, since the data signal is a 3-bit digital signal, each of the first upper arm 15A1 and the first lower arm 15B1 outputs an 8 ASK modulation signal, which is an 8-value optical modulation signal having a signal level 1 to a signal level 8.

The first upper arm 15A1 includes a first phase shifter group, which is a plurality of phase shifters connected in series, for example, a first phase shifter 16A, a second phase shifter 16B, and a third phase shifter 16C. The first lower arm 15B1 includes a second phase shifter group, which is also a plurality of phase shifters connected in series, for example, a first phase shifter 16A, a second phase shifter 16B, and a third phase shifter 16C. Note that the first phase shifters 16A of the first upper arm 15A1 and the first lower arm 15B1 have the same electrode length Li, and the second phase shifters 16B of the first upper arm 15A1 and the first lower arm 15B1 have the same electrode length $L_2$.

Moreover, the third phase shifters 16C of the first upper arm 15A1 and the first lower arm 15B1 have the same electrode length $L_3$.

The first voltage conversion unit 17A applies the data signal of the first bit value $B_1$ after the voltage conversion to an electrode of the first phase shifter 16A of the first upper arm 15A1. The first voltage conversion unit 17A inverts the data signal of the first bit value $B_1$ after the voltage conversion, and applies the data signal of the first bit value $B_1$ after the inversion to an electrode of the first phase shifter 16A of the first lower arm 15B1. The second voltage conversion unit 17B applies the data signal of the second bit value $B_2$ after the voltage conversion to an electrode of the second phase shifter 16B of the first upper arm 15A1. The second voltage conversion unit 17B inverts the data signal of the second bit value $B_2$ after the voltage conversion, and applies the data signal of the second bit value $B_2$ after the inversion to an electrode of the second phase shifter 16B of the first lower arm 15B1. The third voltage conversion unit 17C applies the data signal of the third bit value $B_3$ after the voltage conversion to an electrode of the third phase shifter 16C of the first upper arm 15A1. The third voltage conversion unit 17C inverts the data signal of the third bit value $B_3$ after the voltage conversion, and applies the data signal of the third bit value $B_3$ after the inversion to an electrode of the third phase shifter 16C of the first lower arm 15B1.

The first upper heater 18A1 adjusts a phase shift amount of the first upper arm 15A1 according to temperature adjustment. Furthermore, the first lower heater $18B_1$ adjusts a phase shift amount of the first lower arm 15B1 according to temperature adjustment.

The first phase shifter 16A of the first upper arm 15A1 performs intensity modulation of an optical signal with the data signal of the first bit value $B_1$ from the first voltage conversion unit 17A. Furthermore, the first phase shifter 16A of the first lower arm 15B1 performs intensity modulation of an optical signal with the data signal of the first bit value $B_1$ after the inversion from the first voltage conversion unit 17A. The second phase shifter 16B of the first upper arm 15A1 performs intensity modulation of the optical signal with the data signal of the second bit value $B_2$ from the second voltage conversion unit 17B. Furthermore, the second phase shifter 16B of the first lower arm 15B1 performs intensity modulation of the optical signal with the data signal of the second bit value $B_2$ after the inversion from the second voltage conversion unit 17B. The third phase shifter 16C of the first upper arm 15A1 performs intensity modulation of the optical signal with the data signal of the third bit value $B_3$ from the third voltage conversion unit 17C. Furthermore, the third phase shifter 16C of the first lower arm 15B1 performs intensity modulation of the optical signal with the data signal of the third bit value $B_3$ after the inversion from the third voltage conversion unit 17C.

The first upper arm 15A1 outputs the optical modulation signal after the intensity modulation with the data signal to the first multiplexing unit 23A. Moreover, the first lower arm 15B1 outputs the optical modulation signal after the intensity modulation with the data signal to the first multiplexing unit 23A. The first multiplexing unit 23A multiplexes the optical modulation signal after the intensity modulation by the first upper arm 15A1 and the optical modulation signal after the intensity modulation by the first lower arm 15B1, and outputs, to the third optical modulation unit 31C, an 8 ASK modulation signal after the multiplexing as an output of the first optical modulation unit 31A.

Phase shift amounts φ1, φ2, φ3, and φ0 of the first optical modulation unit 31A are as indicated in (Expression 14). The phase shift amount φ1 is about 0.57 rad, the phase shift amount φ2 is about 0.91 rad, the phase shift amount φ3 is about 1.2 rad, and the phase shift amount φ0 is about 3.37 rad.

$$\phi_1 \sim 0.57\text{rad} \quad \phi_2 \sim 0.91\text{rad} \quad \phi_3 \sim 1.2\text{rad} \quad \text{[Expression 14]}$$
$$\Phi_0 = \frac{3}{2}\pi - \frac{\phi_1 + \phi_2 + \phi_3}{2} \sim 3.37\text{rad}$$

The optical intensity of the first optical modulation unit 31A is as indicated in (Expression 15).

$$E_{out} = \frac{E_{in}}{2}(e^{i\Phi_U} + e^{i\Phi_L})e^{i\Psi} = \frac{E_{in}}{2}\cos(\Phi + \Phi_0)e^{i\Psi} \quad \text{[Expression 15]}$$

In the first optical modulation unit 31A, a ratio of the electrode lengths of the first phase shifter 16A, the second phase shifter 16B, and the third phase shifter 16C is set to, for example, $L_1:L_2:L_3=21:34:45$ so as to make optical intensities for the respective signal levels (1 to 8) at equal intervals. As a result, since the optical intensities for the respective signal levels (1 to 8) are at equal intervals, a linear part of a sine curve, which represents a correspondence between the optical intensity of the 8 ASK modulation signal and the phase shift amount, may be sufficiently ensured.

The third optical modulation unit 31C includes a third data modulation unit 11C, the third encoder 12C, a third DAC 13C, a third optical waveguide 14C, and a third arm 15C arranged on the third optical waveguide 14C. The third data modulation unit 11C performs modulation into a bit string data signal. The third encoder 12C converts a bit string data signal into a modulation input code. The third encoder 12C converts a first bit value bi in the bit string data signal into a first bit value $B_1$ in the modulation input code. The third encoder 12C converts a second bit value $b_2$ in the bit string data signal into a second bit value $B_2$ in the modulation input code. The third encoder 12C converts a third bit value $b_3$ in the bit string data signal into a third bit value $B_3$ in the modulation input code.

As illustrated in FIG. 36, the third encoder 12C converts a gray code "$b_3b_2b_1$" of a data signal into a modulation input code "$B_3B_2B_1$". In a case where the gray code is "100", the third encoder 12C converts the gray code "100" into a modulation input code "111". In a case where the gray code is "001", the third encoder 12C converts the gray code "001" into a modulation input code "001". In a case where the gray code is "011", the third encoder 12C converts the gray code "011" into a modulation input code "010". In a case where the gray code is "010", the third encoder 12C converts the gray code "010" into a modulation input code "100". In a case where the gray code is "110", the third encoder 12C converts the gray code "110" into a modulation input code "011". In a case where the gray code is "111", the third encoder 12C converts the gray code "111" into a modulation input code "101". In a case where the gray code is "101", the third encoder 12C converts the gray code "101" into a modulation input code "110". In a case where the gray code is "100", the third encoder 12C converts the gray code "100" into a modulation input code "111".

The third DAC 13C converts a modulation input code of a data signal from the third encoder 12C into an analog signal, for example, into a voltage. Since the third DAC 13C is a 3-bit DAC, the third DAC 13C includes three voltage conversion units, for example, a seventh voltage conversion unit 27A, an eighth voltage conversion unit 27B, and a ninth voltage conversion unit 27C. The seventh voltage conversion unit 27A converts a data signal of the first bit value $B_1$ of the modulation input code from the third encoder 12C into a voltage. The eighth voltage conversion unit 27B converts a data signal of the second bit value $B_2$ of the modulation input code from the third encoder 12C into a voltage. The ninth voltage conversion unit 27C converts a data signal of the third bit value $B_3$ of the modulation input code from the third encoder 12C into a voltage.

The third optical waveguide 14C includes a waveguide core of Si or the like and a waveguide clad of $SiO_2$ or the like. The third optical waveguide 14C includes a third branch unit 22C and a third output unit 24C. The third branch unit 22C branches and outputs an 8 ASK modulation signal after the intensity modulation from the first optical modulation unit 31A to the third arm 15C. The third arm 15C is, for example, an MZ interferometer.

The third arm 15C performs intensity modulation of an 8 ASK modulation signal after intensity modulation by the first optical modulation unit 31A with a data signal after analog conversion, and outputs a GS 64 APSK modulation signal after the intensity modulation. Note that, since the data signal is a 3-bit digital signal, the third arm 15C outputs a GS 64 APSK modulation signal, which is a 64-value optical modulation signal having a signal level 1 to a signal level 64.

The third arm 15C includes a third phase shifter group, which is a plurality of phase shifters connected in series, for example, a first phase shifter 26A, a second phase shifter 26B, and a third phase shifter 26C. Note that, in a case where it is assumed that an electrode length of the first phase shifter 26A of the third arm 15C is $L_{11}$, an electrode length of the second phase shifter 26B of the third arm 15C is $L_{12}$, and an electrode length of the third phase shifter 26C of the third arm 15C is $L_{13}$, a ratio of $L_{11}:L_{12}:L_{13}$ is, for example, 1:2:4.

The seventh voltage conversion unit 27A applies the data signal of the first bit value $B_1$ after the voltage conversion to an electrode of the first phase shifter 26A of the third arm 15C. The eighth voltage conversion unit 27B applies the data signal of the second bit value $B_2$ after the voltage conversion to an electrode of the second phase shifter 26B of the third arm 15C. The ninth voltage conversion unit 27C applies the data signal of the third bit value $B_3$ after the voltage conversion to an electrode of the third phase shifter 26C of the third arm 15C.

The first phase shifter 26A of the third arm 15C performs intensity modulation of an optical signal after the intensity modulation from the first optical modulation unit 31A with the data signal of the first bit value $B_1$ from the seventh voltage conversion unit 27A. The second phase shifter 26B of the third arm 15C performs intensity modulation of the optical signal after the intensity modulation from the first optical modulation unit 31A with the data signal of the second bit value $B_2$ from the eighth voltage conversion unit 27B. The third phase shifter 26C of the third arm 15C performs intensity modulation of the optical signal after the intensity modulation from the first optical modulation unit 31A with the data signal of the third bit value $B_3$ from the ninth voltage conversion unit 27C.

A phase shift amount of the third optical modulation unit 31C is as indicated in (Expression 16).

$$\Psi \triangleq \sum_{m=1}^{3} B'_m \psi_m \qquad \text{[Expression 16]}$$

Phase shift amounts $\varphi 1$, $\varphi 2$, and $\varphi 3$ of the third optical modulation unit 31C are as indicated in (Expression 17). The phase shift amount $\varphi 1$ of the third optical modulation unit 31C is $\pi/8$, the phase shift amount $\varphi 2$ is $\pi/4$, and the phase shift amount $\varphi 3$ is $\pi/2$.

$$\psi_1 = \frac{\pi}{8} \quad \psi_2 = \frac{\pi}{4} \quad \psi_3 = \frac{\pi}{2} \qquad \text{[Expression 17]}$$

In the third optical modulation unit 31C, a ratio of the electrode lengths of the first phase shifter 26A, the second phase shifter 26B, and the third phase shifter 26C is set to, for example, $L_{11}:L_{12}:L_{13}=1:2:4$ so as to make optical intensities for the respective signal levels (1 to 64) at equal intervals. As a result, since the optical intensities for the respective signal levels (1 to 64) are at equal intervals, a linear part of a sine curve, which represents a correspondence between the optical intensity of the GS 64 APSK modulation signal and the phase shift amount, may be sufficiently ensured.

Figure 37:
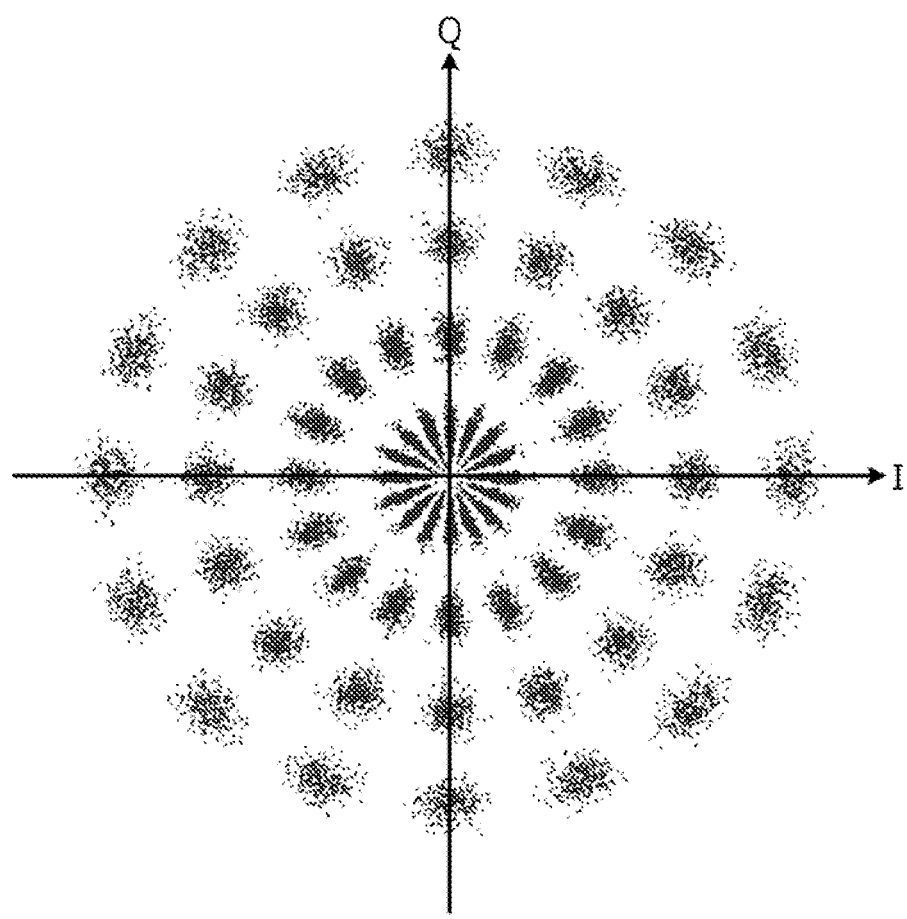
FIG. 37 is an explanatory diagram illustrating an example of a symbol of the optical modulator.

The third optical modulation unit 31C performs intensity modulation of an 8 ASK modulation signal after intensity modulation from the first optical modulation unit 31A with the data signal, and outputs an optical modulation signal after the intensity modulation as a GS 64 APSK modulation signal, which is an output of the optical modulator 3F. FIG. 37 is an explanatory diagram illustrating an example of a symbol of the optical modulator 3F. The symbol illustrated in FIG. 37 is a symbol of a GS 64 APSK modulation signal output by the optical modulator 3F.

In order to make the optical intensities for the respective signal levels at equal intervals, the optical modulator 3F of the eleventh embodiment adjusts, while converting the gray code of the data signal into the modulation input code, the electrode lengths of the phase shifters in the first optical modulation unit 31A and the third optical modulation unit 31C to which the data signal according to the modulation input code after the conversion is applied. As a result, since the linear part of the sine curve, which represents the correspondence between the electric field intensity and the phase shift amount, is sufficiently ensured, a modulation loss and power consumption may be suppressed while making the signal level intervals equal.

Note that, for convenience of description, a case has been exemplified in which, in a state where electrode lengths of the first phase shifter group and the second phase shifter group are set to lengths at which the intervals of intensities of symbol points of a first optical modulation signal become equal, the first encoder 12A of the eleventh embodiment encodes an input first data signal into a bit string in which the number of bits to be 1 increases or decreases according to the intensities of the symbol points of the first optical modulation signal. However, the present embodiment is not limited to the state where the electrode lengths of the first phase shifter group and the second phase shifter group are set to the lengths at which the intervals of the intensities of the symbol points of the first optical modulation signal become equal. For example, the present embodiment may be applied also to a case where a slight error occurs in the intervals of the intensities of the symbol points due to manufacturing variation or the like. Lengths of error ranges of the intervals of intensities of the symbol points are equal within a range of ±20% or less.

For example, in a state where the electrode lengths of the first phase shifter group and the second phase shifter group are set to predetermined lengths predetermined by the intervals of the intensities of the symbol points of the first optical modulation signal, the first encoder 12A encodes the input first data signal into the bit string in which the number of bits to be 1 increases or decreases according to the intensities of the symbol points of the first optical modulation signal. Even in this case, a modulation loss and power consumption may be suppressed.

A case has been exemplified in which, in a state where an electrode length of the third phase shifter group is set to a length at which the intervals of intensities of symbol points of a third optical modulation signal become equal, the third encoder 12C encodes an input third data signal into a bit string in which the number of bits to be 1 increases or decreases according to the intensities of the symbol points of the third optical modulation signal. However, the present embodiment is not limited to the state where the electrode length of the third phase shifter group is set to the length at which the intervals of the intensities of the symbol points of the third optical modulation signal become equal. For example, the present embodiment may be applied also to a case where a slight error occurs in the intervals of the intensities of the symbol points due to manufacturing variation or the like. Lengths of error ranges of the intervals of intensities of the symbol points are equal within a range of ±20% or less.

For example, in a state where the electrode length of the third phase shifter group is set to a predetermined length predetermined by the intervals of the intensities of the symbol points of the third optical modulation signal, the third encoder 12C encodes the input third data signal into the bit string in which the number of bits to be 1 increases or decreases according to the intensities of the symbol points of the third optical modulation signal. Even in this case, a modulation loss and power consumption may be suppressed.

Note that, for convenience of description, the optical transmitter 1 incorporating the optical modulator 3 of the present embodiment has been exemplified, but an optical communication apparatus including the optical transmitter 1 incorporating the optical modulator 3 of the present embodiment and an optical receiver may also be applied. Furthermore, although the description has been made assuming the case of the symbol mapping using the gray code, any symbol mapping using other than the gray code may be used as long as a bit string of information desired to be transmitted is used.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical modulator comprising:
    an encoder that encodes an input data signal;
    a branch circuit that branches an optical signal into a first optical signal and a second optical signal;
    a first arm through which the first optical signal branched at the branch circuit passes;
    a first phase shifter group that is arranged on the first upper arm for each bit digit of a bit string of the input data signal output from the encoder, and adjusts a phase shift amount of the first optical signal that passes through the first arm according to a bit value for each bit digit;
    a second arm through which the second optical signal branched at the branch circuit passes;
    a second phase shifter group that is arranged on the second arm for each bit digit, and adjusts a phase shift amount of the second optical signal that passes through the second arm according to a bit value for each bit digit such that a sign of the phase shift amount of the second optical signal becomes opposite to a sign of the phase shift amount of the first optical signal; and
    a multiplexing circuit that multiplexes the first optical signal after phase shift adjustment by using the first phase shifter group and the second optical signal after phase shift adjustment by using the second phase shifter group, and outputs an optical modulation signal,
    wherein the encoder encodes, in a state where electrode lengths of the first phase shifter group and the second phase shifter group are set to predetermined lengths predetermined by intervals of intensities of symbol points of the optical modulation signal, the input data signal into a bit string in which the number of bits to be 1 increases or decreases according to the intensities of the symbol points of the optical modulation signal,
    wherein the encoder encodes the input data signal into a bit string of an N-digit binary number on the basis of a predetermined rule, the electrode length of the first phase shifter group is obtained by adding electrode lengths of phase shifters which correspond to N phase shifters in the first phase shifter group and in which a bit in the bit string of the N-digit binary number becomes 1, and the electrode length of the second phase shifter group is obtained by adding electrode lengths of phase shifters which correspond to the N phase shifters in the second phase shifter group and in which a bit in the bit string of the N-digit binary number becomes 1,
    wherein the encoder encodes, in a case where the number of "1" in the bit string is the same, the bit string of the input data signal on the basis of the predetermined rule of rearranging numbers of the bit digits in order from the smallest, inverting signs of the numbers of the bit digits after the rearrangement, and horizontally inverting the numbers of bit digits after the sign inversion.

2. An optical transmitter comprising:
    a first encoder that encodes a first data signal;
    a second encoder that encodes a second data signal;
    a branch circuit that branches an optical signal into a first optical signal of a first polarization, a second optical signal of the first polarization, a third optical signal of a second polarization, and a fourth optical signal of the second polarization;
    a first optical modulation circuit that performs intensity modulation of the first optical signal and the second optical signal of the first polarization from the branch circuit with the first data signal;
    a second optical modulation circuit that performs intensity modulation of the third optical signal and the fourth optical signal of the second polarization from the branch circuit with the second data signal; and
    a multiplexing circuit that multiplexes and outputs a first optical modulation signal after the intensity modulation by the first optical modulation circuit and a second optical modulation signal after the intensity modulation by the second optical modulation circuit, wherein the first optical modulation circuit includes: a first upper arm through which the branched first optical signal of the first polarization passes;

a first phase shifter group that is arranged on the first upper arm for each bit digit of a bit string of the first data signal output from the first encoder, and adjusts a phase shift amount of the first optical signal that passes through the first upper arm according to a bit value for each bit digit;

a first lower arm through which the branched second optical signal of the first polarization passes;

a second phase shifter group that is arranged on the first lower arm for each bit digit of the first data signal, and adjusts a phase shift amount of the second optical signal that passes through the first lower arm according to a bit value for each bit digit such that a sign of the phase shift amount of the second optical signal becomes opposite to a sign of the phase shift amount of the first optical signal; and a first multiplexing circuit that multiplexes the first optical signal after phase shift adjustment by using the first phase shifter group arranged on the first upper arm and the second optical signal after phase shift adjustment by using the second phase shifter group arranged on the first lower arm, and outputs the first optical modulation signal, the second optical modulation circuit includes:

a second upper arm through which the branched third optical signal of the second polarization passes;

a third phase shifter group that is arranged on the second upper arm for each bit digit of a bit string of the second data signal output from the second encoder, and adjusts a phase shift amount of the third optical signal that passes through the second upper arm according to a bit value for each bit digit; a second lower arm through which the branched fourth optical signal of the second polarization passes;

a fourth phase shifter group that is arranged on the second lower arm for each bit digit of the second data signal, and adjusts a phase shift amount of the fourth optical signal that passes through the second lower arm according to a bit value for each bit digit such that a sign of the phase shift amount of the fourth optical signal becomes opposite to a sign of the phase shift amount of the third optical signal; and a second multiplexing circuit that multiplexes the third optical signal after phase shift adjustment by using the third phase shifter group arranged on the second upper arm and the fourth optical signal after phase shift adjustment by using the fourth phase shifter group arranged on the second lower arm, and outputs the second optical modulation signal, the first encoder encodes, in a state where electrode lengths of the first phase shifter group and the second phase shifter group are set to predetermined lengths predetermined by intervals of intensities of symbol points of the first optical modulation signal, the input first data signal into a bit string in which the number of bits to be 1 increases or decreases according to the intensities of the symbol points of the first optical modulation signal, and the second encoder encodes, in a state where electrode lengths of the third phase shifter group and the fourth phase shifter group are set to predetermined lengths predetermined by intervals of intensities of symbol points of the second optical modulation signal, the input second data signal into a bit string in which the number of bits to be 1 increases or decreases according to the intensities of the symbol points of the second optical modulation signal, wherein the first encoder encodes the first data signal into a bit string of an N-digit binary number on the basis of a predetermined rule, the electrode length of the first phase shifter group is obtained by adding electrode lengths of phase shifters which correspond to N phase shifters in the first phase shifter group and in which a bit in the bit string of the N-digit binary number becomes 1, and the electrode length of the second phase shifter group is obtained by adding electrode lengths of phase shifters which correspond to the N phase shifters in the second phase shifter group and in which a bit in the bit string of the N-digit binary number becomes 1, wherein the first encoder encodes, in a case where the number of "1" in the bit string is the same, the bit string of the first data signal on the basis of the predetermined rule of rearranging numbers of the bit digits in order from the smallest, inverting signs of the numbers of the bit digits after the rearrangement, and horizontally inverting the numbers of bit digits after the sign inversion.

3. An optical transmitter comprising:

a first encoder that encodes a first data signal;

a first optical modulation circuit that performs intensity modulation of an optical signal with the first data signal output from the first encoder, and outputs a first optical modulation signal;

a third encoder that encodes a third data signal; and a third optical modulation circuit that performs intensity modulation of the first optical modulation signal from the first optical modulation circuit with the third data signal output from the third encoder, and outputs a third optical modulation signal, wherein the first optical modulation circuit includes:

a first branch circuit that branches the optical signal into a first optical signal and a second optical signal;

an upper arm through which the first optical signal branched at the first branch circuit passes;

a first phase shifter group that is arranged on the upper arm for each bit digit of a bit string of the first data signal, and adjusts a phase shift amount of the first optical signal that passes through the upper arm according to a bit value for each bit digit;

a lower arm through which the second optical signal branched at the first branch circuit passes;

a second phase shifter group that is arranged on the lower arm for each bit digit of the first data signal, and adjusts a phase shift amount of the second optical signal that passes through the lower arm according to a bit value for each bit digit such that a sign of the phase shift amount of the second optical signal becomes opposite to a sign of the phase shift amount of the first optical signal; and a first multiplexing circuit that multiplexes the first optical signal after phase shift adjustment by using the first phase shifter group and the second optical signal after phase shift adjustment by using the second phase shifter group, and outputs the first optical modulation signal, the third optical modulation circuit includes: a second branch circuit that branches the first optical modulation signal;

an arm through which the first optical modulation signal branched at the second branch circuit passes; and a third phase shifter group that is arranged on the arm for each bit digit of a bit string of the third data signal, adjusts a phase shift amount of the first optical modulation signal that passes through the arm according to a bit value for each bit digit, and outputs a third optical modulation signal, the first encoder encodes, in a state where electrode lengths of the first phase shifter group and the second phase shifter group are set to predetermined lengths predetermined by intervals of intensities of symbol points of the first optical modulation signal, the input first data signal into a bit string in which the number of bits to be 1 increases or decreases according to the intensities of the symbol points of the first optical modulation signal, and the third encoder encodes, in a state where an electrode length of the third phase shifter group is set to a predetermined length predetermined by intervals of intensities of symbol points of the third optical modulation signal, the input third data signal into a bit string in which the number of bits to be 1 increases or decreases according to the intensities of the symbol points of the third optical modulation signal, wherein the first encoder encodes the first data signal into a bit string of an N-digit binary number on the basis of a predetermined rule, the electrode length of the first phase shifter group is obtained by adding electrode lengths of phase shifters which correspond to N phase shifters in the first phase shifter group and in which a bit in the bit string of the N-digit binary number becomes 1, and the electrode length of the second phase shifter group is obtained by adding electrode lengths of phase shifters which correspond to the N phase shifters in the second phase shifter group and in which a bit in the bit string of the N-digit binary number becomes 1, wherein the first encoder encodes, in a case where the number of "1" in the bit string is the same, the bit string of the first data signal on the basis of the predetermined rule of rearranging numbers of the bit digits in order from the smallest, inverting signs of the numbers of the bit digits after the rearrangement, and horizontally inverting the numbers of bit digits after the sign inversion.

\* \* \* \* \*